US011743954B2

(12) United States Patent
Jiang et al.

(10) Patent No.: US 11,743,954 B2
(45) Date of Patent: Aug. 29, 2023

(54) AUGMENTED REALITY COMMUNICATION METHOD AND ELECTRONIC DEVICE

(71) Applicant: HUAWEI TECHNOLOGIES CO., LTD., Shenzhen (CN)

(72) Inventors: Dongsheng Jiang, Shanghai (CN); Zejin Guo, Shanghai (CN); Mingliang Du, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 17/278,015

(22) PCT Filed: Sep. 20, 2018

(86) PCT No.: PCT/CN2018/106789
§ 371 (c)(1),
(2) Date: Mar. 19, 2021

(87) PCT Pub. No.: WO2020/056694
PCT Pub. Date: Mar. 26, 2020

(65) Prior Publication Data
US 2021/0385890 A1 Dec. 9, 2021

(51) Int. Cl.
*G06F 3/0482* (2013.01)
*H04W 76/14* (2018.01)
(Continued)

(52) U.S. Cl.
CPC ........... *H04W 76/14* (2018.02); *G06F 3/0482* (2013.01); *G06T 19/006* (2013.01); *G10L 15/22* (2013.01); *G10L 2015/225* (2013.01)

(58) Field of Classification Search
CPC combination set(s) only.
See application file for complete search history.

(56) References Cited

U.S. PATENT DOCUMENTS 8,601,386 B2 * 12/2013 Altberg ............... H04L 12/66
715/706
9,191,620 B1 11/2015 Katzer et al.
(Continued)

FOREIGN PATENT DOCUMENTS

CN 103368816 A 10/2013
CN 103916621 A 7/2014
(Continued)

OTHER PUBLICATIONS

Horizon Robotics, Daniel Lecture Hall | SLAM Chapter 1: Basics, Oct. 27, 2016, URL:https://zhuanlan.zhihu.com/p/23247395, total 10 pages.

*Primary Examiner* — Cindy Trandai
(74) *Attorney, Agent, or Firm* — Rimon PC

(57) ABSTRACT

Embodiments of this application disclose an augmented reality communication method. A specific solution is: sending, by a first electronic device, AR communication request information to a second electronic device, to request to perform AR communication with the second electronic device; establishing, by the first electronic device, an AR communication link with the second electronic device; and displaying, by the first electronic device on a touchscreen, a first AR communication interface including an image of a first real scenario and a first AR model and a second AR model, where in an AR communication process, the first AR model makes a corresponding expression and action based on an expression and action of a first user that are obtained by the first device, and the second AR model makes a corresponding expression and action based on an expression and action of a second user that are obtained by the first device.

18 Claims, 46 Drawing Sheets

(51) Int. Cl.
*G06T 19/00* (2011.01)
*G10L 15/22* (2006.01)

(56) References Cited

U.S. PATENT DOCUMENTS

| | | | |
|---|---|---|---|
| 9,402,057 B2 | 7/2016 | Kaytaz et al. | |
| 10,594,757 B1* | 3/2020 | Shevchenko | G06F 40/35 |
| 10,937,240 B2* | 3/2021 | Anderson | G06V 40/20 |
| 2012/0058801 A1* | 3/2012 | Nurmi | G06F 3/011 |
| | | | 455/566 |
| 2013/0129252 A1* | 5/2013 | Lauper | G06F 16/489 |
| | | | 382/276 |
| 2013/0238778 A1* | 9/2013 | Reitan | G06T 19/006 |
| | | | 709/223 |
| 2015/0201162 A1 | 7/2015 | Griffin et al. | |
| 2015/0356788 A1* | 12/2015 | Abe | A63F 13/335 |
| | | | 345/633 |
| 2016/0125527 A1* | 5/2016 | Marinova | G06Q 10/101 |
| | | | 705/36 R |
| 2018/0063205 A1* | 3/2018 | French | H04L 65/403 |
| 2018/0159979 A1* | 6/2018 | Amir | H04M 3/5183 |
| 2018/0174347 A1 | 6/2018 | Chaney | |
| 2018/0182144 A1 | 6/2018 | Imoto et al. | |
| 2018/0324229 A1* | 11/2018 | Ross | G06F 3/1423 |
| 2019/0114675 A1* | 4/2019 | Lal | G06Q 30/0271 |
| 2019/0158665 A1* | 5/2019 | Cho | G05B 15/02 |
| 2019/0171170 A1* | 6/2019 | Becea | H04L 67/025 |
| 2020/0082367 A1* | 3/2020 | Dent | G07F 19/206 |
| 2020/0394012 A1* | 12/2020 | Wright, Jr | G06F 3/011 |

FOREIGN PATENT DOCUMENTS

| | | |
|---|---|---|
| CN | 105208273 A | 12/2015 |
| CN | 106803921 A | 6/2017 |
| CN | 107544802 A | 1/2018 |
| CN | 107750005 A | 3/2018 |
| CN | 108234276 A | 6/2018 |
| KR | 101768532 B1 | 8/2017 |
| WO | 2016168217 A1 | 10/2016 |
| WO | 2018142222 A1 | 8/2018 |

* cited by examiner

CONT. FROM FIG. 20A

CONT. FROM FIG. 20A

S1901: The first electronic device displays a second AR communication interface a on a touchscreen, where the second AR communication interface a includes the image of the first real scenario, but does not include a first AR model a or a second AR model a S1902: The first electronic device displays a model selection interface on the touchscreen in response to a second operation performed on the second AR communication interface a on the touchscreen, where the model selection interface includes a plurality of model options, and each model option corresponds to one AR model S1903: The first electronic device displays a third AR communication interface a on the touchscreen in response to a first selection operation performed on a first model option in the plurality of model options on the touchscreen, where the third AR communication interface a includes the image of the first real scenario and the second AR model a corresponding to a second model option, but does not include the first AR model a S1904: The first electronic device displays the model selection interface on the touchscreen in response to a second operation performed on the third AR communication screen on the touchscreen S1905: The first electronic device displays a first AR communication interface a on the touchscreen in response to a second selection operation performed on the second model option in the plurality of model options on the touchscreen, where the first AR communication interface includes the image of the first real scenario, the second AR model a, and the first AR model a corresponding to the first model option S2001: Display the model selection interface in response to a tap operation performed on the first AR model a on the touchscreen, where the model selection interface includes the plurality of model options, and each model option corresponds to one AR model S2002: Change, in response to a tap operation performed on a third model option in the plurality of model options on the touchscreen, the first AR model on the first AR communication interface to a third AR model corresponding to the third model option

FIG. 20B

CONT. FROM FIG. 21A

CONT. FROM FIG. 21A

S1902: The first electronic device displays a model selection interface on the touchscreen in response to a second operation performed on the second AR communication interface a on the touchscreen, where the model selection interface includes a plurality of model options, and each model option corresponds to one AR model S1903: The first electronic device displays a third AR communication interface a on the touchscreen in response to a first selection operation performed on a first model option in the plurality of model options on the touchscreen, where the third AR communication interface a includes the image of the first real scenario and the second AR model a corresponding to a second model option, but does not include the first AR model a S1904: The first electronic device displays the model selection interface on the touchscreen in response to a second operation performed on the third AR communication interface on the touchscreen S1905: The first electronic device displays a first AR communication interface a on the touchscreen in response to a second selection operation performed on the second model option in the plurality of model options on the touchscreen, where the first AR communication interface includes the image of the first real scenario, the second AR model a, and the first AR model a corresponding to the first model option S2101: Recognize voice data collected by a microphone of the first electronic device and voice data obtained by converting an audio electrical signal from the second electronic device S2102: Display a text of the recognized voice data on the touchscreen S2103: When recognizing voice data corresponding to a text and a preset text, display, on the touchscreen, a dynamic image in which the first AR model and the second AR model perform actions corresponding to the preset text

FIG. 21B

AUGMENTED REALITY COMMUNICATION METHOD AND ELECTRONIC DEVICE

CROSS-REFERENCE TO RELATED APPLICATIONS

This application is a national stage of International Application No. PCT/CN2018/106789, filed on Sep. 20, 2018, which is hereby incorporated by reference in its entirety.

TECHNICAL FIELD

Embodiments of this application relate to the field of communications technologies, and in particular, to an augmented reality communication method and an electronic device.

BACKGROUND

In the prior art, in a process in which an electronic device communicates (for example, performs voice communication or video communication) with another electronic device, interaction between a calling party and a called party in a real scenario cannot be implemented.

SUMMARY

Embodiments of this application provide an augmented reality communication method, to provide a user with an interactive service in a real scenario in a process of voice communication or video communication.

According to a first aspect, an embodiment of this application provides an augmented reality (AR) communication method. The method includes: sending, by a first electronic device, AR communication request information to a second electronic device in response to a first operation, to request to perform AR communication with the second electronic device; establishing, by the first electronic device, an AR communication link with the second electronic device; and displaying, by the first electronic device on a touchscreen, a first AR communication interface (namely, a first AR communication interface a) that includes an image of a first real scenario and a first AR model (for example, a first AR model a) and a second AR model (for example, a second AR model a) that are in the first real scenario, where in an AR communication process, the first AR model makes a corresponding expression and action based on an expression and action of a first user that are obtained by the first device, and the second AR model makes a corresponding expression and action based on an expression and action of a second user that are obtained by the first device.

According to the augmented reality communication method, the first AR communication interface displayed by the first electronic device includes the image of the first real scenario in which the first electronic device is located, and the first AR model and the second AR model that are in the first real scenario. In addition, the first AR model performs the expression and action of the first user (namely, a calling party), and the second AR model may perform the expression and action of the second user (namely, a called party). In this way, in a process in which the electronic device performs AR communication, an interactive service in the real scenario can be provided for the user, so that communication experience of the user can be improved.

With reference to the first aspect, in a possible design, the first electronic device may receive the first operation in a process of performing voice communication or video communication with the second electronic device. Specifically, before the sending, by a first electronic device, AR communication request information to a second electronic device in response to a first operation, the method in this embodiment of this application may further include: performing, by the first electronic device, the voice communication or the video communication with the second electronic device, and displaying a graphical user interface of the voice communication or the video communication on the touchscreen.

For example, the first operation may be a first preset gesture entered on the graphical user interface of the voice communication or the video communication on the touchscreen. Alternatively, the graphical user interface of the voice communication or the video communication includes an AR communication button, and the first operation is a tap operation performed on the AR communication button on the touchscreen. Alternatively, the first operation is a tap operation performed on a first preset button in the process of the voice communication or the video communication, and the first preset button is a physical button of the first electronic device. The first electronic device may initiate AR communication in the process of performing the voice communication or the video communication with the second electronic device, so that user experience of the voice communication or the video communication can be improved.

With reference to the first aspect, in another possible design, an AR application is installed in each of the first electronic device and the second electronic device. The AR application is a client used to provide an AR communications service. The first electronic device may perform AR communication with the second electronic device by using an AR application request. Specifically, before the sending, by a first electronic device, AR communication request information to a second electronic device in response to a first operation, the method in this embodiment of this application further includes: displaying, by the first electronic device in response to a tap operation performed on an application icon of the AR application, an AR application interface including at least one contact option, where the at least one contact option includes a contact option corresponding to the second electronic device. The first operation may be a tap operation performed by the first user on the contact option corresponding to the second electronic device.

With reference to the first aspect, in another possible design, the first electronic device includes a first camera (for example, a front-facing camera) and a second camera (for example, a rear-facing camera), and the second electronic device includes a first camera (for example, a front-facing camera). The image of the first real scenario is an image collected by the second camera of the first electronic device; the expression and action of the first user are collected by the first camera of the first electronic device; and the expression and action of the second user are collected by the first camera of the second electronic device.

The first electronic device may receive, by using the AR communication link, behavior action information of the second user that is sent by the second electronic device. The behavior action information of the second user is used to represent changes of the expression and action of the second user. The behavior action information of the second user is collected by the first camera of the second electronic device. To be specific, according to the foregoing solution, the second user can control the expression and action of the second AR model displayed by the first electronic device, to improve communication experience of the user.

With reference to the first aspect, in another possible design, the first electronic device may alternatively send behavior action information of the first user to the second electronic device by using the AR communication link. The behavior action information of the first user is used to represent changes of the expression and action of the first user. The behavior action information of the first user is collected by the first camera of the first electronic device. In this way, the second electronic device may display, in a second real scenario based on the behavior action information of the first user, a dynamic image in which an expression and action of a first AR model (for example, a first AR model b) correspondingly change with the expression and action of the first user. To be specific, according to the foregoing solution, the first user can control the expression and action of the first AR model b displayed by the second electronic device, to improve communication experience of the user.

With reference to the first aspect, in another possible design, the first AR model is an AR model (namely, a default AR model) that is preset in the first electronic device for the first electronic device, and the second AR model is an AR model that is preset in the first electronic device for the second electronic device. For example, the first electronic device may receive a tap operation (for example, a single tap operation) performed by the user on a "Settings" application icon on a home screen of the first electronic device; and the first electronic device 200 may display, in response to the tap operation, a setting interface including an AR model setting option. The first electronic device may display an AR model setting interface in response to a tap operation (for example, a single tap operation) performed by the user on the AR model setting option. The AR model setting interface may include an AR model setting option of an owner and AR model setting options of a plurality of contacts. The first electronic device may receive a tap operation performed by the user on any setting option, and set an AR model for a corresponding user.

With reference to the first aspect, in another possible design, the first AR model and the second AR model each may be an AR model added by the first electronic device to an AR communication interface in response to an operation performed by the user. Specifically, the displaying, by the first electronic device, a first AR communication interface on a touchscreen includes: enabling, by the first electronic device, the first camera and the second camera of the first electronic device in response to establishing the AR communication link, so that the second camera of the first electronic device can collect the image of the first real scenario, and the first camera of the first electronic device can collect the expression and action of the first user; displaying, by the first electronic device on the touchscreen, a second AR communication interface (namely, a second AR communication interface a) that includes the image of the first real scenario, but does not include the first AR model or the second AR model, where an AR communication interface that is just displayed by the first electronic device does not include an AR model, and the user needs to operate the first electronic device to add the AR model; displaying, by the first electronic device on the touchscreen in response to a second operation performed on the second AR communication interface on the touchscreen, a model selection interface that includes a plurality of model options, where each model option corresponds to one AR model; displaying, by the first electronic device on the touchscreen in response to a first selection operation performed on a first model option in the plurality of model options on the touchscreen, a third AR communication interface (namely, a third AR communication interface a) that includes the image of the first real scenario and the second AR model corresponding to a second model option, but does not include the first AR model, so that the first electronic device can present, in the first AR model, the expression and action that are collected by the first camera of the first electronic device; displaying, by the first electronic device, the model selection interface on the touchscreen in response to the second operation performed on the third AR communication interface on the touchscreen; and displaying, by the first electronic device, the first AR communication interface (namely, the first AR communication interface a) on the touchscreen in response to a second selection operation performed on the first model option in the plurality of model options on the touchscreen, so that the first electronic device presents, in the second AR model, the expression and action that are collected by the first camera of the second electronic device.

The AR communication interface (for example, the second AR communication interface) that is just displayed by the first electronic device includes only the image of the first real scenario that is collected by the second camera of the first electronic device, but does not include the first AR model or the second AR model. The user may add the AR model to the second AR communication interface. According to the foregoing method, the user may select an AR model that meets a preference of the user, so that communication experience of the user can be improved.

With reference to the first aspect, in another possible design, in a process in which the first electronic device performs AR communication with the second electronic device, the first electronic device may display the model selection interface in response to a tap operation performed on the first AR model on the touchscreen; and the first electronic device may change, in response to a tap operation performed on a third model option in the plurality of model options on the touchscreen, the first AR model on the first AR communication interface to a third AR model corresponding to the third model option.

In the process in which the first electronic device performs AR communication with the second electronic device, the first electronic device may change an AR model at any time based on an operation of the user, and display an AR model that meets a preference of the user, so that communication experience of the user can be improved.

With reference to the first aspect, in another possible design, in a process in which the first electronic device performs AR communication with the second electronic device, the first electronic device may start, in response to a third operation (namely, a recording operation) on the touchscreen, to record video data obtained when the first electronic device performs AR communication with the second electronic device.

After recording the video, the first electronic device may send the video data to another electronic device, so that a user of the other electronic device can learn and understand content related to current communication. Alternatively, the first electronic device may upload the video data to a public network platform, so that more users can learn and understand content related to current communication.

With reference to the first aspect, in another possible design, the image of the first real scenario correspondingly changes with framing content of the second camera of the first electronic device. In this way, the image of the real scenario that is displayed by the first electronic device may change in real time as the first electronic device moves, to improve communication experience of the user in the real scenario.

With reference to the first aspect, in another possible design, a location of the first AR model in the first real scenario is different from a location of the second AR model in the first real scenario. The first electronic device may display, in response to a drag operation performed on the first AR model on the touchscreen, a dynamic image in which the first AR model moves along a track corresponding to the drag operation in the first real scenario.

With reference to the first aspect, in another possible design, after the first electronic device displays the first AR communication interface on the touchscreen, the first electronic device may display contact information of the second user in response to a fourth operation performed on the second AR model on the touchscreen. For example, the contact information includes at least one of a phone number, an email address, or a profile picture of the second user. In this way, in a process in which the first electronic device performs AR communication with the second electronic device, the first electronic device can display the contact information of the corresponding user only by operating the AR model by the user, but does not need to exit the AR communication interface to search Contacts for the contact information of the user.

With reference to the first aspect, in another possible design, after the first electronic device displays the first AR communication interface on the touchscreen, the first electronic device may recognize voice data collected by a microphone of the first electronic device and voice data obtained by converting an audio electrical signal from the second electronic device; and the first electronic device displays a text of the recognized voice data on the touchscreen. In other words, the first electronic device may display, in the AR communication interface, the text (namely, a subtitle) of the voice data obtained through AR communication. The first electronic device displays the text of the voice data obtained through AR communication, and therefore may visually present, to the user, content exchanged between the two users in a process in which the first electronic device performs AR communication with the second electronic device.

With reference to the first aspect, in another possible design, when recognizing voice data corresponding to a text and a preset text, the first electronic device displays, on the touchscreen, a dynamic image in which the first AR model and the second AR model perform actions corresponding to the preset text. The first electronic device may store a plurality of preset texts and actions corresponding to the preset texts. For example, a preset text "hello" corresponds to an action "handshake". A preset text "goodbye" corresponds to an action "wave".

With reference to the first aspect, in another possible design, after the first electronic device sends the AR communication request information to the second electronic device, if the first electronic device receives first AR communication response information sent by the second electronic device, it indicates that the second electronic device agrees to perform the AR communication with the first electronic device. The first electronic device establishes the AR communication link with the second electronic device in response to the first AR communication response information.

When the first electronic device requests to perform AR communication with the second electronic device, the first electronic device cannot directly establish the AR communication link with the second electronic device, and instead, based on a willingness of the called party, the first electronic device can establish the AR communication link with the second electronic device only after the second electronic device (namely, the called party) agrees. In this way, communication experience of the user can be improved.

With reference to the first aspect, in another possible design, the second electronic device may not agree to perform AR communication with the first electronic device. If the first electronic device receives second AR communication response information sent by the second electronic device, it indicates that the second electronic device refuses to perform the AR communication with the first electronic device. The first electronic device may present second prompt information in response to the second AR communication response information. The second prompt information is used to indicate that the second electronic device refuses to perform the AR communication with the first electronic device.

According to a second aspect, an embodiment of this application provides an augmented reality communication method. The method may include: receiving, by a second electronic device, AR communication request information sent by a first electronic device, where the AR communication request information is used to request to perform AR communication with the second electronic device; establishing, by the second electronic device, an AR communication link with the first electronic device in response to the AR communication request information; and displaying, by the second electronic device, a first AR communication interface on a touchscreen, where the first AR communication interface includes an image of a second real scenario, and a first AR model (for example, a first AR model b) and a second AR model (for example, a second AR model b) that are in the second real scenario; the second real scenario is a real scenario in which the second electronic device is located; and in an AR communication process, the first AR model makes a corresponding expression and action based on an expression and action of a first user that are obtained by the first device, and the second AR model makes a corresponding expression and action based on an expression and action of a second user that are obtained by the first device.

According to the augmented reality communication method, a second AR communication interface displayed by the second electronic device includes the image of the second real scenario in which the second electronic device is located, and the first AR model and the second AR model that are in the second real scenario. In addition, the expression and action of the first user (namely, a calling party) may be presented in the first AR model, and the expression and action of the second user (namely, a called party) may be presented in the second AR model. In this way, in a process in which the electronic device performs AR communication, an interactive service in the real scenario can be provided for the user, so that communication experience of the user can be improved.

With reference to the second aspect, in a possible design, the second electronic device may present first prompt information in response to the AR communication request information. The first prompt information is used to determine whether the second electronic device performs AR communication with the first electronic device. Then, the user determines whether to perform AR communication with the first electronic device. For example, the second electronic device may establish the AR communication link with the second electronic device in response to an operation (namely, a fifth operation) of agreeing to perform AR communication. The second electronic device may reject, in response to a sixth operation performed on the first prompt information, to establish the AR communication link with the first electronic device. The second electronic device may send first AR communication response information to the first electronic device in response to the fifth operation. The second electronic device may send second AR communication response information to the first electronic device in response to the sixth operation.

According to this solution, the second electronic device does not directly establish the AR communication link with the first electronic device in response to the AR communication request information, but determines, based on a willingness of the user, whether to perform AR communication with the first electronic device, so that communication experience of the user can be improved.

With reference to the second aspect, in another possible design, before displaying the first prompt information, the second electronic device may perform authentication on validity of the first electronic device. Specifically, the second electronic device may determine, in response to the AR communication request information, whether the first electronic device is valid. If the first electronic device is valid, the second electronic device presents the first prompt information. That the first electronic device is valid includes: a whitelist of the second electronic device stores device identification information of the first electronic device, or a blacklist of the second electronic device does not store device identification information of the first electronic device. The device identification information of the first electronic device includes a phone number of the first electronic device.

With reference to the second aspect, in another possible design, before the second electronic device receives the AR communication request information sent by the first electronic device, the second electronic device is performing voice communication or video communication with the first electronic device, and displays a graphical user interface of the voice communication or the video communication on the touchscreen.

The first electronic device initiates AR communication in a process of performing the voice communication or the video communication with the second electronic device, so that user experience of the voice communication or the video communication can be improved.

With reference to the second aspect, in another possible design, the AR application is installed in each of the first electronic device and the second electronic device. The AR communication request information is sent by the first electronic device to the second electronic device in the AR application.

With reference to the second aspect, in another possible design, the second electronic device includes a first camera (for example, a front-facing camera) and a second camera (for example, a rear-facing camera). The first electronic device includes a first camera (for example, a front-facing camera). The image of the second real scenario is an image collected by the second camera of the second electronic device; the expression and action of the first user are collected by the first camera of the first electronic device; and the expression and action of the second user are collected by the first camera of the second electronic device.

The second electronic device may receive, by using the AR communication link, behavior action information of the second user that is sent by the first electronic device. The behavior action information of the first user is used to represent changes of the expression and action of the first user. The behavior action information of the first user is collected by the first camera of the first electronic device. To be specific, according to the foregoing solution, the first user can control the expression and action of the first AR model displayed by the second electronic device, to improve communication experience of the user.

With reference to the second aspect, in another possible design, the second electronic device may alternatively send behavior action information of the first user to the first electronic device by using the AR communication link. The behavior action information of the second user is used to represent changes in the expression and action of the second user. The behavior action information of the second user is collected by the first camera of the second electronic device. In this way, the first electronic device may display, in a first real scenario based on the behavior action information of the second user, a dynamic image in which an expression and action of a second AR model (for example, a second AR model a) correspondingly change with the expression and action of the second user. To be specific, according to the foregoing solution, the second user can control the expression and action of the second AR model a displayed by the first electronic device, to improve communication experience of the user.

With reference to the second aspect, in another possible design, the first AR model is an AR model that is preset in the second electronic device for the first electronic device, and the second AR model is an AR model that is preset in the second electronic device for the second electronic device. For a method for setting the AR model in the second electronic device, refer to related descriptions in the possible design of the first aspect. Details are not described herein again in this embodiment of this application.

With reference to the second aspect, in another possible design, the first AR model and the second AR model each may be an AR model added by the second electronic device in response to a second operation. For a method for adding the AR model by the second electronic device in response to the second operation, refer to the method for adding the AR model by the first electronic device in response to the second operation. Details are not described herein again in this embodiment of this application. In a process in which the second electronic device adds the AR model in response to the second operation, AR communication interfaces displayed by the second electronic device include a second AR communication interface b, a third AR communication interface b, and the first AR communication interface. The second AR communication interface b includes the image of the second real scenario, but does not include the first AR model b or the second AR model b. The third AR communication interface b includes the image of the second real scenario and the first AR model b, but does not include the second AR model b.

With reference to the second aspect, in another possible design, in a process in which the second electronic device performs AR communication with the first electronic device, the second electronic device may change an AR model at any time based on an operation of the user, and display an AR model that meets a preference of the user, so that communication experience of the user can be improved. For a method for changing the AR model by the second electronic device in the AR communication process, refer to the method for changing the AR model by the first electronic device in the AR communication process. Details are not described herein again in this embodiment of this application.

With reference to the second aspect, in another possible design, in a process in which the second electronic device performs AR communication with the first electronic device, the second electronic device may start, in response to a third operation (namely, a recording operation) on the touchscreen, to record video data obtained when the first electronic device performs AR communication with the second electronic device.

After recording the video, the second electronic device may send the video data to another electronic device, so that a user of the other electronic device can learn and understand content related to current communication. Alternatively, the second electronic device may upload the video data to a public network platform, so that more users can learn and understand content related to current communication.

With reference to the second aspect, in another possible design, the image of the second real scenario correspondingly changes with framing content of the second camera of the first electronic device. In this way, the image of the real scenario that is displayed by the second electronic device may change in real time as the second electronic device moves, to improve communication experience of the user in the real scenario.

With reference to the second aspect, in another possible design, a location of the first AR model in the second real scenario is different from a location of the second AR model in the second real scenario. The second electronic device may display, in response to a drag operation performed on the first AR model on the touchscreen, a dynamic image in which the first AR model moves along a track corresponding to the drag operation in the first real scenario.

With reference to the second aspect, in another possible design, after displaying the first AR communication interface on the touchscreen, the second electronic device may display contact information of the second user in response to a fourth operation performed on the second AR model on the touchscreen. For a method for displaying the contact information by the second electronic device, refer to the method for displaying the contact information by the first electronic device. Details are not described herein again in this embodiment of this application.

With reference to the second aspect, in another possible design, after the second electronic device displays the first AR communication interface on the touchscreen, the second electronic device may recognize voice data collected by a microphone of the second electronic device and voice data obtained by converting an audio electrical signal from the first electronic device; and the second electronic device displays a text of the recognized voice data on the touchscreen. In other words, the second electronic device may display, in the AR communication interface, the text (namely, a subtitle) of the voice data obtained through AR communication. The second electronic device displays the text of the voice data obtained through AR communication, and therefore may visually present, to the user, content exchanged between the two users in a process in which the first electronic device performs AR communication with the second electronic device.

With reference to the second aspect, in another possible design, when recognizing voice data corresponding to a text and a preset text, the second electronic device displays, on the touchscreen, a dynamic image in which the first AR model and the second AR model perform actions corresponding to the preset text. The second electronic device may store a plurality of preset texts and actions corresponding to the preset texts. For example, a preset text "hello" corresponds to an action "handshake". A preset text "goodbye" corresponds to an action "wave". The first AR model and the second AR model interact with each other based on the voice data of the two users, so that content displayed in the AR communication interface is closer to a picture of face-to-face communication between the users in the real scenario, to improve a sense of reality of AR communication and improve communication experience of the user.

According to a third aspect, an embodiment of this application provides an electronic device, and the electronic device is a first electronic device. The electronic device may include a processor, a memory, a touchscreen, and a communications interface. The memory, the touchscreen, and the communications interface are coupled to the processor. The memory is configured to store computer program code, and the computer program code includes a computer instruction. When the processor executes the computer instruction, the processor is configured to receive a first operation of a user; the communications interface is configured to: send augmented reality AR communication request information to a second electronic device in response to the first operation, where the AR communication request information is used to request to perform AR communication with the second electronic device; and establish an AR communication link with the second electronic device; and the touchscreen is configured to display a first AR communication interface in an AR communication process, where the first AR communication interface includes an image of a first real scenario, and a first AR model and a second AR model that are in the first real scenario.

The first real scenario is a real scenario in which the first electronic device is located; the first AR model is an AR model of a first user corresponding to the first electronic device, and the second AR model is an AR model of a second user corresponding to the second electronic device; and in the AR communication process, the first AR model displayed by the touchscreen makes a corresponding expression and action based on an expression and action of the first user that are obtained by the first device, and the second AR model displayed by the touchscreen makes a corresponding expression and action based on an expression and action of the second user that are obtained by the first device.

With reference to the third aspect, in another possible design, the processor is further configured to: before the communications interface sends the AR communication request information to the second electronic device, perform voice communication or video communication with the second electronic device. The touchscreen is further configured to display a graphical user interface of the voice communication or the video communication.

The first operation is a first preset gesture entered on the graphical user interface of the voice communication or the video communication on the touchscreen; or the graphical user interface of the voice communication or the video communication includes an AR communication button, and the first operation is a tap operation performed on the AR communication button on the touchscreen; or the first operation is a tap operation performed on a first preset button in a process of the voice communication or the video communication, and the first preset button is a physical button of the first electronic device.

With reference to the third aspect, in another possible design, an AR application is installed in each of the electronic device and the second electronic device, and the AR application is a client used to provide an AR communications service. The memory stores information about the AR application. The touchscreen is further configured to: before the communications interface sends the AR communication request information to the second electronic device, display, by the first electronic device, an AR application interface in response to a tap operation performed on an application icon of the AR application, where the AR application interface includes at least one contact option, and the at least one contact option includes a contact option corresponding to the second electronic device; and the first operation is a tap operation performed by the first user on the contact option corresponding to the second electronic device.

With reference to the third aspect, in another possible design, the first AR model is an AR model that is preset in the electronic device for the first electronic device, and the second AR model is an AR model that is preset in the electronic device for the second electronic device.

With reference to the third aspect, in another possible design, that the touchscreen displays a first AR communication interface includes: the touchscreen displays a second AR communication interface in response to establishing the AR communication link, where the second AR communication interface includes the image of the first real scenario, but does not include the first AR model and the second AR model; the touchscreen displays a model selection interface in response to a second operation performed on the second AR communication interface on the touchscreen, where the model selection interface includes a plurality of model options, and each model option corresponds to one AR model; the touchscreen displays a third AR communication interface in response to a first selection operation performed on a first model option in the plurality of model options on the touchscreen, where the third AR communication interface includes the image of the first real scenario and the second AR model corresponding to a second model option, but does not include the first AR model; the touchscreen displays the model selection interface in response to the second operation performed on the third AR communication interface on the touchscreen; and the touchscreen displays the first AR communication interface in response to a second selection operation performed on the second model option in the plurality of model options on the touchscreen, where the first AR communication interface includes the image of the first real scenario, the second AR model, and the first AR model corresponding to the first model option.

With reference to the third aspect, in another possible design, the electronic device further includes a first camera and a second camera, and the second electronic device includes a first camera. The processor is further configured to enable the first camera and the second camera of the first electronic device in response to establishing the AR communication link, where the second camera of the first electronic device is configured to collect the image of the first real scenario, and the first camera of the first electronic device is configured to collect the expression and action of the first user.

With reference to the third aspect, in another possible design, the touchscreen is further configured to: after displaying the first AR communication interface, display the model selection interface in response to a tap operation performed on the first AR model on the touchscreen, where the model selection interface includes the plurality of model options, and each model option corresponds to one AR model; and display, by the touchscreen in response to a tap operation performed on a third model option in the plurality of model options on the touchscreen, an AR communication interface in which the first AR model on the first AR communication interface is changed to a third AR model corresponding to the third model option.

With reference to the third aspect, in another possible design, the processor is further configured to: after the touchscreen displays the first AR communication interface, start, in response to a third operation on the touchscreen, to record video data obtained when the first electronic device performs AR communication with the second electronic device.

With reference to the third aspect, in another possible design, the touchscreen is further configured to: after the touchscreen displays the first AR communication interface, display contact information of the second user in response to a fourth operation performed on the second AR model on the touchscreen, where the contact information includes at least one of a phone number, an email address, or a profile picture of the second user.

With reference to the third aspect, in another possible design, the processor is further configured to: after the touchscreen displays the first AR communication interface, recognize voice data collected by a microphone of the first electronic device and voice data obtained by converting an audio electrical signal from the second electronic device. The touchscreen is further configured to display a text of the voice data recognized by the processor.

With reference to the third aspect, in another possible design, the touchscreen is further configured to: when the processor recognizes voice data corresponding to a text and a preset text, display a dynamic image in which the first AR model and the second AR model perform actions corresponding to the preset text.

According to a fourth aspect, an embodiment of this application provides an electronic device, and the electronic device is a second electronic device. The electronic device includes a processor, a memory, a touchscreen, and a communications interface. The memory, the touchscreen, and the communications interface are coupled to the processor. The memory is configured to store computer program code, and the computer program code includes a computer instruction. When the processor executes the computer instruction, the communications interface is configured to receive augmented reality AR communication request information sent by a first electronic device, where the AR communication request information is used to request to perform AR communication with the second electronic device; the processor is configured to establish an AR communication link with the first electronic device in response to the AR communication request information; and the touchscreen is configured to display a first AR communication interface in an AR communication process, where the first AR communication interface includes an image of a second real scenario, and a first AR model and a second AR model that are in the second real scenario.

The second real scenario is a real scenario in which the second electronic device is located; the first AR model is an AR model of a first user corresponding to the first electronic device, and the second AR model is an AR model of a second user corresponding to the second electronic device; and in the AR communication process, the first AR model displayed by the touchscreen makes a corresponding expression and action based on an expression and action of the first user that are obtained by the second device, and the second AR model displayed by the touchscreen makes a corresponding expression and action based on an expression and action of the second user that are obtained by the second device.

With reference to the fourth aspect, in a possible design, the processor is further configured to: present first prompt information in response to the AR communication request information, where the first prompt information is used to determine whether the second electronic device performs AR communication with the first electronic device; and establish the AR communication link with the second electronic device in response to an operation that a user agrees to perform AR communication on the touchscreen.

With reference to the fourth aspect, in another possible design, that the processor is configured to present first prompt information in response to the AR communication request information includes: the processor is configured to: determine, in response to the AR communication request information, whether the first electronic device is valid; and present the first prompt information if the first electronic device is valid. That the first electronic device is valid includes: a whitelist of the second electronic device stores device identification information of the first electronic device, or a blacklist of the second electronic device does not store device identification information of the first electronic device; the device identification information of the first electronic device includes a phone number of the first electronic device; and the whitelist and the blacklist of the second electronic device are stored in the memory.

With reference to the fourth aspect, in another possible design, the processor is further configured to: before the communications interface receives the AR communication request information, perform voice communication or video communication with the first electronic device. The touchscreen is further configured to display a graphical user interface of the voice communication or the video communication.

With reference to the fourth aspect, in another possible design, the first AR model displayed by the touchscreen is an AR model that is preset in the electronic device for the first electronic device, and the second AR model displayed by the touchscreen is an AR model that is preset in the electronic device for the second electronic device.

With reference to the fourth aspect, in another possible design, that the touchscreen is configured to display a first AR communication interface includes: the touchscreen displays a second AR communication interface in response to establishing the AR communication link, where the second AR communication interface includes the image of the second real scenario, but does not include the first AR model and the second AR model; the touchscreen displays a model selection interface in response to a second operation performed on the second AR communication interface on the touchscreen, where the model selection interface includes a plurality of model options, and each model option corresponds to one AR model; the touchscreen displays a third AR communication interface in response to a first selection operation performed on a first model option in the plurality of model options on the touchscreen, where the third AR communication interface includes the image of the second real scenario and the first AR model corresponding to the first model option, but does not include the second AR model; the touchscreen displays the model selection interface in response to the second operation performed on the third AR communication interface on the touchscreen; and the touchscreen displays the first AR communication interface in response to a second selection operation performed on a second model option in the plurality of model options on the touchscreen, where the first AR communication interface includes the image of the second real scenario, the first AR model, and the second AR model corresponding to the second model option.

With reference to the fourth aspect, in another possible design, the electronic device includes a first camera and a second camera, and the first electronic device includes a first camera. The processor is further configured to enable the first camera and the second camera of the electronic device in response to establishing the AR communication link, where the second camera of the electronic device is configured to collect the image of the second real scenario, and the first camera of the electronic device is configured to collect the expression and action of the second user.

With reference to the fourth aspect, in another possible design, the touchscreen is further configured to: after displaying the first AR communication interface, display the model selection interface in response to a tap operation performed on the first AR model on the touchscreen, where the model selection interface includes the plurality of model options, and each model option corresponds to one AR model; and display, by the touchscreen in response to a tap operation performed on a third model option in the plurality of model options on the touchscreen, an AR communication interface in which the first AR model on the first AR communication interface is changed to a third AR model corresponding to the third model option.

With reference to the fourth aspect, in another possible design, the processor is further configured to: after the touchscreen displays the first AR communication interface, start, in response to a third operation on the touchscreen, to record video data obtained when the second electronic device performs AR communication with the first electronic device.

With reference to the fourth aspect, in another possible design, the touchscreen is further configured to: after displaying the first AR communication interface, display contact information of the first user in response to a fourth operation performed on the first AR model on the touchscreen, where the contact information includes at least one of a phone number, an email address, or a profile picture of the first user.

With reference to the fourth aspect, in another possible design, the processor is further configured to: after the touchscreen displays the first AR communication interface, recognize voice data collected by a microphone of the second electronic device and voice data obtained by converting an audio electrical signal from the first electronic device. The touchscreen is further configured to display a text of the voice data recognized by the processor.

With reference to the fourth aspect, in another possible design, the touchscreen is further configured to: when the processor recognizes voice data corresponding to a text and a preset text, display a dynamic image in which the first AR model and the second AR model perform actions corresponding to the preset text.

According to a fifth aspect, an embodiment of this application provides a computer storage medium. The computer storage medium includes a computer instruction, and when the computer instruction is run on an electronic device, the electronic device is enabled to perform the augmented reality communication method according to any one of the first aspect or the second aspect and the possible designs of the first aspect or the second aspect.

According to a sixth aspect, an embodiment of this application provides a computer program product. When the computer program product is run on a computer, the computer is enabled to perform the augmented reality communication method according to any one of the first aspect or the second aspect and the possible designs of the first aspect or the second aspect.

In addition, for technical effects brought by the electronic device according to any one of the third aspect or the fourth aspect and the designs of the third aspect or the fourth aspect, technical effects brought by the computer storage medium according to the fifth aspect, and technical effects brought by the computer program product according to the sixth aspect, refer to the technical effects brought by the first aspect and the different designs of the first aspect. Details are not described herein again.

BRIEF DESCRIPTION OF DRAWINGS

FIG. 9B-1, FIG. 9B-2, and FIG. 9B-3 are a flowchart of an augmented reality communication method according to another embodiment;

FIG. 9C-1 and FIG. 9C-2 are a schematic diagram of an instance of AR communication according to another embodiment;

FIG. 20A and FIG. 20B are a flowchart of an augmented reality communication method according to another embodiment;

FIG. 21A and FIG. 21B are a flowchart of an augmented reality communication method according to another embodiment.

DESCRIPTION OF EMBODIMENTS

Terms used in the embodiments of this application are merely intended to describe specific embodiments, but are not intended to limit this application. The terms "one", "a", "the", "the foregoing", and "this" of singular forms used in this specification and the appended claims of this application are also intended to include plural forms, unless otherwise specified in the context clearly. It should be further understood that the term "and/or" used in this application indicates and includes any or all possible combinations of one or more associated listed items. An electronic device in the following embodiments may be a portable computer (for example, a mobile phone), a notebook computer, a personal computer (PC), a wearable electronic device (for example, a smartwatch, smart glasses, or a smart helmet), a tablet computer, an AR/virtual reality (VR) device, an in-vehicle computer, or the like. A specific form of the electronic device is not specially limited in the following embodiments.

An AR technology is a technology that can be used to add a virtual object to a real scenario to implement virtual-reality integration and interaction in the real scenario. The AR technology in the embodiments of this application may include a multi-camera-based AI technology. For example, the AR technology may include an AR technology based on a front-facing camera and an AR technology based on a rear-facing camera.

The AR technology based on the front-facing camera means that the electronic device may enable a front-facing camera to collect facial features of a user and generate a three-dimensional face model; add, to an AR scenario, an AR model (for example, an emoji model) pre-stored in the electronic device; and establish a mapping relationship between the three-dimensional face model and the AR model, to implement control of the AR model by using a facial expression and a body action of the user.

The AR technology based on the rear-facing camera means that the electronic device may enable a rear-facing camera to collect an image of a real scenario, and display, on a touchscreen, the image of the real scenario that is collected by the rear-facing camera; add an AR model to the real scenario displayed on the touchscreen; detect a location change and a motion parameter of the electronic device in real time by using a sensor in the electronic device, and calculate, based on the detected parameter, a coordinate change of the AR model in the real scenario displayed on the touchscreen; and implement interaction with the AR model in the real scenario based on the calculated coordinate change. Alternatively, the electronic device may implement interaction with the AR model in the real scenario in response to an operation (for example, a drag operation or a tap operation) performed by a user on the AR model displayed on the touchscreen.

Figure 1:
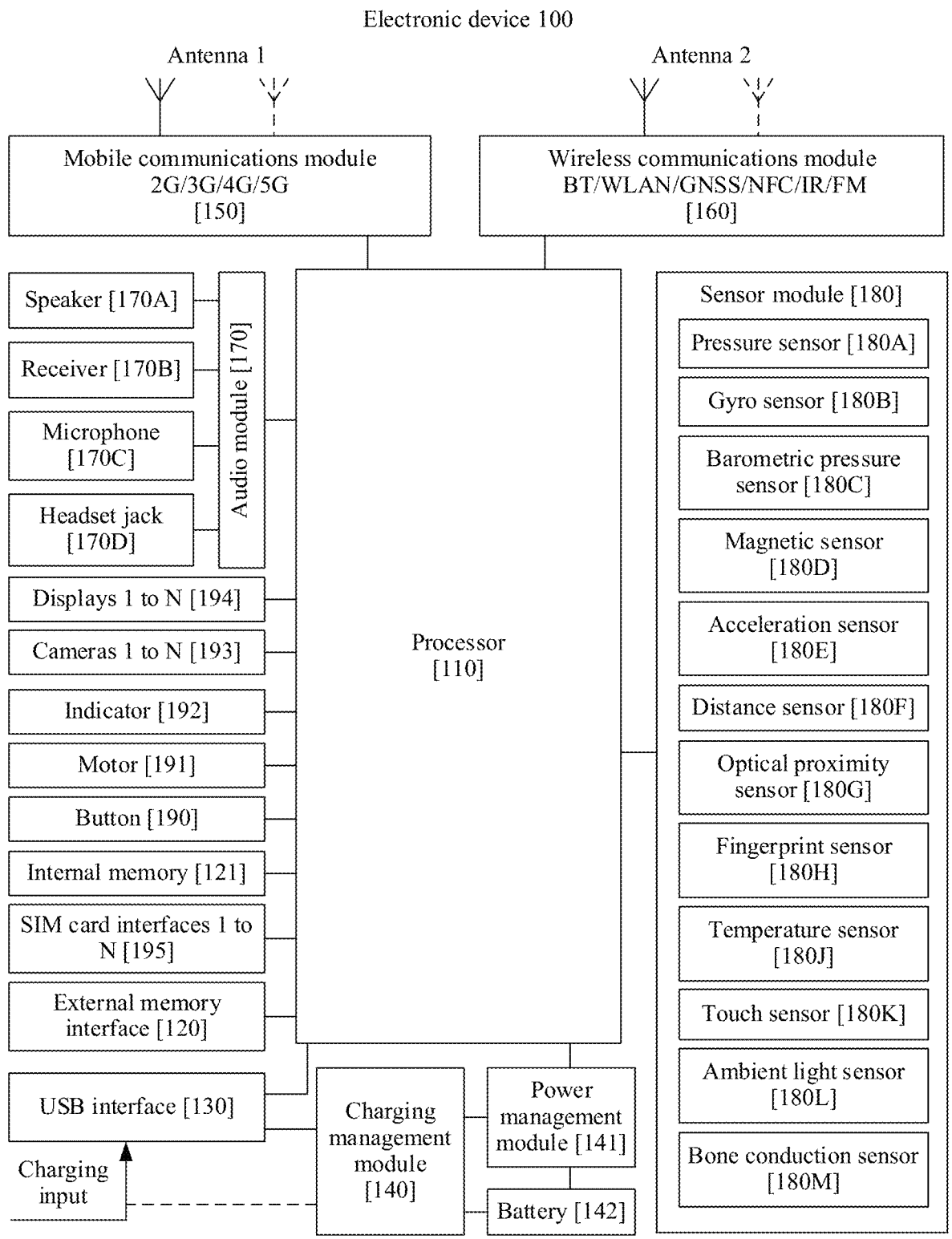
FIG. 1 is a schematic structural diagram of an electronic device according to an embodiment.

FIG. 1 is a schematic structural diagram of an electronic device 100 according to an embodiment. The electronic device 100 is the electronic device 200 or an electronic device 300 in this embodiment. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The camera 193 may include a first camera and a second camera. For example, the first camera may be a front-facing camera, and the second camera may be a rear-facing camera.

The first camera in the following embodiments may be a structured light camera, also referred to as a point cloud depth camera or a 3D structured light camera. The structured light camera may collect a facial feature point cloud, and the facial feature point cloud may form a 3D image of a face.

Figure 8:
FIG. 8 is a schematic diagram of an instance of a facial feature point cloud according to an embodiment.

An image presented on the electronic device (for example, a mobile phone) is usually a two-dimensional image. A depth corresponding to each location in the two-dimensional image cannot be displayed in the image. When collecting the 3D image, the structured light camera obtains both a color of each location in the image and a depth of each location. A principle of structured light is that an invisible grating is emitted through a light source to form a stripe or an image with a feature, and then corresponding three-dimensional image data is reversely obtained through calculation based on distribution and a warping degree of a pattern, for example, a three-dimensional face model. For example, as shown in FIG. 8, the structured light camera may collect a facial feature point cloud 802 of a user 801. The facial feature point cloud 802 may represent facial contour information of the user 801. The electronic device 100 may construct a three-dimensional face model of the user 801 by using the facial feature point cloud 802. In the following embodiments, collection of depth information of each location in an image is not limited to the structured light camera. The electronic device 100 may alternatively estimate depth information of each location in an image based on an optical camera by using an algorithm such as deep learning.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in this embodiment does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent devices, or may be integrated into one or more processors.

The controller may be a nerve center and a command center of the electronic device 100, and is a decision maker that directs each component in the electronic device 100 to coordinate work according to an instruction. The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 by using the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 by using a PCM bus interface. In some embodiments, the audio module 170 may also transmit an audio signal to the wireless communications module 160 by using the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transmit an audio signal to the wireless communications module 160 by using the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (display serial interface, DSI), and the like. In some embodiments, the processor 110 communicates with the camera 193 by using the CSI interface, to implement a photographing function of the electronic device 100. The processor 110 communicates with the display 194 by using the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to perform data transmission between the electronic device 100 and a peripheral device, or may be configured to connect to a headset to play audio by using the headset. The interface may be further configured to connect to another electronic device, for example, an AR device.

It may be understood that an interface connection relationship between the modules that is shown in this embodiment is merely an example for description, and does not constitute a limitation on a structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger by using the USB interface 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (an electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to: transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation by using the antenna 1. In some embodiments, at least some functional modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communications module 150 or another function module.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communications module 160 may be one or more components integrating at least one communications processor module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS)), and/or a satellite based augmentation system (SBAS).

The electronic device 100 implements a display function by using the GPU, the display 194, the application processor, and the like. The GPU is a microprocessor for image processing, and connects the display 194 to the application processor. The GPU is configured to perform: mathematical and geometric calculation, and render an image. The processor 110 may include one or more GPUs, which execute a program instruction to generate or change display information.

The display 194 is configured to display an image, a video, and the like. The display 194 includes a display panel. The display panel may be a liquid crystal display (LCD), an organic light-emitting diode (OLED), an active-matrix organic light emitting diode or an active-matrix organic light emitting diode (AMOLED), a flexible light-emitting diode (FLED), a mini LED, a micro LED, a micro OLED, a quantum dot light emitting diode (QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of a camera through a lens, and an optical signal is converted into an electrical signal. The light-sensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the light-sensitive element. The light-sensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal. In addition to a digital image signal, the digital signal processor may further process another digital signal. For example, when the electronic device 100 selects a frequency, the digital signal processor is configured to perform Fourier transform on frequency energy and the like.

The video codec is configured to compress or decompress a digital video. The electronic device 100 may support one or more types of video codecs. In this way, the electronic device 100 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external memory card, for example, a micro SD card, to extend a storage capability of the electronic device 100. The external storage card communicates with the processor 110 by using the external memory interface 120, to implement a data storage function. For example, files such as music and a video are stored in the external memory card.

The internal memory 121 may be configured to store computer executable program code, where the executable program code includes an instruction. The processor 110 may run the instruction stored in the internal memory 121, so that the electronic device 100 is enabled to perform various function applications and data processing of the electronic device 100. The internal memory 121 may include a program storage area and a data storage area. The program storage region may store an operating system, an application program required by at least one function (for example, a sound playing function or an image playing function), and the like. The data storage area may store data (for example, audio data or an address book) created during use of the electronic device 100, and the like. In addition, the internal memory 121 may include a high-speed random access memory, and may further include a nonvolatile memory, for example, at least one magnetic disk storage device, a flash memory device, or a universal flash storage (UFS).

The electronic device 100 may implement an audio function, for example, music playback and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, and further identify a sound source, implement a directional recording function, and the like.

The headset jack 170D is configured to connect to a wired headset. The headset jack 170D may be a USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to an application such as switching between landscape orientation and portrait orientation or a pedometer.

The distance sensor 180F is configured to measure a distance. The electronic device 100 may measure the distance in an infrared or a laser manner. In some embodiments, in a photographing scenario, the electronic device 100 may measure a distance by using the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally because of a low temperature. In some other embodiments, when the temperature is less than still another threshold, the electronic device 100 boosts an output voltage of the battery 142 to avoid abnormal shutdown caused by a low temperature.

The touch sensor 180K may also be referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation on or near the touch sensor 180K. The touch sensor may transmit the detected touch operation to the application processor to determine a type of the touch event. A visual output related to the touch operation may be provided by using the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may further be compatible with different types of SIM cards. The SIM card interface 195 may further be compatible with an external storage card. The electronic device 100 interacts with a network by using the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

Figure 2:
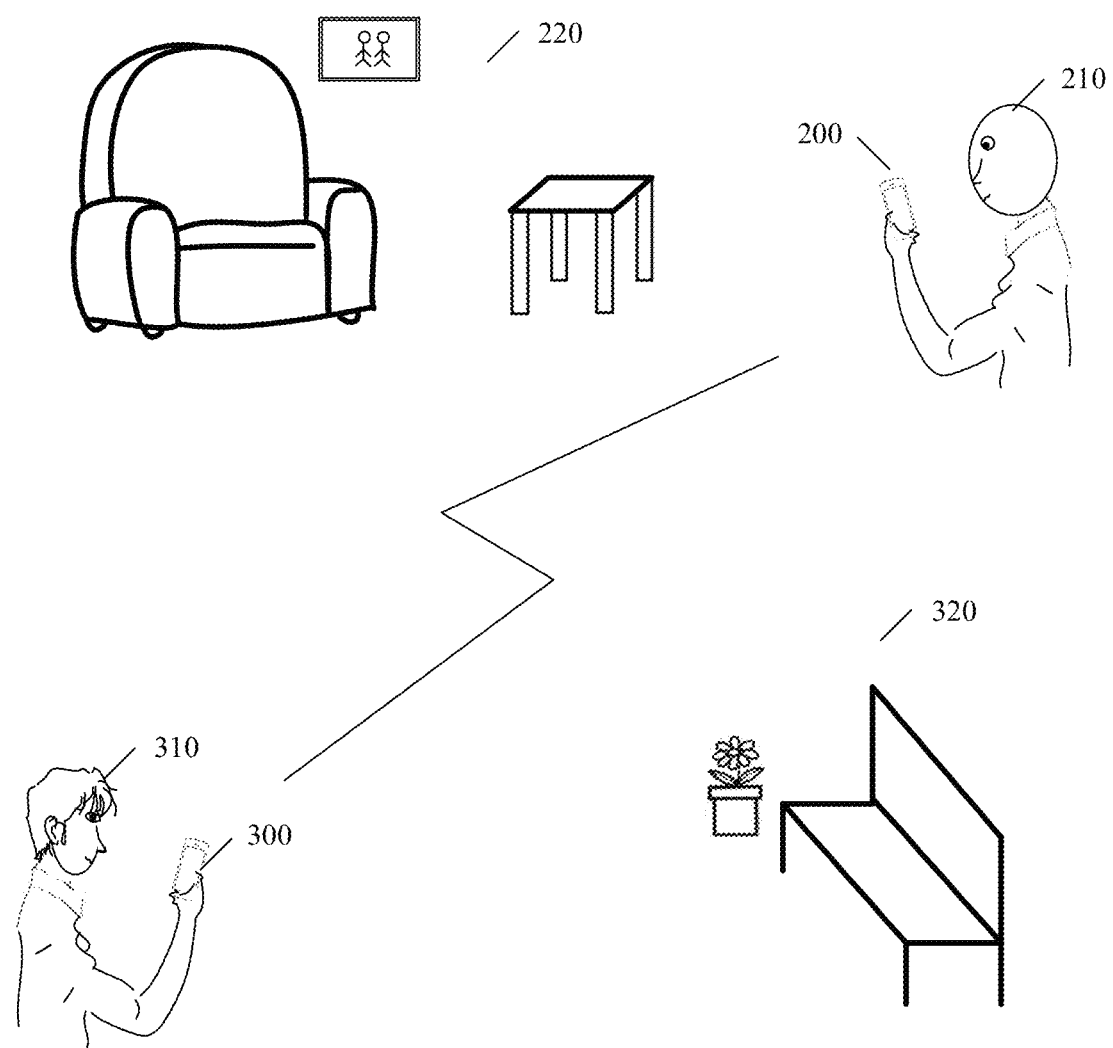
FIG. 2 is a schematic diagram of an instance of a communication scenario to which an augmented reality communication method is applied according to an embodiment.

FIG. 2 is a schematic diagram of an instance of a communication scenario to which an augmented reality communication method is applied according to an embodiment. A first electronic device (for example, an electronic device 200) and a second electronic device (for example, an electronic device 300) each include a first camera (for example, a front-facing camera), a second camera (for example, a rear-facing camera), and a touchscreen. For structures of the electronic device 200 and the electronic device 300, refer to descriptions of the electronic device 100 shown in FIG. 1 in the embodiments of this application. Details are not described again in the following embodiments.

As shown in FIG. 2, a first user (for example, a user 210) performs, by using the electronic device 200, wireless communication with a second user (for example, a user 310) that uses the electronic device 300. A scenario 220 shown in FIG. 2 is a real scenario in which the user 210 uses the electronic device 200, namely, a first real scenario. A scenario 320 shown in FIG. 2 is a real scenario in which the user 310 uses the electronic device 300, namely, a second real scenario.

Communication between the electronic device 200 and the electronic device 300 may be voice communication or video communication. For example, the electronic device 200 may invoke a "Phone" application or a third-party communications application (for example, WeChat or QQ) to perform voice communication or video communication with the electronic device 300. For another example, an application (denoted as an AR application) used to support the electronic device in performing AR communication may be installed in each of the electronic device 200 and the electronic device 300. The electronic device 200 may invoke the AR application to perform AR communication with the electronic device 300.

Figure 3A:
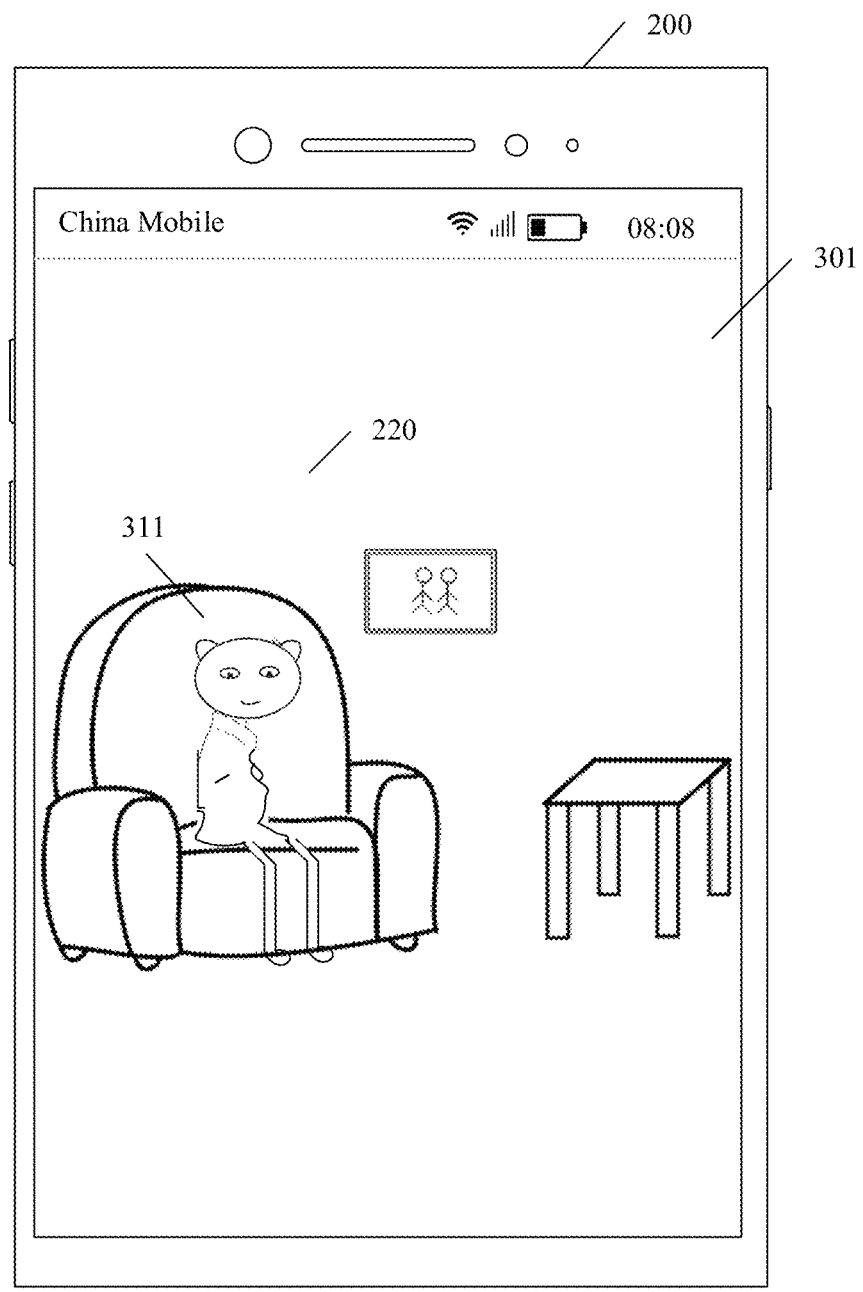
FIG. 3A to FIG. 3D are schematic diagrams of instances of AR communication interfaces according to another embodiment.

In an embodiment, in a process in which the electronic device 200 communicates with the electronic device 300, the second camera (denoted as a second camera a, for example, a rear-facing camera a) in the electronic device 200 may collect an image of the scenario 220. The electronic device 200 may display, on the touchscreen or another display apparatus, an AR communication interface 301 shown in FIG. 3A. As shown in FIG. 3A, the electronic device 200 may add an AR model (namely, a second AR model a, for example, an AR model 311) of the user 310 to a specific location in the AR communication interface 301.

Figure 3B:
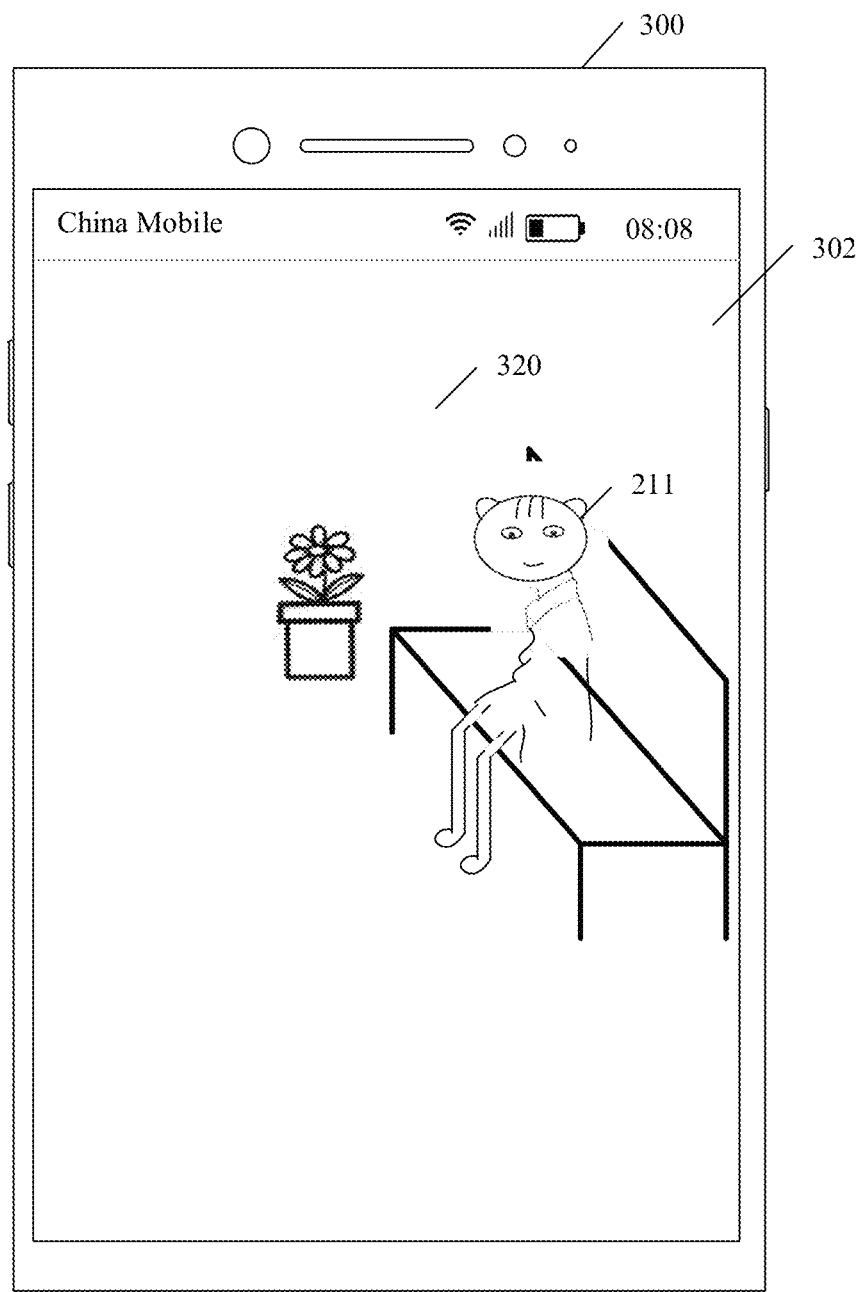

In a process in which the electronic device 300 communicates with the electronic device 200, the second camera (denoted as a second camera b, for example, a rear-facing camera b) in the electronic device 300 may collect an image of the scenario 320 of the user 310. The electronic device 300 displays, on the touchscreen or another display apparatus, an AR communication interface 302 shown in FIG. 3B. As shown in FIG. 3B, the electronic device 300 may add an AR model (namely, a first AR model b, for example, an AR model 211) of the user 210 to a specific location in the AR communication interface 302. The AR model 211 may perform a corresponding behavior action based on information about a behavior action (for example, a facial expression or a body action) of the user 210.

The AR model 311 may perform a corresponding behavior action based on a behavior action (for example, a facial expression or a body action) of the user 310. For example, the first camera (denoted as a first camera b, for example, a front-facing camera b) in the electronic device 300 may collect behavior action information (for example, facial feature information or body action information) of the user 310. The facial feature information is used to represent changes of a facial expression and an action of the user. The body action information may be used to represent a change of a body action of the user. The electronic device 200 may receive the behavior action information of the user 310 that is sent by the electronic device 300, and may control the facial expression and the body action of the AR model 311 based on the behavior action information of the user 310.

To be specific, the electronic device 200 may display a dynamic image in which the AR model 311 has a conversation with the user 210 in the scenario 220 in which the user 210 is located. In addition, the facial expression and the body action of the AR model 311 may correspondingly change with the facial expression and the body action of the user 310. In other words, the electronic device 200 may provide the user 210 with real experience of a conversation between the user 310 and the user 210 in the scenario 220.

The AR model 211 may perform a corresponding behavior action based on a behavior action (for example, a facial feature or a body action) of the user 210. For example, the first camera (denoted as a first camera a, for example, a front-facing camera a) in the electronic device 200 may collect behavior action information (for example, facial feature information or body action information) of the user 210. The electronic device 300 may receive the behavior action information of the user 210 that is sent by the electronic device 200, and control the facial expression and the body action of the AR model 211 based on the behavior action information of the user 210.

To be specific, the electronic device 300 may display a dynamic image in which the AR model 211 has a conversation with the user 310 in the scenario 320 in which the user 310 is located. In addition, the facial expression and the body action of the AR model 211 may correspondingly change with the facial expression and the body action of the user 210. In other words, the electronic device 300 may provide the user 310 with real experience of a conversation between the user 210 and the user 310 in the scenario 320. Therefore, in the method, user experience is improved.

In another embodiment, the electronic device 200 may further display a dynamic image in which the AR model 311 has a face-to-face conversation with an AR model (namely, a first AR model a, for example, an AR model 212) of the user 210 in the scenario 220. Specifically, the electronic device 200 may not only add the AR model 311 to an AR communication interface 303 shown in FIG. 3C, but also add the AR model 212 to the AR communication interface 303 shown in FIG. 3C. For example, the electronic device 200 may control a facial expression and a body action of the AR model 212 based on the behavior action information of the user 210 that is collected by the front-facing camera a. In other words, the facial expression and the body action of the AR model 212 correspondingly change with the facial expression and the body action of the user 210.

The electronic device 300 may further display a dynamic image in which an AR model (namely, a second AR model b, for example, an AR model 312) of the user 310 has a conversation with the AR module 211 in the scenario 320. Specifically, the electronic device 300 may not only add the AR model 211 to an AR communication interface 304 shown in FIG. 3D, but also add the AR model 312 to the AR communication interface 304 shown in FIG. 3D. The electronic device 300 controls the facial expression and the body action of the AR model 211 based on the behavior action information of the user 210 that is received from the electronic device 200. The electronic device 300 may control a facial expression and a body action of the AR model 312 based on the behavior action information of the user 310 that is collected by the front-facing camera b. In other words, the facial expression and the body action of the AR model 312 correspondingly change with the facial expression and the body action of the user 310.

It can be learned from the foregoing descriptions that the electronic device 200 may provide the user 210 with real experience of a conversation with the user 310 in the scenario 220. The electronic device 300 may also provide the user 310 with real experience of a conversation with the user 310 in the scenario 320.

In some embodiments, the electronic device 200 may record, in response to a recording operation of the user, video data (recorded as video data 1) including the AR model 311 and the AR model 212 in a process in which the electronic device 200 performs voice communication or video communication with the electronic device 300. Similarly, the electronic device 300 may record, in response to a recording operation of the user, video data (recorded as video data 2) including the AR model 312 and the AR model 211 in a process in which the electronic device 300 performs voice communication or video communication with the electronic device 200. For example, the electronic device 200 shares the video data 1 with another user. The electronic device 200 may send the video data 1 to another electronic device, so that a user of the other electronic device can learn and understand content related to current communication. Alternatively, the electronic device 200 may upload the video data 1 to a public network platform, so that more users can learn and understand content related to current communication.

It should be noted that the AR model in this embodiment may be an AR model of a cartoon character or a real AR model of a user. The AR model of the cartoon character may be an AR model downloaded by the electronic device from a server (for example, an AR server). The real AR model of the user may be an AR model constructed by the electronic device based on feature information (for example, facial feature information and body feature information) of the user. The facial feature information of the user may include a facial feature point cloud of the user and a facial image of the user. The body feature information of the user may include a body feature point cloud of the user and a body image of the user. A "body" in this embodiment of this application includes a body part other than a head in a user's body. For example, the electronic device 200 constructs a real AR model of the user 210. The electronic device 200 may collect facial feature information of the user 210 and a facial image of the user, and body feature information and a body image of the user by using the front-facing camera a or the rear-facing camera a, then construct a 3D model (namely, the real AR model of the user 210) of the user 210 based on the collected information, and store the 3D model. The electronic device 200 may also construct a 3D face model of the user 210 based on the facial feature information of the user and the facial image of the user.

Figure 3C:
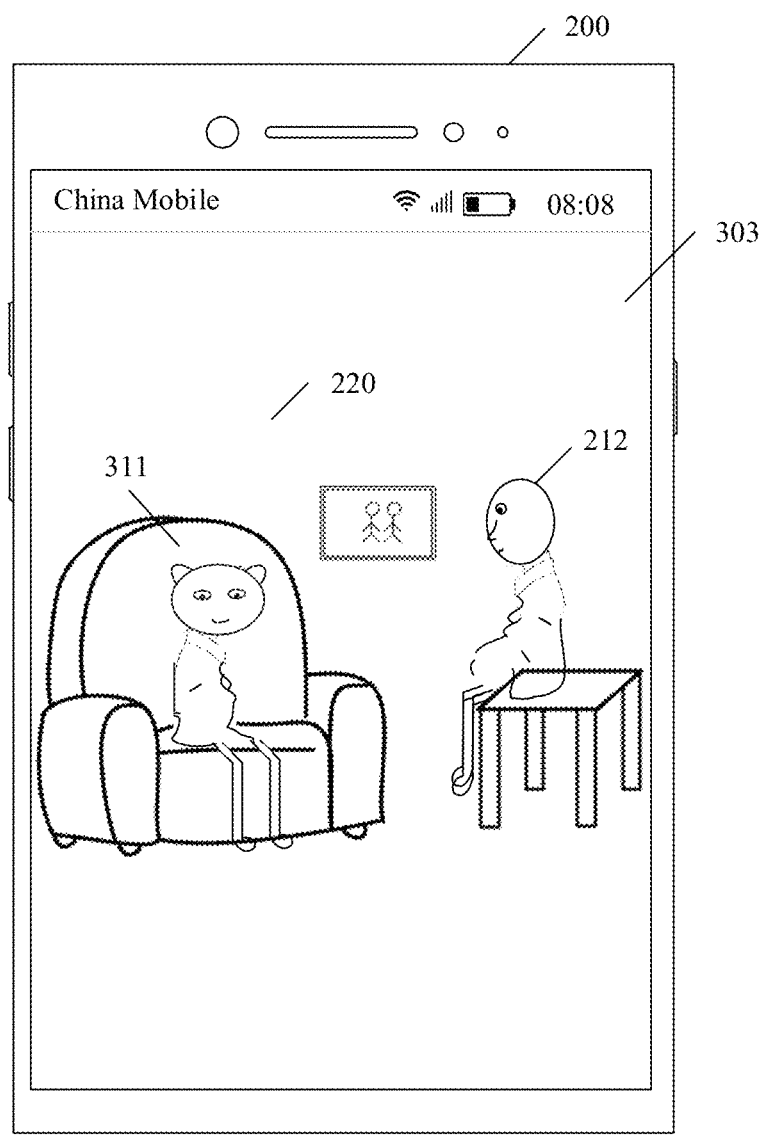
Figure 3D:
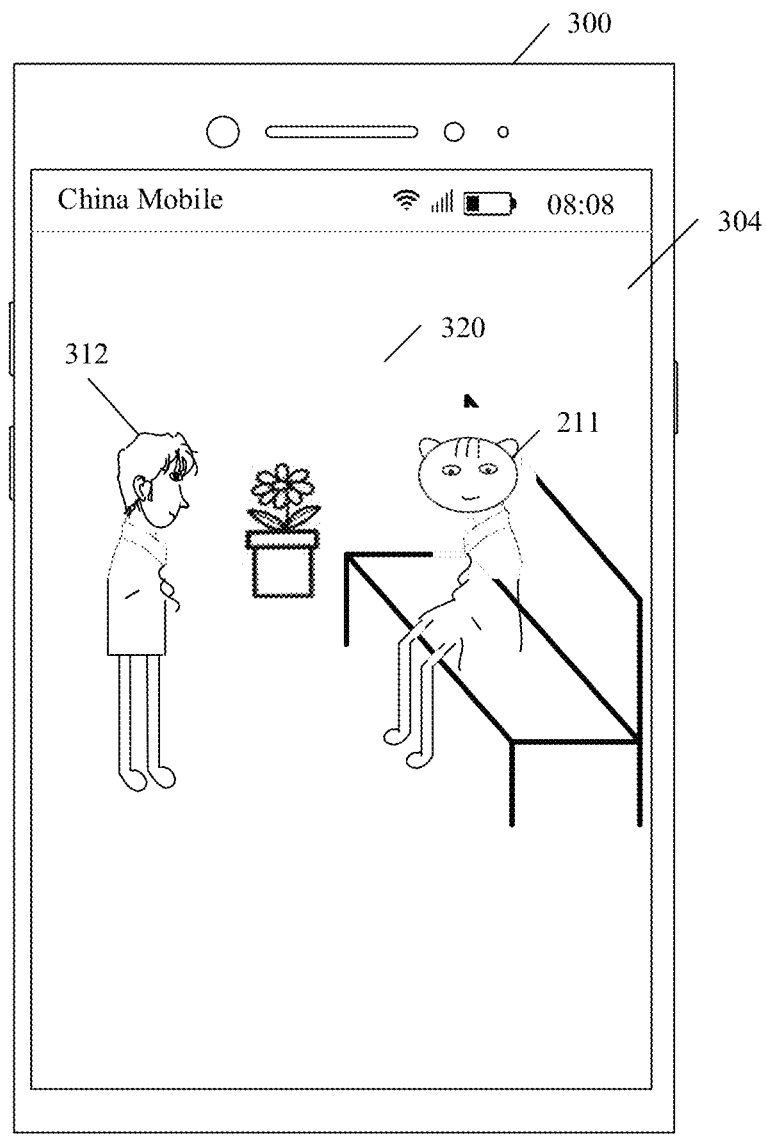

For example, the AR model 311 shown in FIG. 3A and FIG. 3C, and the AR model 211 shown in FIG. 3B and FIG. 3D each are the AR model of the cartoon character. The AR model 212 shown in FIG. 3C is the real AR model of the user 210, and the AR model 312 shown in FIG. 3D is a real AR model of the user 310.

In this embodiment of this application, for a method in which the electronic device collects the feature information of the user by using the camera (the first camera or the second camera), refer to a prior-art method in which an electronic device collects feature information of a user by using a camera. Details are not described herein in this embodiment of this application. For a specific method in which the electronic device constructs the 3D model (namely, the AR model) of the user based on the feature information, refer to a prior-art method in which an electronic device constructs a 3D model of a user. Details are not described herein in this embodiment of this application.

A specific manner of implementing augmented reality communication between the electronic device 200 and the electronic device 300 is described in detail in the following embodiments.

In some embodiments, communication between the electronic device 200 and the electronic device 300 may be voice communication or video communication. The electronic device 200 receives a first operation of the user 210. The first operation is used to trigger the electronic device 200 to perform AR communication.

Figure 9A:
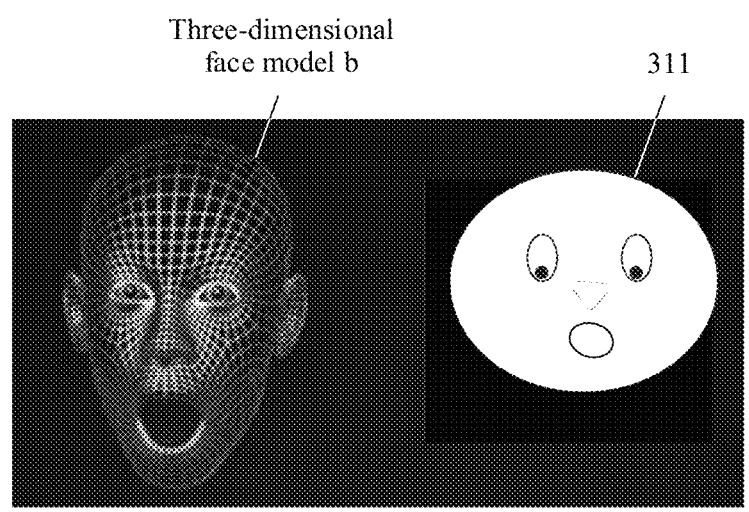
FIG. 9A is a schematic diagram of instances of a three-dimensional face model and an AR model according to another embodiment.
Figures 1, 9B:
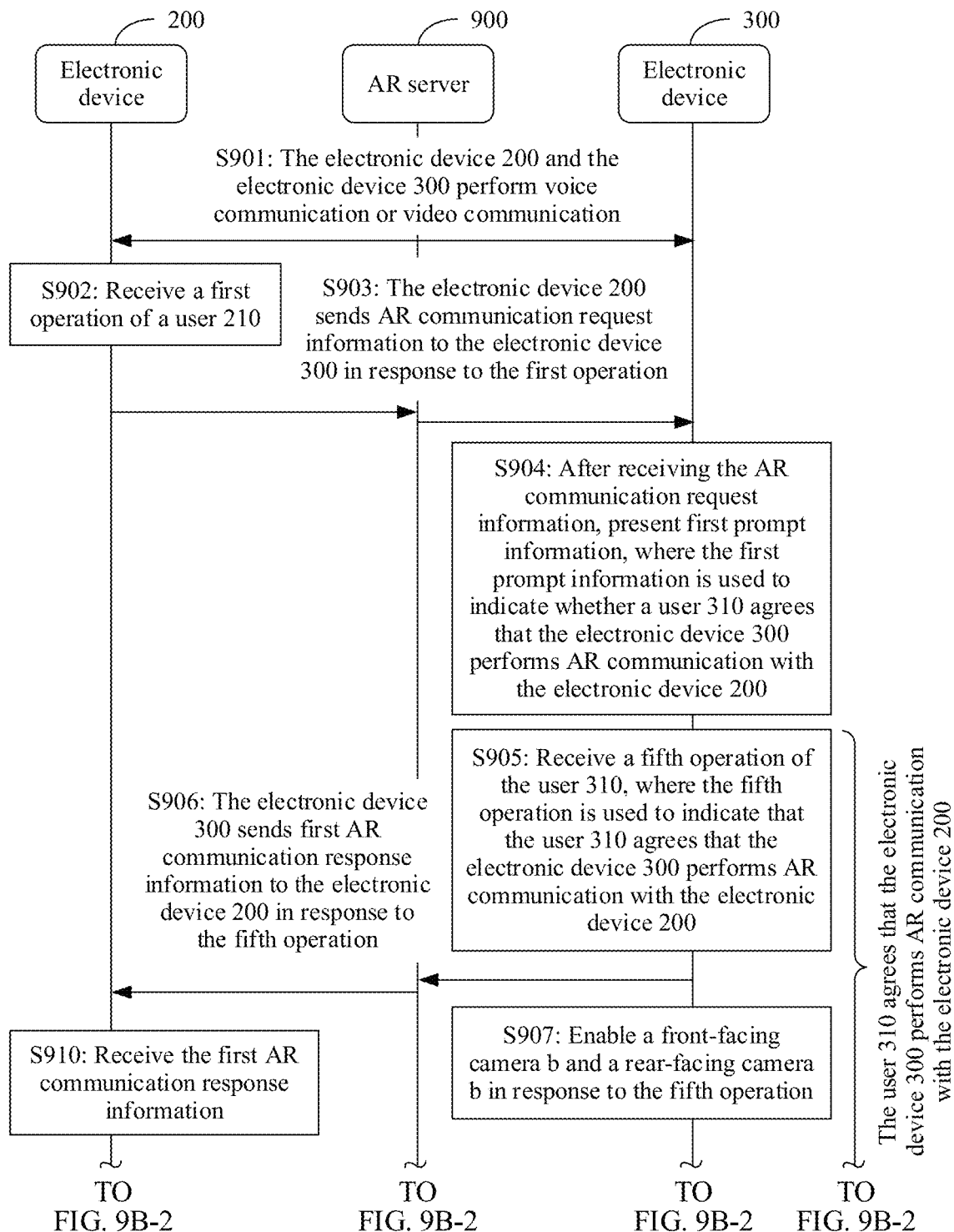
Figures 2, 9B:
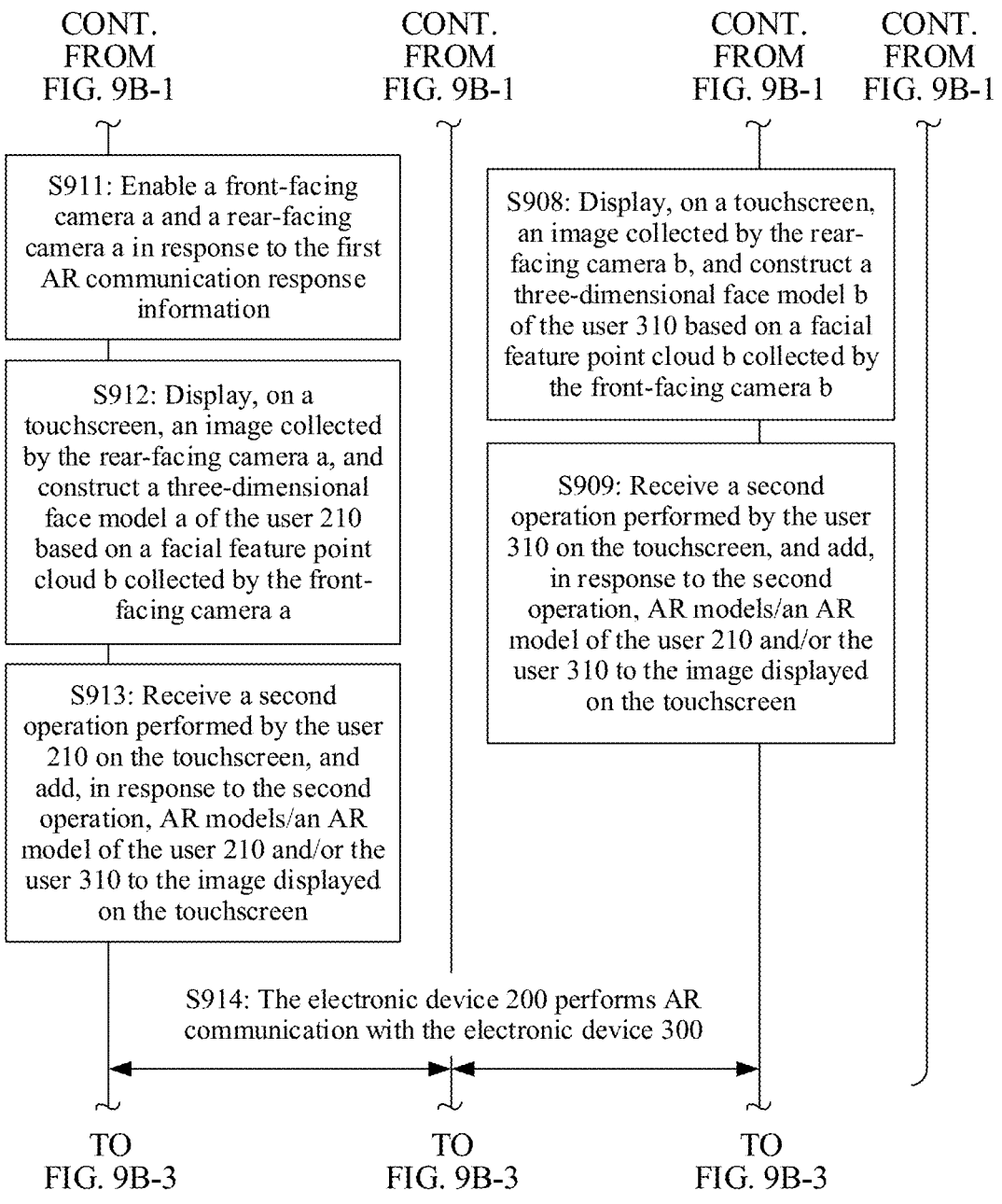

In a process in which the electronic device 200 and the electronic device 300 perform voice communication or video communication (for example, S901 shown in FIG. 9B-1), the electronic device 200 may receive the first operation of the user 210 (for example, S902 shown in FIG. 9B-1).

In some embodiments, the electronic device 200 may receive a first operation performed by the user 210 on a voice communication interface or a video communication interface.

For example, the first operation may be a first preset gesture entered by the user in the voice communication interface or the video communication interface, for example, an S-shaped gesture or a slide-up gesture. For example, the first operation may be an S-shaped gesture entered by the user in a voice communication interface 401 shown in FIG. 4A or a video communication interface 403 shown in FIG. 4B.

For example, the voice communication interface or the video communication interface may include an "AR communication" button. The "AR communication" button may be used to trigger the electronic device 200 to perform AR communication. The first operation may be a tap operation performed by the user on the "AR communication" button, for example, a single tap operation, a double tap operation, or a touch and hold operation. For example, the voice communication interface 401 shown in FIG. 4A includes an "AR communication" button 402. The video communication interface 403 shown in FIG. 4B includes an "AR communication" button 404. The first operation may be a single tap operation performed by the user on the "AR communication" button 402 or the "AR communication" button 404.

In some other embodiments, the electronic device 200 may receive a first operation performed by the user 210 on a first preset button in the electronic device 200. The first operation may be a single tap operation, a double tap operation, a touch and hold operation, or the like. The first preset button is a physical button or a combination of a plurality of physical buttons in the electronic device 200. For example, the first preset button may be a dedicated physical button that is in the electronic device 200 and that is used to trigger the electronic device 200 to perform AR communication. The dedicated physical button may be disposed on a side frame or an upper frame of the electronic device 200. For another example, the first preset button may be a combination button including a "volume +" button and a "volume −" button.

Figure 4A:
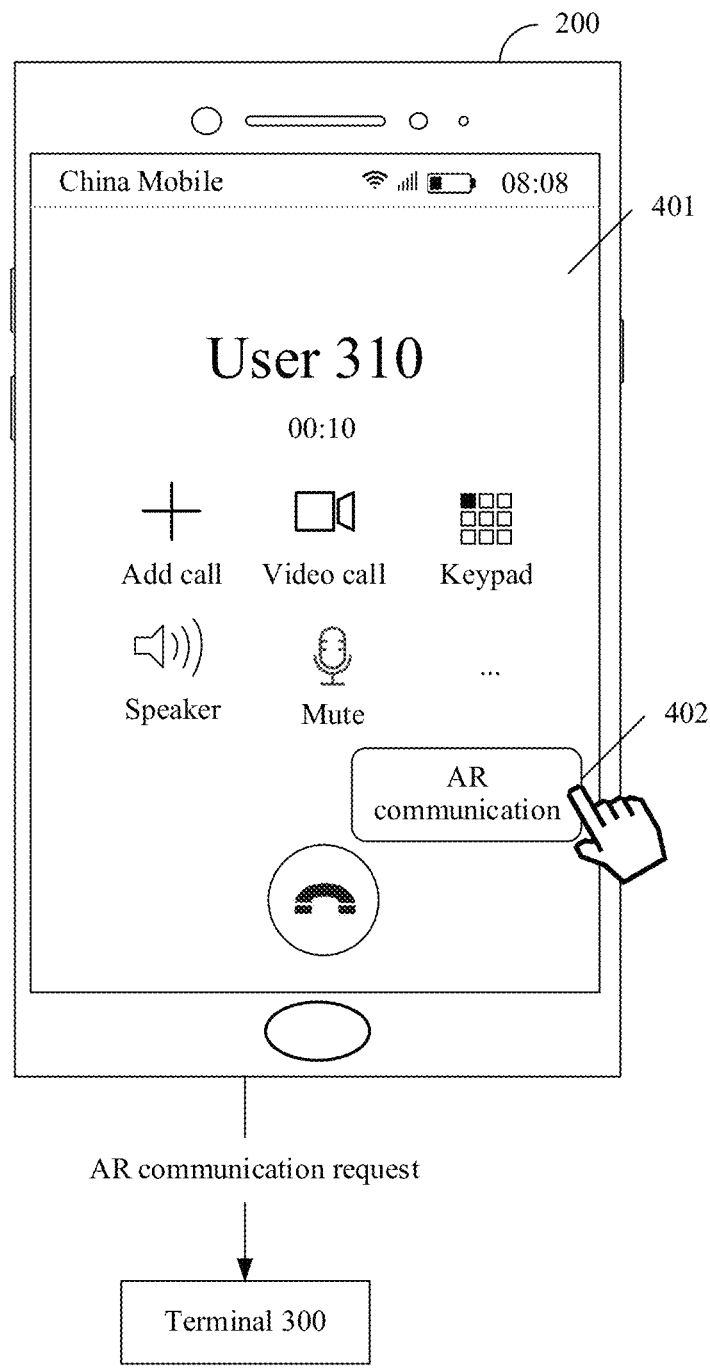
FIG. 4A and FIG. 4B are schematic diagrams of instances of AR communication interfaces according to another embodiment.
Figure 4B:
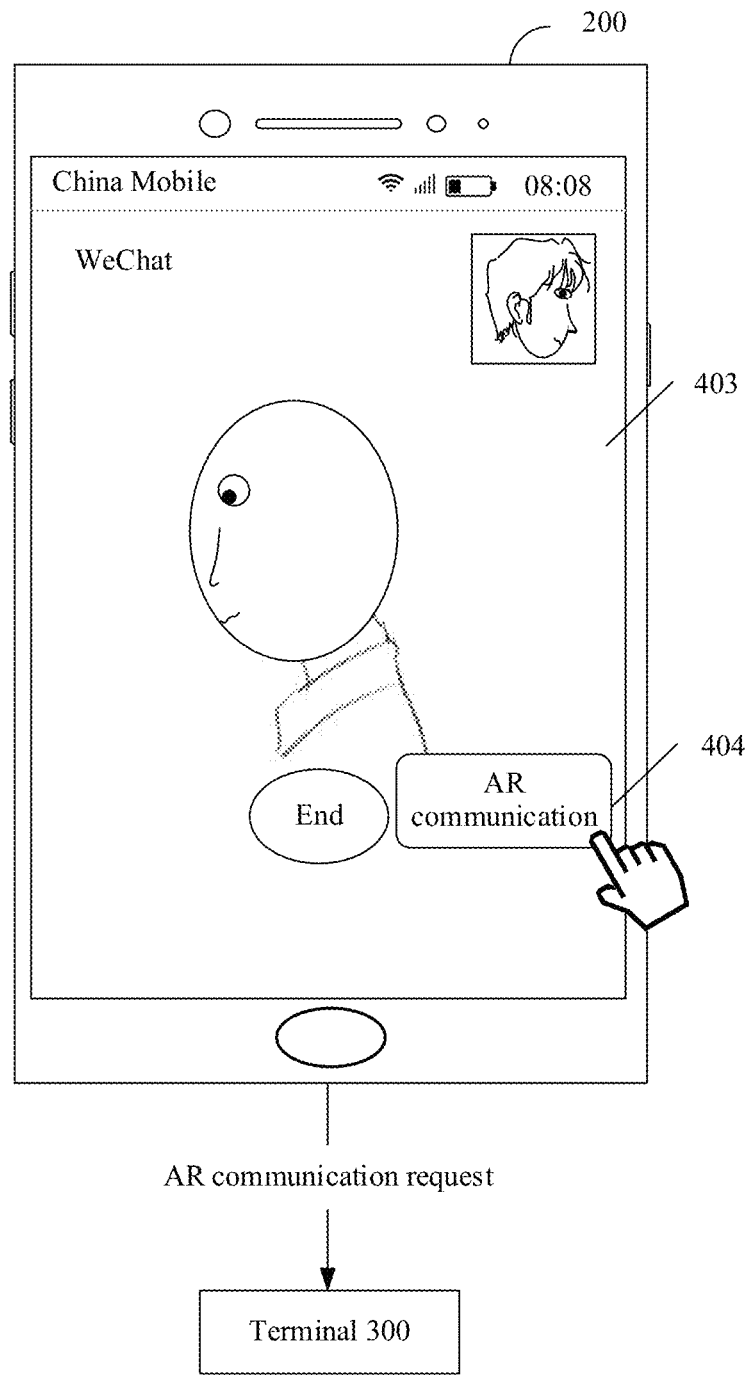

As shown in FIG. 4A or FIG. 4B, the electronic device 200 may send AR communication request information to the electronic device 300 in response to the first operation (for example, S903 shown in FIG. 9B-1). After receiving the AR communication request information, the electronic device 300 may enable the front-facing camera b and the rear-facing camera b. The rear-facing camera b may collect an image of the scenario 320. The electronic device 300 displays, on the touchscreen, the image of the scenario 320 that is collected by the rear-facing camera b. For example, the electronic device 300 may display an AR communication interface 504 shown in FIG. 5B. The front-facing camera b may collect a facial feature point cloud of the user 310. The facial feature point cloud of the user 310 is used to represent facial contour information of the user 310. The electronic device 300 may construct a three-dimensional model b (for example, a three-dimensional face model b) of the user 310 based on the feature point cloud (for example, a facial feature point cloud and a body feature point cloud) of the user 310 that is collected by the front-facing camera b.

In some embodiments, after receiving the AR communication request information, the electronic device 300 may present first prompt information (for example, S904 shown in FIG. 9B-1). The first prompt information is used to determine whether the user 310 agrees that the electronic device 300 performs AR communication with the electronic device 200.

For example, the electronic device 300 may provide voice prompt information, that is, the first prompt information is the voice prompt information. For example, the electronic device 300 may provide voice prompt information "Determine whether to perform AR communication with the user 210". Alternatively, the electronic device 300 displays an image user interface including the first prompt information. Alternatively, the electronic device 300 may display an image user interface including the first prompt information, and provide a vibration prompt or the voice prompt information. For example, the electronic device 300 may display, on the touchscreen, a graphical user interface (GUI) 501 shown in FIG. 5A. The graphical user interface 501 includes first prompt information "Determine whether to perform AR communication with the user 210".

In some other embodiments, after the electronic device 300 receives the AR communication request information, the electronic device 300 may first perform authentication on validity of the electronic device 200. For example, the electronic device 300 may determine whether device identification information of the electronic device 200 is in an AR communication whitelist or blacklist. For example, if the electronic device 300 determines that the device identification information of the electronic device 200 is in the AR communication whitelist (or is not in the AR communication blacklist), the electronic device 300 presents the first prompt information. If the electronic device 300 determines that the electronic device 200 is not in the AR communication whitelist (or is in the AR communication blacklist), the electronic device 300 may not respond to the AR communication request, or return, to the electronic device 200, AR communication response information used to indicate refusal of AR communication. For example, the device identification information may be a phone number of the electronic device 200.

Figures 3, 9B:
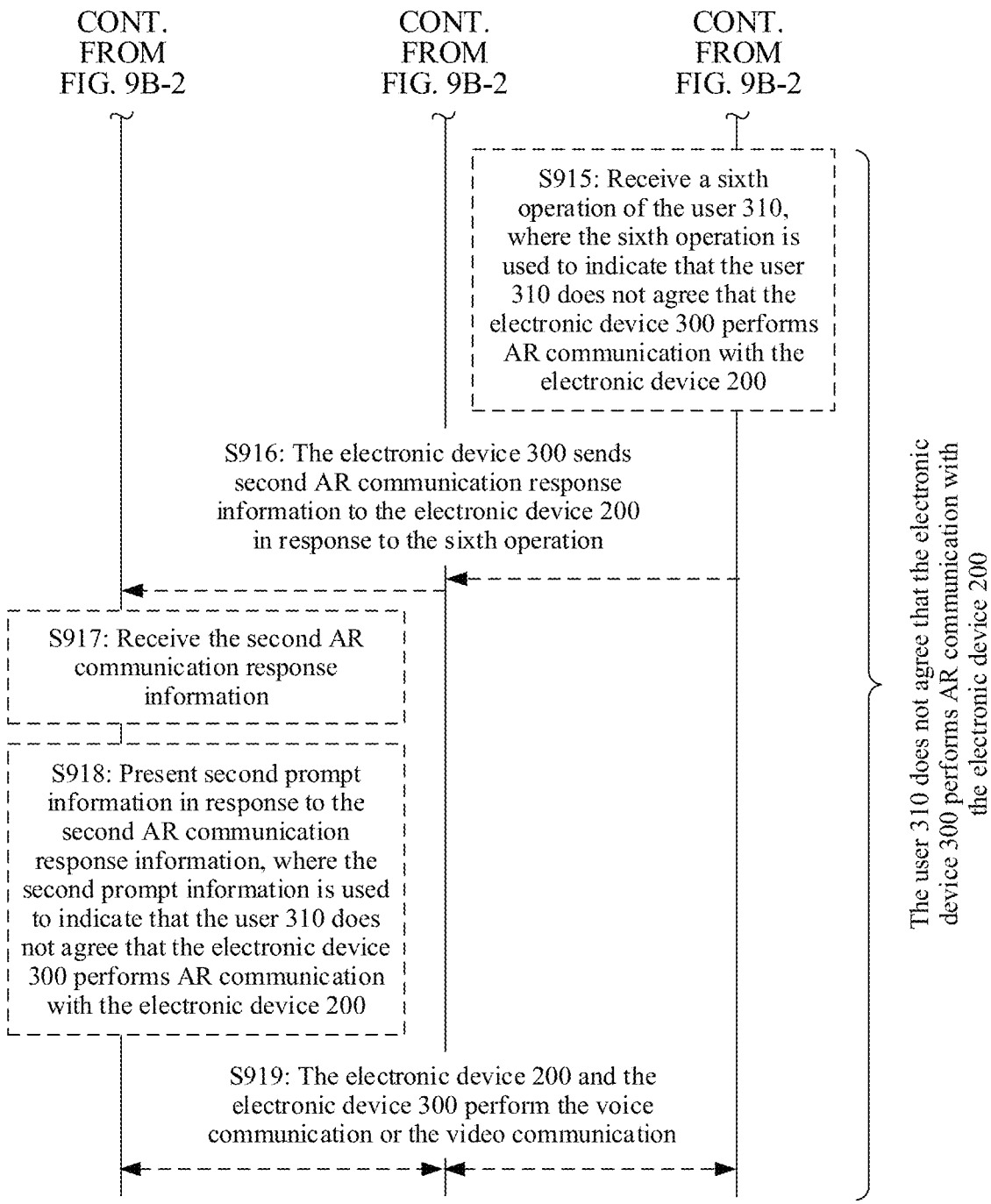

The electronic device 300 may receive an operation (namely, a fifth operation) that the user agrees to perform AR communication (for example, S905 shown in FIG. 9B-1) or a sixth operation (for example, S915 shown in FIG. 9B-3). The fifth operation is used to indicate that the user 310 agrees that the electronic device 300 performs AR communication with the electronic device 200. The sixth operation is used to indicate that the user 310 does not agree that the electronic device 300 performs AR communication with the electronic device 200. For example, the fifth operation may be a second preset gesture (for example, a slide-up gesture) entered by the user on the touchscreen of the electronic device 300 or a tap operation performed by the user on a second preset button, after the electronic device 300 presents the first prompt information. The fifth operation may be a third preset gesture (for example, a slide-down gesture) entered by the user on the touchscreen of the electronic device 300 or a tap operation performed by the user on a third preset button, after the electronic device 300 presents the first prompt information. The second preset gesture is different from the third preset gesture. The second preset button and the third preset button each may be a combination of a plurality of physical buttons in the electronic device 300. The second preset button is different from the third preset button. For example, the second preset button may be a combination button including a "volume +" button and a "screen locking" button. The third preset button may be a combination button including a "volume −" button and a "screen locking" button.

For another example, when the electronic device 300 displays an image user interface (for example, the graphical user interface 501) including the first prompt information, the graphical user interface 501 may further include an "OK" button 502 and a "NO" button 503. The fifth operation may be a tap operation (for example, a single tap operation) performed by the user on the "OK" button 502. The sixth operation may be a tap operation performed by the user on the "NO" button 503.

Figure 5A:
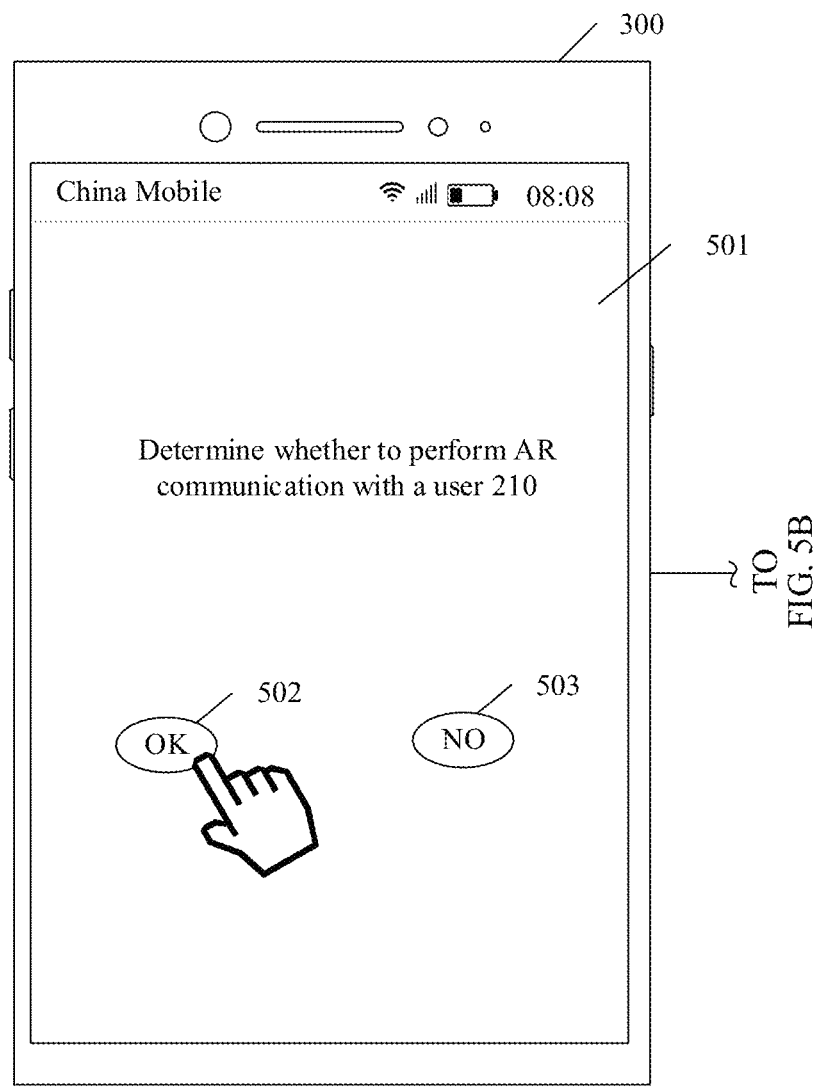
FIG. 5A and FIG. 5B are schematic diagrams of instances of AR communication interfaces according to another embodiment.

The electronic device 300 may establish an AR communication link with the electronic device 200 in response to the fifth operation (for example, the tap operation performed by the user on the "OK" button 502 shown in FIG. 5A) of the user 310. After establishing the AR communication link, the electronic device 300 may enable the front-facing camera b and the rear-facing camera b (for example, S907 shown in FIG. 9B-1). Then, the electronic device 300 displays, on the touchscreen, an image collected by the rear-facing camera b, and constructs a three-dimensional model b of the user 310 based on a feature point cloud b collected by the front-facing camera b (for example, S908 shown in FIG. 9B-2). There may be a mapping relationship between the three-dimensional model b and an AR model (for example, the AR model 311 or the AR model 312) of the user 310. In this way, the facial expressions and the body actions of the AR model 311 and the AR model 312 may be controlled based on the mapping relationship by using the behavior action information of the user 310.

Figure 6A:
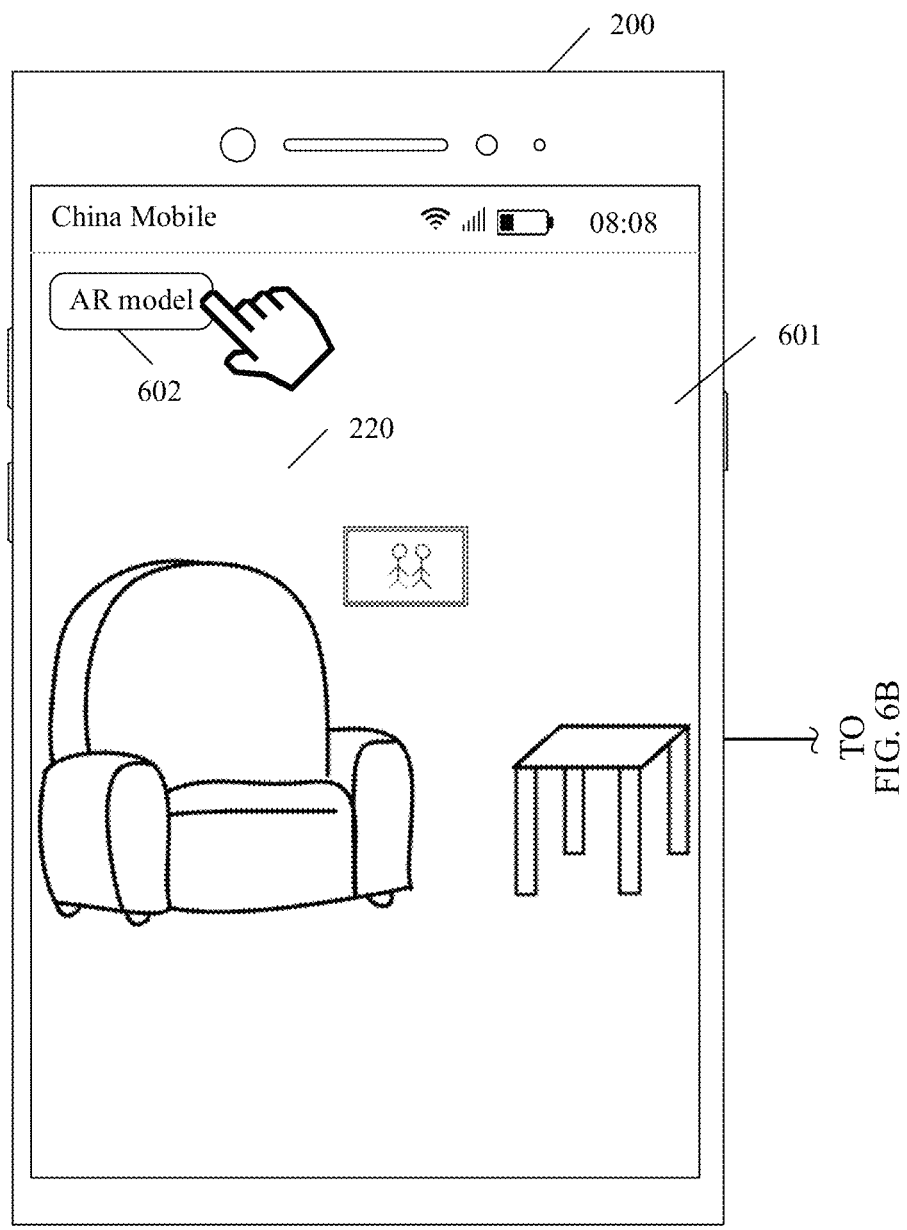
FIG. 6A to FIG. 6D are schematic diagrams of instances of AR communication interfaces according to another embodiment.

The electronic device 300 may send first AR communication response information to the electronic device 200 in response to the fifth operation of the user (for example, S906 shown in FIG. 9B-1). The first AR communication response information is used to indicate that the electronic device 300 agrees to perform AR communication with the electronic device 200. The electronic device 200 receives the first AR communication response information sent by the electronic device 300 (for example, S910 shown in FIG. 9B-1). The electronic device 200 may establish an AR communication link with the electronic device 300 in response to the first AR communication response information. After establishing the AR communication link, the electronic device 200 may enable the front-facing camera a and the rear-facing camera a (for example, S911 shown in FIG. 9B-2). The rear-facing camera a may collect an image of the scenario 220. The electronic device 200 may display, on the touchscreen, the image collected by the rear-facing camera a (for example, S912 shown in FIG. 9B-2). For example, the electronic device 200 may display an AR communication interface 601 shown in FIG. 6A. As shown in FIG. 6A, the AR communication interface 601 includes the image of the scenario 220. The front-facing camera a may collect a real-time feature point cloud of the user 210. The real-time feature point cloud of the user 210 is used to represent facial contour information and body contour information of the user 210. The electronic device 200 may construct a three-dimensional human body model (a three-dimensional face model a) of the user 210 based on the real-time feature point cloud of the user 210 (for example, S912 shown in FIG. 9B-2). There may be a mapping relationship between the three-dimensional model a and an AR model (for example, the AR model 211 or the AR model 212) of the user 210. In this way, the facial expressions and the body actions of the AR model 211 and the AR model 212 may be controlled based on the mapping relationship by using the behavior action information of the user 210.

If the electronic device 300 receives the sixth operation (for example, the tap operation performed by the user 310 on the "NO" button 503, for example, a single tap operation) of the user 310, it indicates that the user 310 refuses to perform AR communication with the electronic device 200 (for example, S915 shown in FIG. 9B-3). The electronic device 300 may send second AR communication response information to the electronic device 200 in response to the sixth operation (for example, S916 shown in FIG. 9B-3). The second AR communication response information is used to indicate that the electronic device 300 refuses to perform AR communication with the electronic device 200. The electronic device 200 may receive the second AR communication response information sent by the electronic device 300 (for example, S917 shown in FIG. 9B-3). The electronic device 200 may present second prompt information in response to receiving the second AR communication response information (for example, S918 shown in FIG.

9B-3). The second prompt information is used to indicate that the electronic device 300 refuses to perform AR communication with the electronic device 200. For a method for presenting the second prompt information by the electronic device 200, refer to the method for presenting the first prompt information by the electronic device 300. Details are not described herein again in this embodiment of this application. After the electronic device 200 receives the second AR communication response information, the electronic device 200 and the electronic device 300 may continue to perform the voice communication or the video communication (for example, S919 shown in FIG. 9B-3). Alternatively, after the electronic device 200 receives the second AR communication response information, the electronic device 200 and the electronic device 300 may end the voice communication or the video communication in S901.

If the electronic device 300 receives the fifth operation of the user, it indicates that the user 310 agrees that the electronic device 300 performs AR communication with the electronic device 200. In this case, the electronic device 300 may add an AR model to the image of the scenario 320 in response to an operation (for example, a second operation) of the user (for example, S909 shown in FIG. 9B-2). After receiving the first AR communication response information sent by the electronic device 300, the electronic device 200 may also add an AR model to the image of the scenario 220 in response to an operation (for example, a second operation) of the user (for example, S913 shown in FIG. 9B-2). In this embodiment of this application, the electronic device 200 is used as an example herein to describe a method for adding an AR model by the electronic device to an image of a real scenario.

In some embodiments, the AR model 311 shown in FIG. 3A or FIG. 3C and the AR model 212 shown in FIG. 3C may be added by the electronic device 200 to the image of the scenario 220 in response to an operation (for example, a second operation) of the user 210.

For example, after enabling the rear-facing camera a, the electronic device 200 may display a second AR communication interface a (for example, the AR communication interface 601 shown in FIG. 6A). The AR communication interface 601 includes the image of the scenario 220, but does not include the AR model 311 or the AR model 212. The electronic device 200 may receive a second operation performed by the user 210 in the AR communication interface 601. The electronic device 200 may add AR models/an AR model of the user 210 and/or the user 310 to the image of the scenario 220 in response to the second operation. The second operation may be a fourth preset gesture entered by the user in the AR communication interface 601, for example, an S-shaped gesture or a slide-up gesture. In some embodiments, as shown in FIG. 6A, the AR communication interface 601 may further include an "AR model" button 602. The second operation may be a tap operation performed by the user 210 on the "AR model" button 602, for example, a single tap operation, a double tap operation, or a touch and hold operation.

Figure 6B:
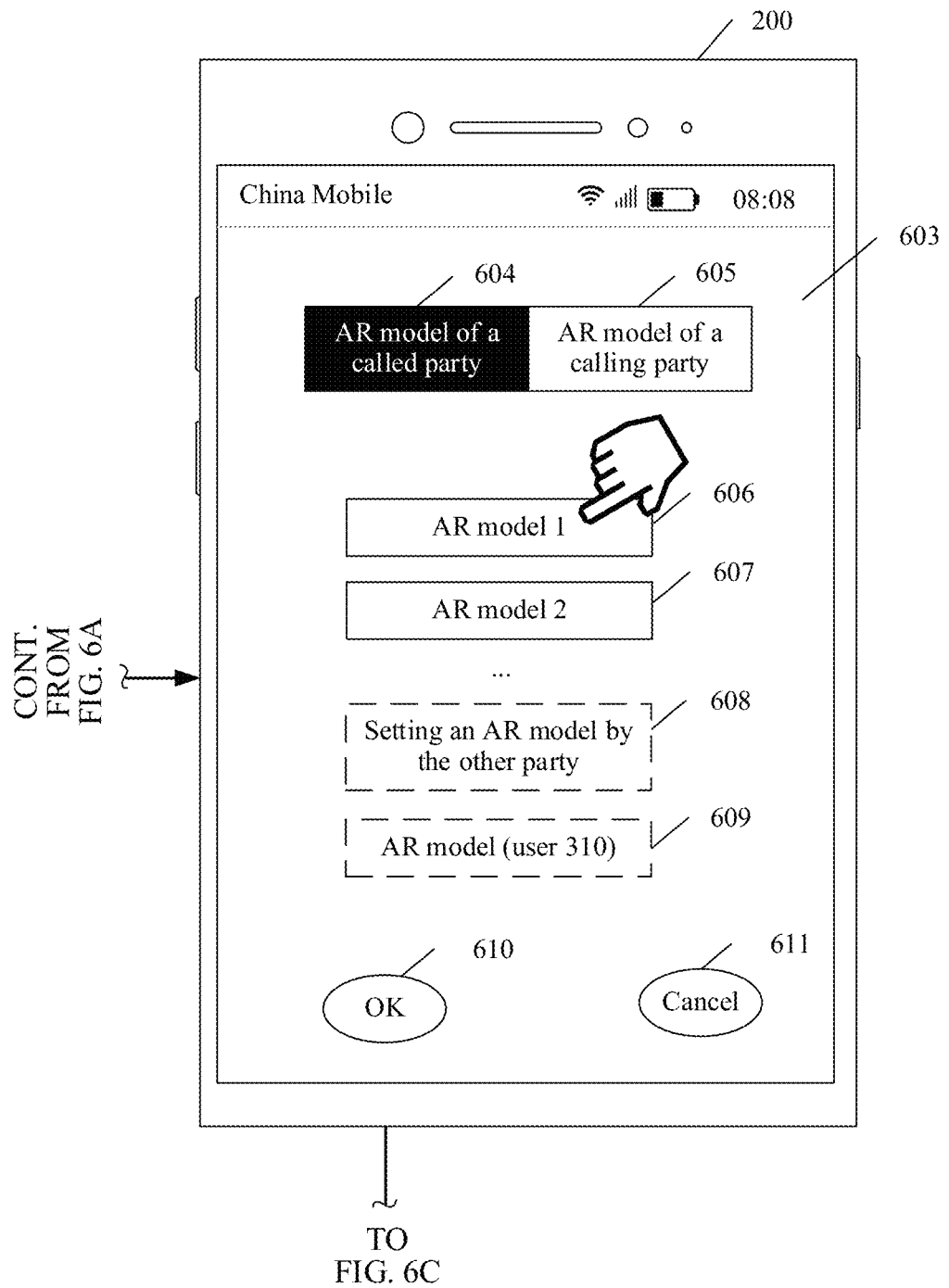

The electronic device 200 may display, in response to the second operation, a model selection interface 603 shown in FIG. 6B. The model selection interface 603 includes an "AR model of a called party" option 604 and an "AR model of a calling party" option 605. As shown in FIG. 6B, when the "AR model of a called party" option 604 is selected, the user may select an AR model for the user 310 on the model selection interface 603. When the "AR model of a calling party" option 605 is selected, the user may select an AR model for the user 210 on the model selection interface 603.

As shown in FIG. 6A, for example, the "AR model of a called party" option 604 is selected. The model selection interface 603 may include at least two AR model options. For example, the model selection interface 603 includes an "AR model 1" option 606 and an "AR model 2" option 607.

An AR model corresponding to the "AR model 1" option 606 and an AR model corresponding to the "AR model 2" option 607 may be pre-stored in the electronic device 200. Alternatively, an AR model corresponding to the "AR model 1" option 606 and an AR model corresponding to the "AR model 2" option 607 may be stored in a cloud (for example, an AR server). The electronic device 200 may download the AR model from the cloud in response to a selection operation (for example, a first selection operation) performed by the user on an AR model option.

In some other embodiments, the electronic device 200 may further receive the AR model of the user 310 that is sent by the electronic device 300. In other words, the electronic device 200 may select the AR model of the user 310 that is set by the other party (namely, the electronic device 300) in communication. Based on this case, as shown in FIG. 6B, the model selection interface 603 may further include a "Setting an AR model by the other party" option 608. In response to a selection operation performed by the user on the "Setting an AR model by the other party" option 608, the electronic device 200 sends an AR model obtaining request to the electronic device 300, to obtain the AR model that is set by the electronic device 300 for the user 310; and add an AR model from the electronic device 300 to the AR scenario image included in the AR communication interface 601. Alternatively, the electronic device 200 may receive an AR model actively sent by the electronic device 300. In response to a selection operation (for example, a first selection operation) performed by the user on the "Setting an AR model by the other party" option 608, the electronic device 200 may add an AR model from the electronic device 300 to the AR scenario image included in the AR communication interface 601.

In some embodiments, if the electronic device 200 has performed AR communication with the electronic device 300, and in an AR communication process, the electronic device 200 receives the AR model that is set by the electronic device 300 for the user 310, the electronic device 200 may store the AR model. In this case, as shown in FIG. 6B, the model selection interface 603 may further include an "AR model (user 310)" option 609. The electronic device 200 may set, as the AR model of the user 310 in response to a selection operation performed by the user on the "AR model (user 310)" option 609, the corresponding AR model stored in the electronic device 200.

If the electronic device 200 receives a selection operation (for example, a single tap operation) performed by the user on any AR model option on the model selection interface 603, the electronic device 200 may display, in a preset display manner, the AR model option selected by the user. For example, it is assumed that the electronic device 200 receives a tap operation performed by the user on the "AR model 1" option 606 on the model selection interface 603. The electronic device 200 may display the "AR model 1" option 606 in a manner of white characters on a black background shown in FIG. 6C. The preset display manner includes but is not limited to the manner of white characters on a black background shown in FIG. 6C. For example, the preset display manner may further include a bold display manner or a preset color (for example, red) display manner.

Figure 6C:
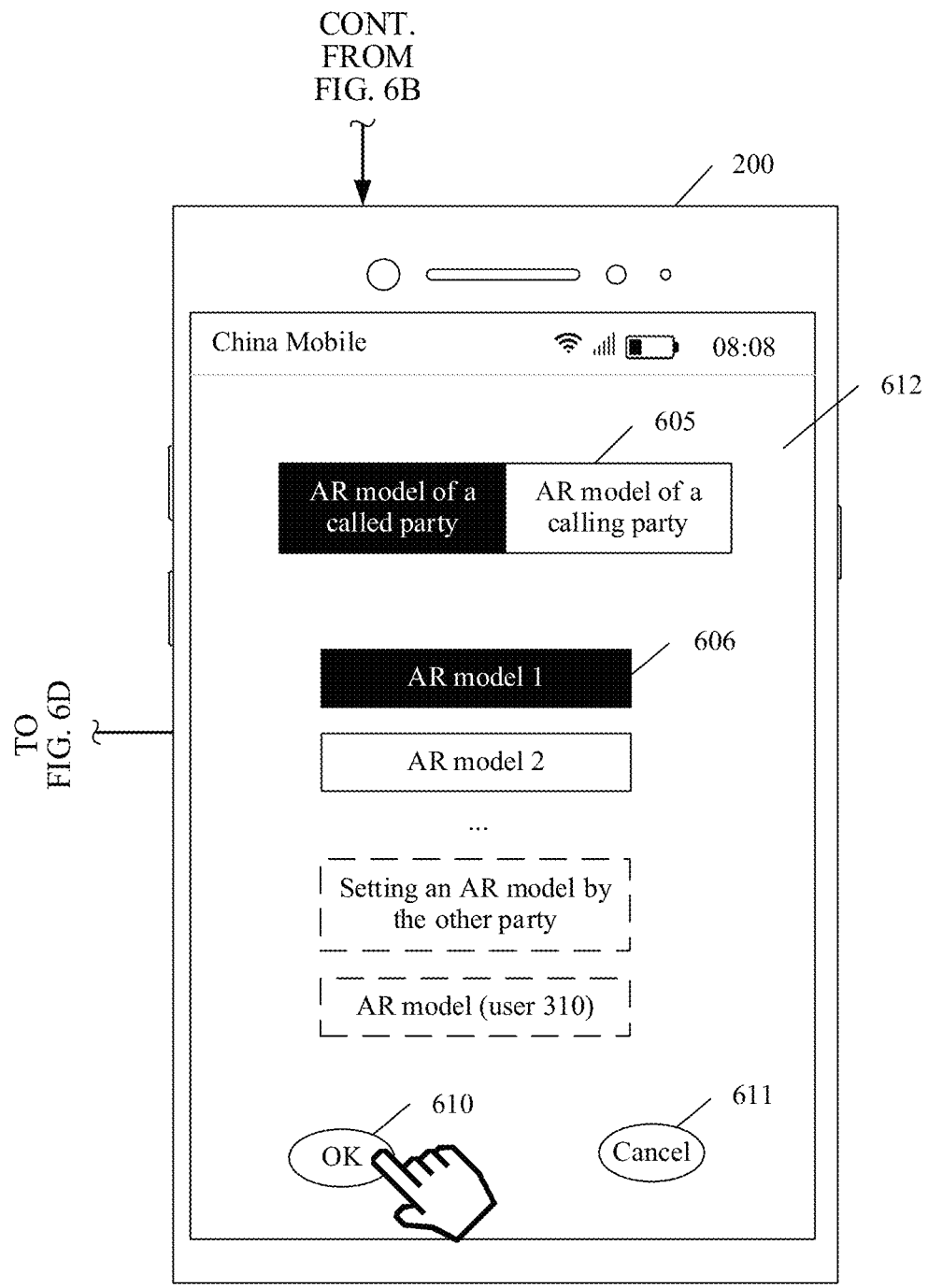

After the electronic device 200 displays a model selection interface 612 shown in FIG. 6C, the electronic device 200 may receive a tap operation (for example, a single tap operation) performed by the user on an "OK" button 610 on the model selection interface 612. In response to the tap operation performed by the user on the "OK" button 610 shown in FIG. 6C, the electronic device 200 may add, to the AR scenario image shown in FIG. 6A, the AR model 311 corresponding to the "AR model 1" option 606, to display an AR communication interface 613 (namely, the AR communication interface 301 shown in FIG. 3A) shown in FIG. 6D, namely, a third AR communication interface a. The AR communication interface 613 shown in FIG. 6D includes the image of the scenario 220 and the AR model 311, but does not include the AR model 212.

In a process in which the electronic device 200 performs AR communication with the electronic device 300, the electronic device 200 may further receive a tap operation performed by the user on an "AR model" option 602 in the AR communication interface 613, and reset the AR model of the user 310, or add the AR model of the user 210. For a method for resetting or adding the AR model by the electronic device 200 in response to the tap operation performed by the user on the "AR model" option 602, refer to the foregoing related descriptions. Details are not described herein again in this embodiment of this application.

Figure 7A:
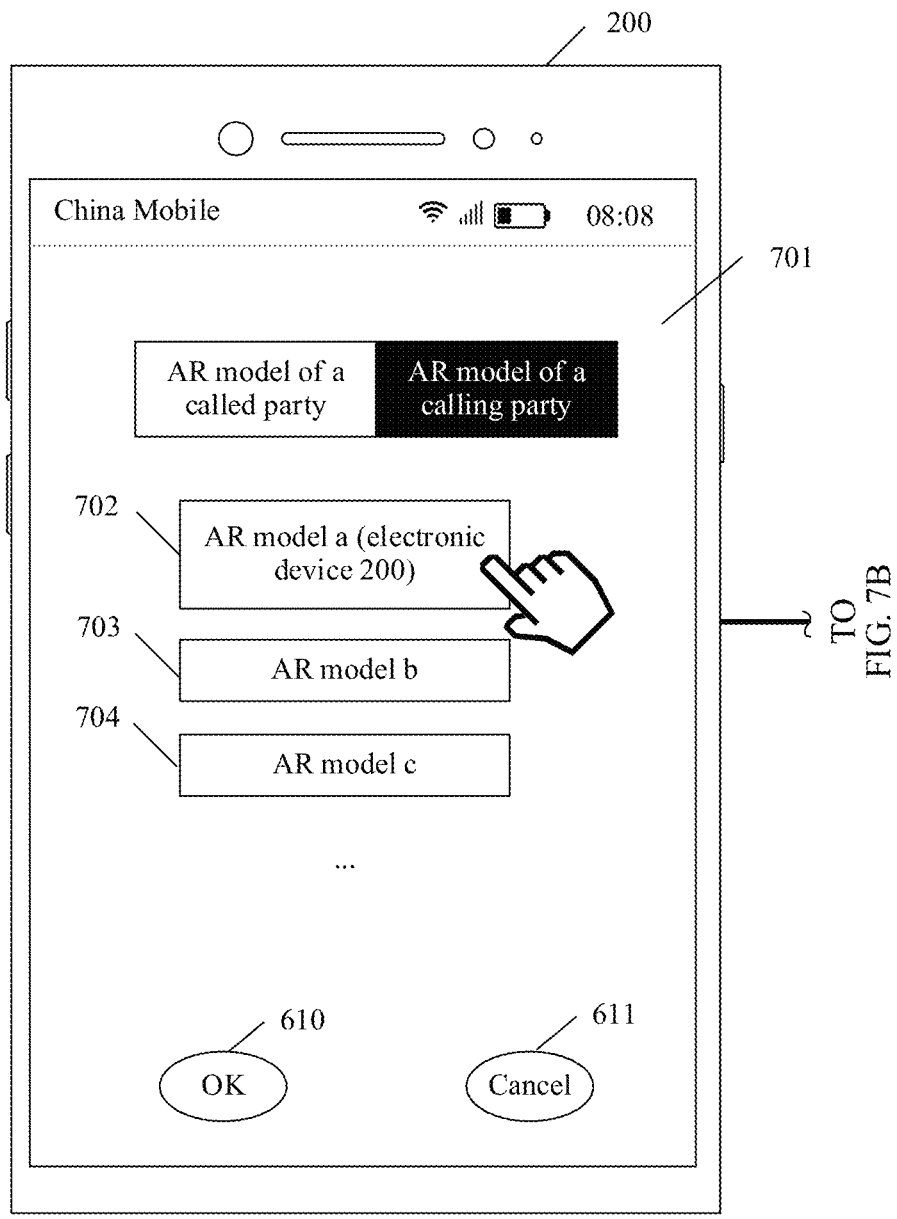
FIG. 7A to FIG. 7E are schematic diagrams of instances of AR communication interfaces according to another embodiment.

In some other embodiments, after the electronic device 200 displays the model selection interface 612 shown in FIG. 6C, the electronic device 200 may receive a tap operation (for example, a single tap operation) performed by the user on the "AR model of a calling party" option 605 on the model selection interface 612. The electronic device 200 may display, in response to the tap operation performed by the user on the "AR model of a calling party" option 605 shown in FIG. 6C, a model selection interface 701 shown in FIG. 7A. The model selection interface 701 includes an "AR model a (electronic device 200)" option 702, an "AR model b" option 703, an "AR model c" option 704, and the like.

An AR model corresponding to the AR model option on the model selection interface 701 may be pre-stored in the electronic device 200. Alternatively, an AR model may be stored in a cloud. The electronic device 200 may download the AR model from the cloud in response to a selection operation performed by the user on an AR model option.

Figure 7B:
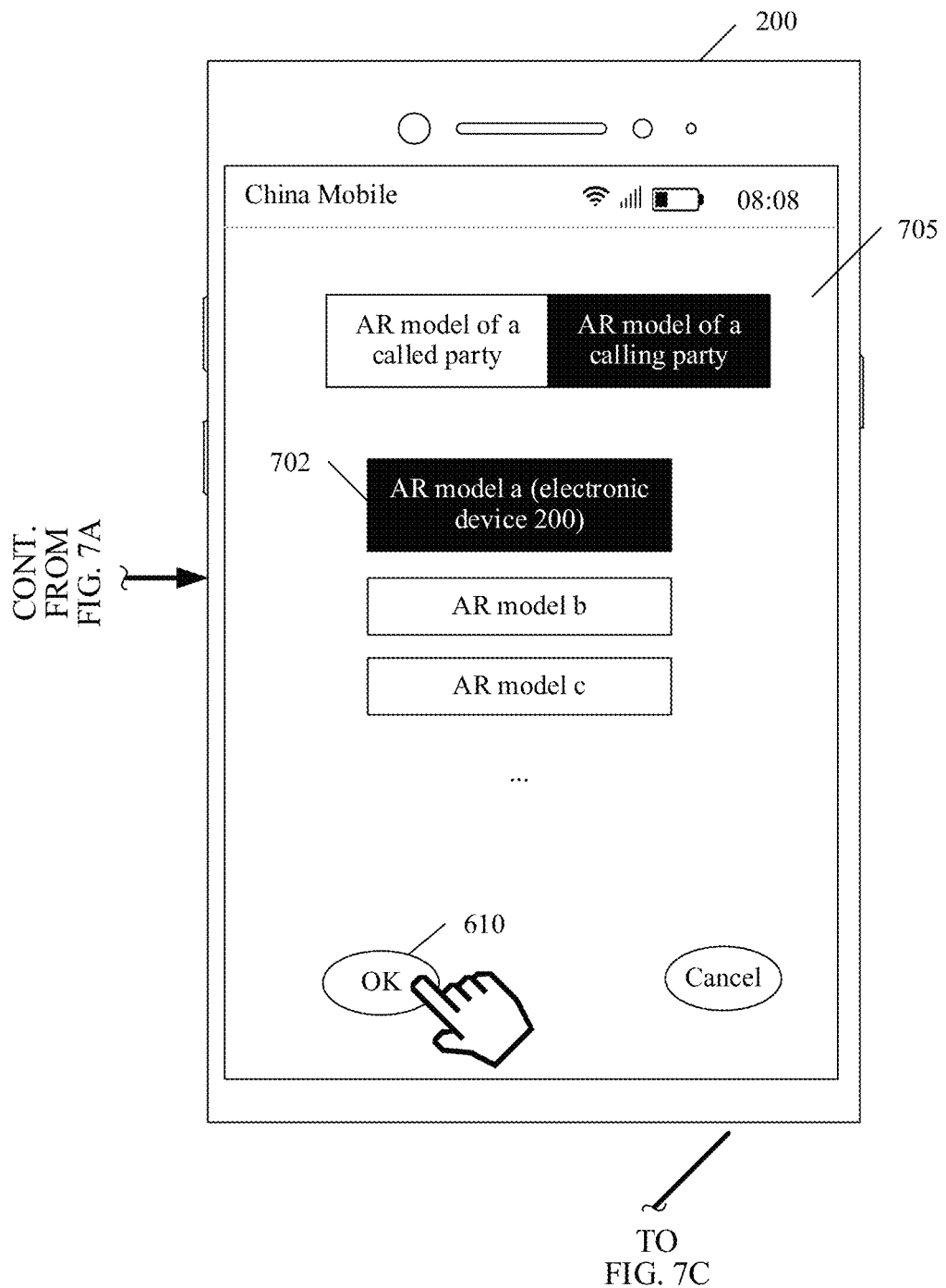

If the electronic device 200 receives a selection operation (for example, a single tap operation) performed by the user on any AR model option on the model selection interface 701, the electronic device 200 may display, in the preset display manner, the AR model option selected by the user. For example, the electronic device 200 may display, in a manner of white characters on a black background shown in FIG. 7B, the "AR model a (electronic device 200)" option 702 in response to a tap operation performed by the user on the "AR model a (electronic device 200)" option 702 on the model selection interface 701. After the electronic device 200 displays a model selection interface 705 shown in FIG. 7B, the electronic device 200 may receive a tap operation (for example, a single tap operation) performed by the user on an "OK" button 610 on the model selection interface 705. In response to the tap operation performed by the user on the "OK" button 610 shown in FIG. 7B, the electronic device 200 may add, to the AR scenario image shown in FIG. 6A, the AR model 311 corresponding to the "AR model 1" option 606 and the AR model 212 corresponding to the "AR model a (electronic device 200)" option 702, to display an AR communication interface 706 (namely, the AR communication interface 303 shown in FIG. 3C) shown in FIG. 7C, namely, a first AR communication interface a. The AR communication interface 706 shown in FIG. 7C includes the image of the scenario 220, the AR model 311, and the AR model 212.

Figure 7C:
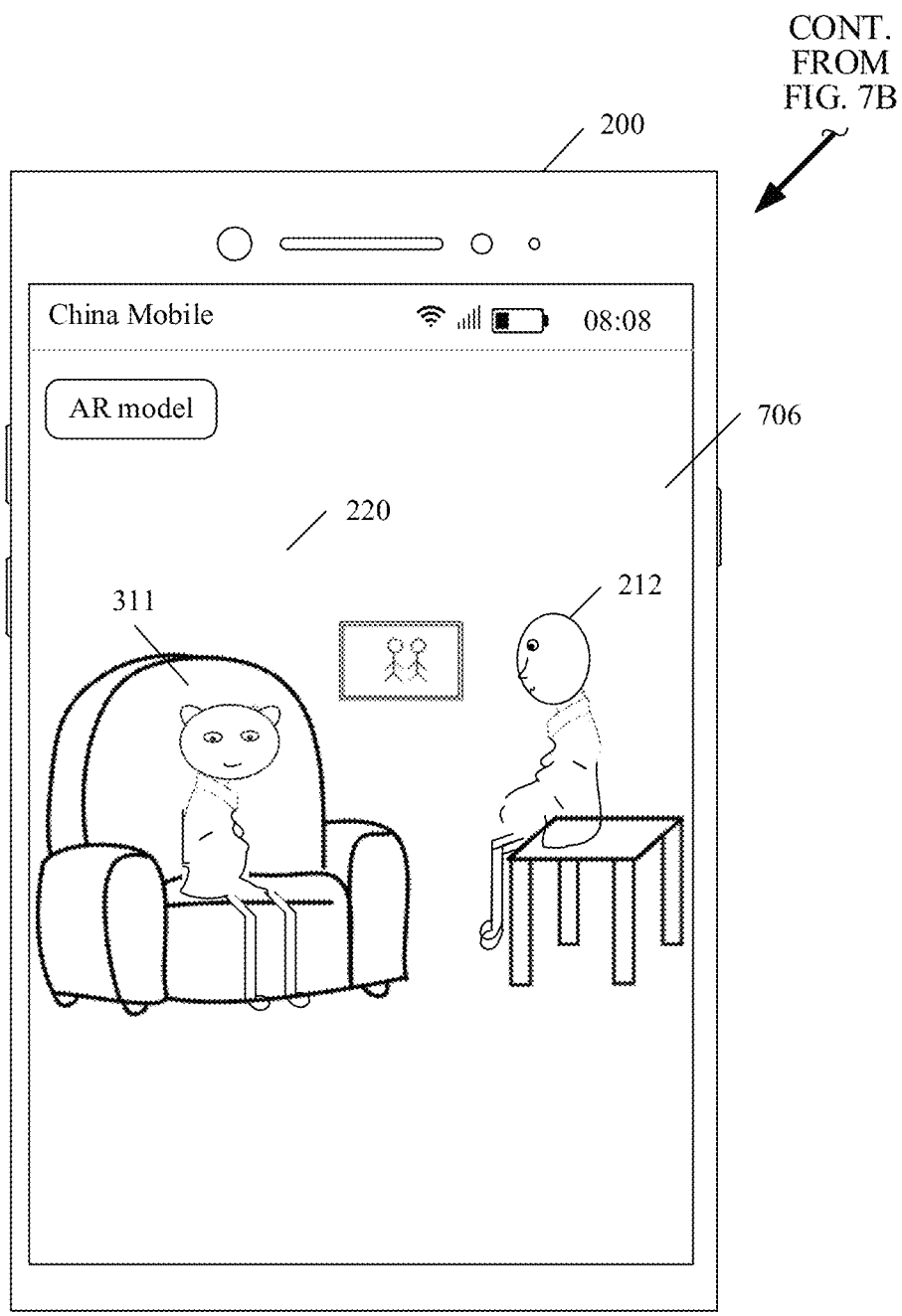

It should be noted that an AR model corresponding to the "AR model a (electronic device 200)" option 702 may be: The electronic device 200 collects feature information a (for example, facial feature information a) of the user 210 by using the front-facing camera a or the rear-facing camera a, and then constructs a 3D model (namely, a real AR model of the user 210) of the user 210 based on the feature information a, for example, a 3D face model. For example, the AR model 212 shown in FIG. 7C is the real AR model of the user 210.

Figure 5B:
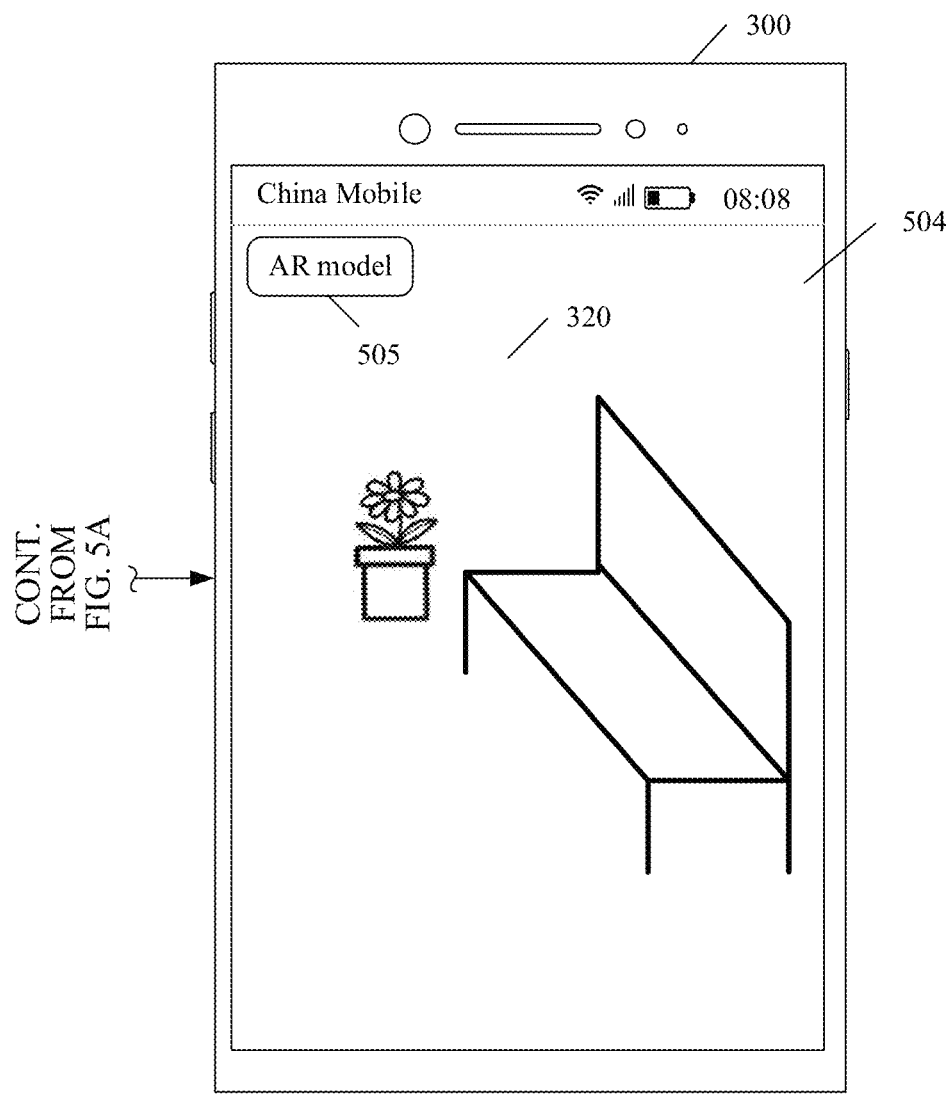

In some embodiments, after displaying the AR communication interface 504 shown in FIG. 5B, the electronic device 300 may receive a tap operation performed by the user on an "AR model" option 505, and add an AR model to the AR communication interface 504 shown in FIG. 5B. The AR communication interface 504 shown in FIG. 5B is a second AR communication interface b. The AR communication interface 504 includes the image of the scenario 320, but does not include the AR model 211 or the AR model 312. For a method for adding the AR model by the electronic device 300 to the AR communication interface 504 shown in FIG. 5B, refer to the method for adding the AR model by the electronic device 200 to the AR communication interface 601 shown in FIG. 6A. Details are not described herein again in this embodiment of this application. After adding the AR model to the AR communication interface 504 shown in FIG. 5B, the electronic device 300 may display the AR communication interface 302 shown in FIG. 3B or the AR communication interface 304 shown in FIG. 3D. The AR communication interface 302 shown in FIG. 3B is a third AR communication interface b. The AR communication interface 302 includes the image of the scenario 320 and the AR model 211, but does not include the AR model 312. The AR communication interface 304 shown in FIG. 3D is a first AR communication interface b. The AR communication interface 304 includes the image of the scenario 320, the AR model 211, and the AR model 312.

In some other embodiments, after enabling the rear-facing camera a, the electronic device 200 may directly display an AR communication interface including a default AR model. At least one default AR model may be set in the electronic device 200 for the electronic device 200. For example, an AR model corresponding to the "AR model a (electronic device 200)" option shown in FIG. 7B may be a default AR model that is set in the electronic device 200 for the electronic device 200. A default AR model may be set in the electronic device 200 for the other party in communication. Alternatively, a default AR model may be set in the electronic device 200 for each contact. For example, an AR model corresponding to the "AR model (user 310)" option shown in FIG. 6B may be a default AR model that is set in the electronic device 200 for the user 310.

Figure 7D:
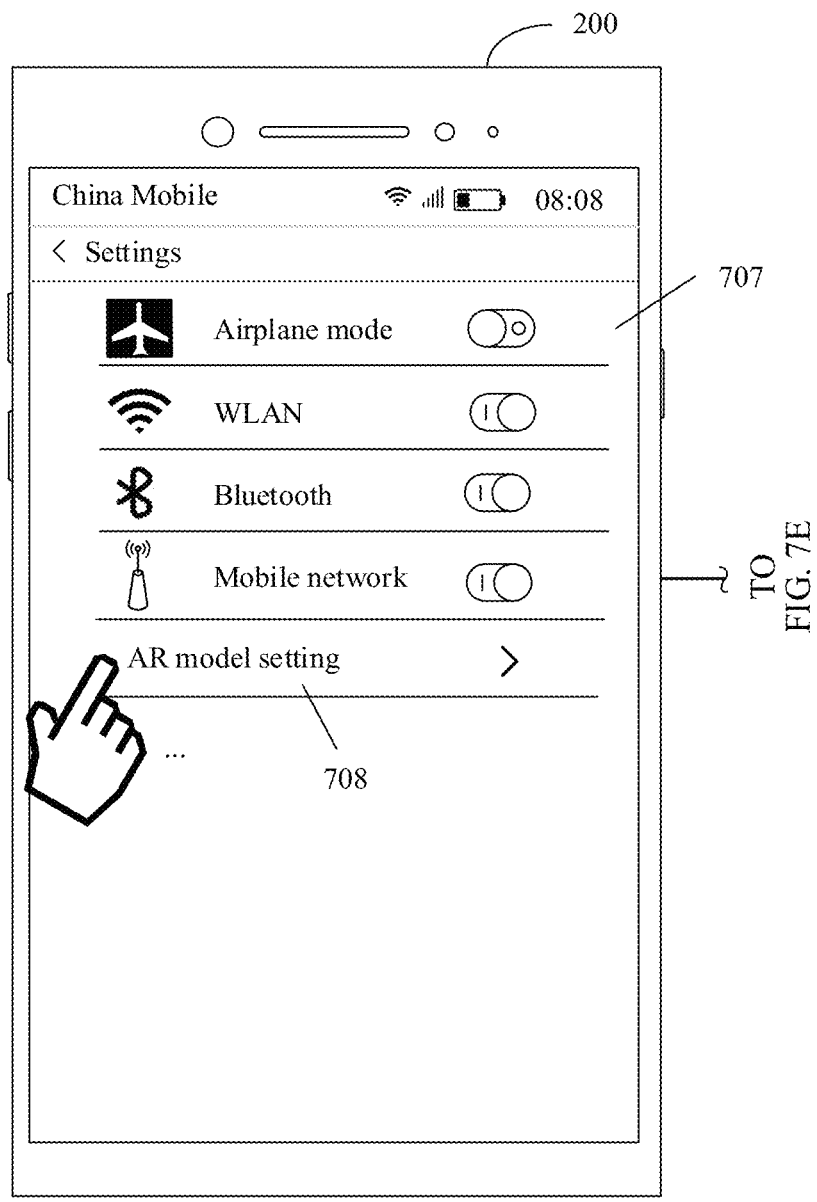
Figure 7E:
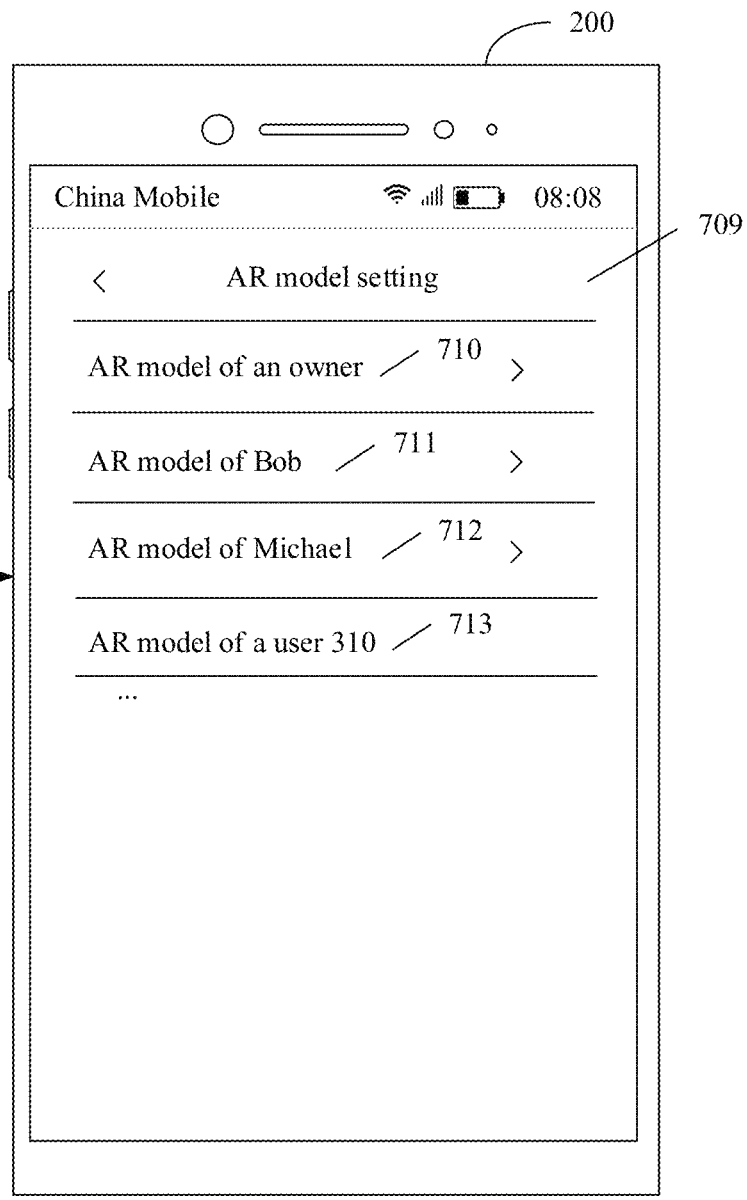

For example, the user 210 may set AR models for an owner and a plurality of contacts in the electronic device 200 in a "Settings" application of the electronic device 200. For example, the electronic device 200 may receive a tap operation (for example, a single tap operation) performed by the user on a "Settings" application icon on a home screen of the electronic device 200; and the electronic device 200 may display, in response to the tap operation, a setting interface 707 shown in FIG. 7D. The setting interface 707 includes an "Airplane mode" option, a "WLAN" option, a "Bluetooth" option, a "Mobile network" option, an "AR model setting" option 708, and the like. For functions of options such as the "Airplane mode" option, the "WLAN" option, the "Bluetooth" option, and the "Mobile network" option, refer to descriptions of corresponding functions in a conventional technology. Details are not described herein in this embodiment. The "AR model setting" option 708 is used to trigger the electronic device 200 to display an AR model setting interface used to set AR models for the owner and the contact. The electronic device 200 displays, in response to a tap operation (for example, a single tap operation) performed by the user on the "AR model setting" option 708, an AR model setting interface 709 shown in FIG. 7E. It is assumed that the electronic device 200 (for example, Contacts of the electronic device 200) stores information about a plurality of contacts including Bob, Michael, the user 310, and the like. As shown in FIG. 7E, the AR model setting interface 709 may include a plurality of setting options such as an "AR model of an owner" setting option 710, an "AR model of Bob" setting option 711, an "AR model of Michael" setting option 712, and an "AR model of a user 310" setting option 713. The electronic device 200 may receive a tap operation performed by the user on any setting option, and set an AR model for a corresponding user. For a specific method for setting the AR model by the electronic device 200 for the user, refer to the descriptions in the foregoing embodiment. Details are not described herein again in this embodiment.

If the electronic device 200 sets default AR models for a calling party (for example, the electronic device 200) and a called party (for example, the contact Bob) in the "Settings" application, after enabling the rear-facing camera a, the electronic device 200 may directly display an AR communication interface including the default AR model of the calling party and the default AR model of the called party, instead of adding an AR model to the AR communication interface in response to an operation of the user after the electronic device 200 displays the AR communication interface. In a process in which the electronic device 200 performs AR communication with the electronic device 300, the electronic device 200 may receive a tap operation performed by the user on an "AR model" option in the AR communication interface, and reset or add the AR model. For a method for resetting or adding the AR model by the electronic device 200 in response to the tap operation performed by the user on the "AR model" option, refer to the foregoing related descriptions. Details are not described herein again in this embodiment of this application. Alternatively, the electronic device 200 may receive a tap operation performed by the user on an AR model (for example, the AR model 211) in the AR communication interface, and reset the AR model of the user 210.

In some embodiments, in a process in which the electronic device 200 performs AR communication with the electronic device 300, the electronic device 200 may change decorations of the AR model in response to an operation performed by the user on the AR model in the AR communication interface. For example, the electronic device 200 may change clothes, a hairstyle, an accessory, and the like of the AR model.

Figures 1, 9C:
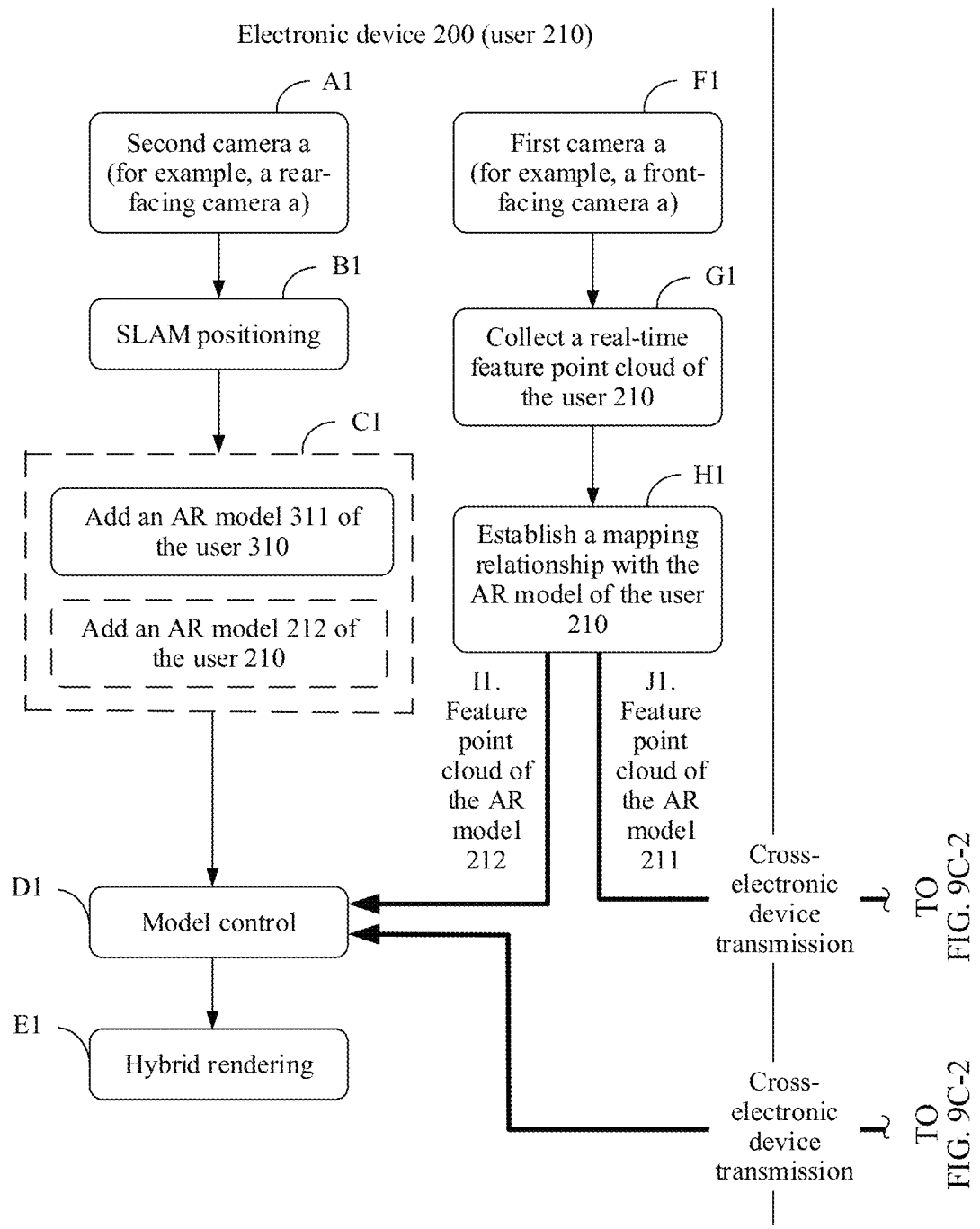
Figures 2, 9C:
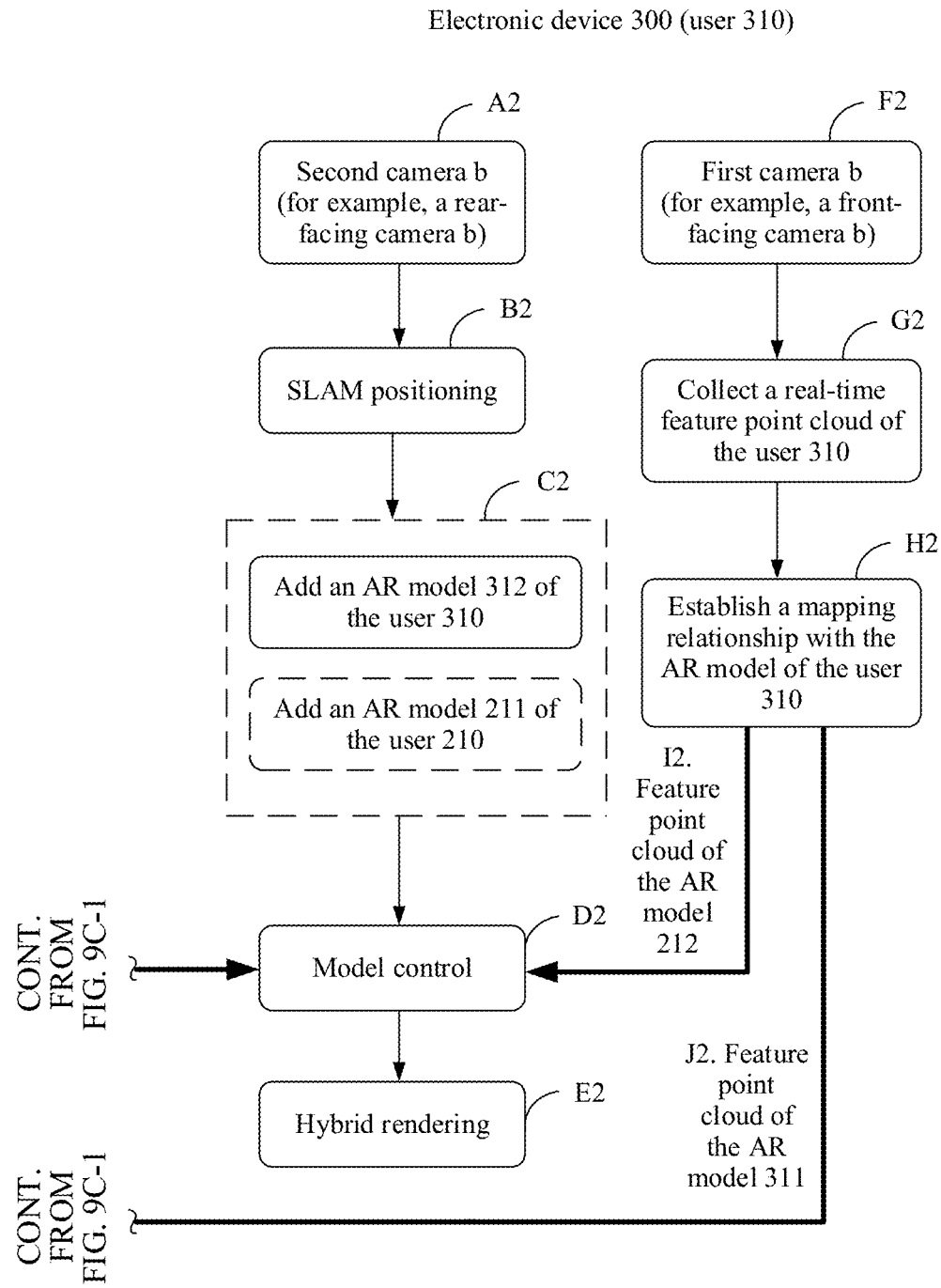

After the electronic device 200 adds the AR model to the image displayed on the touchscreen, the electronic device 200 may perform AR communication with the electronic device 300 (for example, S914 shown in FIG. 9B-2). The AR communication in this embodiment includes AR communication based on the first camera and AR communication based on the second camera. FIG. 9C-1 and FIG. 9C-2 are a schematic diagram of an instance in which an electronic device 200 performs AR communication with an electronic device 300.

In this embodiment, the electronic device 200 is used as an example herein to describe an AR communication process of the electronic device 200 based on the second camera. After enabling the rear-facing camera a (for example, A1 shown in FIG. 9C-1), the electronic device 200 may establish a unified world coordinate system by using a simultaneous localization and mapping (SLAM) positioning engine based on the electronic device 200 and the scenario 220, and initialize the coordinate system (for example, B1 shown in FIG. 9C-1). After receiving the AR models (for example, the AR model 311 and the AR model 212) added by the user to the AR scenario image of the scenario 220 (for example, C1 shown in FIG. 9C-1), the electronic device 200 may control the AR model based on a feature point cloud of the AR model (for example, D1 shown in FIG. 9C-1). For a specific manner of controlling the AR model based on the feature point cloud of the AR model, refer to the description of the "AR communication process based on the first camera". Details are not described herein again in this embodiment. Subsequently, the electronic device 200 may perform hybrid rendering on the AR scenario image of the scenario 220 and the AR model 311 by using a rendering engine of the electronic device 200 (for example, E1 shown in FIG. 9C-1). FIG. 3A is an effect diagram obtained by performing hybrid rendering on the AR scenario image of the scenario 220 and the AR model 311. For detailed descriptions of the SLAM in this embodiment of this application, refer to related descriptions in https://zhuanlan.zhihu.com/p/23247395. Details are not described herein in this embodiment of this application.

As shown in FIG. 9C-2, the electronic device 300 may perform A2 to E2. For a specific manner of performing A2 to E2 by the electronic device 300, refer to the detailed descriptions of performing A1 to E1 by the electronic device 200 in the foregoing embodiment. Details are not described herein again in this embodiment of this application.

In this embodiment, the electronic device 200 is used as an example herein to describe an AR communication process of the electronic device 200 based on the first camera.

In a process in which the electronic device 200 communicates with the electronic device 300, the front-facing camera a in the electronic device 200 may collect a real-time feature point cloud of the user 210 (for example, F1 and G1 shown in FIG. 9C-1). The real-time feature point cloud of the user 210 is used to represent real-time changes of a facial expression and a body action of the user 210. After the electronic device 200 adds the AR model 212 of the user 210 to the AR scenario image shown in FIG. 3C, the electronic device 200 may establish a mapping relationship between the three-dimensional model a and the AR model 212 of the user 210 (for example, H1 shown in FIG. 9C-1). The electronic device 200 may determine a real-time feature point cloud of the AR model 212 based on the real-time feature point cloud of the user 210 and the mapping relationship between the three-dimensional model a and the AR model 212. Then, the electronic device 200 may display, based on the real-time feature point cloud of the AR model 212, the AR model 212 whose facial expression and body action change in real time. To be specific, the electronic device 200 may control, based on the real-time feature point cloud (for example, I1 shown in FIG. 9C-1) of the AR model 212, the facial expression and the body action of the AR model 212 to change in real time. In this way, the user 210 can directly interact with the AR model 212 displayed by the electronic device 200.

After adding the AR model 311 of the user 310 to the AR scenario image shown in FIG. 3A or FIG. 3C, the electronic device 200 may indicate the AR model 311 to the electronic device 300. Specifically, if the AR model 311 is an AR model downloaded by the electronic device 200 from a cloud, the electronic device 200 may send an identifier of the AR model 311 to the electronic device 300. The identifier of the AR model 311 may be used to uniquely identify the AR model 311. After receiving the identifier of the AR model 311, the electronic device 300 may download the AR model 311 from the cloud based on the identifier of the AR model 311. Alternatively, the electronic device 200 may send the AR model 311 to the electronic device 300.

After receiving the AR model 311, the electronic device 300 may establish a mapping relationship between the three-dimensional model b (for example, a three-dimensional face model b) and the AR model 311 of the user 310 (for example, H2 shown in FIG. 9C-2). For example, as shown in FIG. 9A, the electronic device 300 may establish a mapping relationship between the three-dimensional face model b and the AR model 311. For example, the electronic device 300 may establish a mapping relationship between b and the AR model 311 of the user 310 by using a point cloud matching algorithm such as an iterative nearest point (Iterative Closest Point, ICP) algorithm. After the mapping relationship between b and the AR model 311 of the user 310 is established, facial features of the user 310 and facial features of the AR model 311 already match each other. For example, a one-to-one mapping relationship has been established between a nose of the user 310 and a nose of the AR model 311.

In a process in which the electronic device 300 communicates with the electronic device 200, the front-facing camera b in the electronic device 300 may collect a real-time feature point cloud (for example, a facial feature point cloud and a body feature point cloud) of the user 310 (for example, F2 and G2 shown in FIG. 9C-2). The real-time feature point cloud of the user 310 is used to represent real-time changes of a facial expression and a body action of the user 310. The electronic device 300 may determine a real-time feature point cloud of the AR model 311 based on the real-time feature point cloud of the user 310 and the mapping relationship between the three-dimensional model b and the AR model 311. The electronic device 300 may send the real-time feature point cloud of the AR model 311 to the electronic device 200 (for example, J2 shown in FIG. 9C-2). After receiving the real-time feature point cloud of the AR model 311, the electronic device 200 may display, based on the real-time feature point cloud of the AR model 311, the AR model 311 whose facial expression and body action change in real time. To be specific, the electronic device 200 may control, based on the real-time feature point cloud of the AR model 311, the facial expression and the body action of the AR model 311 to change in real time. In this way, the user 310 can directly interact with the AR model 311 displayed by the electronic device 200.

A method in which the electronic device 200 performs H1 to J1 shown in FIG. 9C-1 to send a real-time feature point cloud of the AR model 211 to the electronic device 300, and the electronic device 300 controls a facial expression and a body action of the AR model 211 to change in real time, and a method in which the electronic device 300 performs H2 and I2 shown in FIG. 9C-2 to control a facial expression and a body action of the AR model 312 to change in real time are not described herein in this embodiment of this application.

It should be noted that the AR communication interface in this embodiment is different from a common graphical user interface. The AR communication interface is an interface in which hybrid rendering is performed, by using an AR technology, on a collected image of a real scenario and a virtual object displayed on a touchscreen and information interaction can be generated. Elements such as an icon, a button, and a text in the AR communication interface may correspond to a real scenario. If the collected real scenario changes, the AR communication interface on the touchscreen also changes accordingly. In this embodiment, the AR communication interface may include an image obtained by adding one or more AR models (namely, virtual objects) to a real scenario collected by a second camera (for example, a rear-facing camera) in an electronic device (for example, the electronic device 200), and performing hybrid rendering on the real scenario and the AR model. For example, any one of FIG. 3A to FIG. 3D, FIG. 5B, FIG. 6A, FIG. 6D, FIG. 7C, FIG. 11B, FIG. 11C, FIG. 14A, and FIG. 14B is a schematic diagram of an instance of an AR communication interface according to this embodiment. In an example of the AR communication interface 303 shown in FIG. 3C, the scenario 220 in the AR communication interface 303 is a real scenario, and the AR model 311 and the AR model 212 are virtual objects. In an example of the AR communication interface 304 shown in FIG. 3D, the scenario 320 in the AR communication interface 304 is a real scenario, and the AR model 312 and the AR model 211 are virtual objects.

The common graphical user interface includes an image generated by a processor of the electronic device in response to an operation of the user. The common graphical user interface does not include an image obtained by performing hybrid rendering on an image of a real scenario and an AR model. For example, any one of FIG. 4A, FIG. 4B, FIG. 5A, FIG. 6B, FIG. 6C, FIG. 7A, FIG. 7B, FIG. 7D to FIG. 7E, FIG. 10A, FIG. 10B, FIG. 11A, and FIG. 11D is a schematic diagram of an instance of a common graphical user interface according to this embodiment.

To enable a person skilled in the art to better understand the method in the foregoing embodiment and understand a procedure of interaction between the electronic device 200 and the electronic device 300, FIG. 9B-1, FIG. 9B-2, and FIG. 9B-3 are a flowchart of an augmented reality communication method according to the foregoing embodiment. As shown in FIG. 9B-1, FIG. 9B-2, and FIG. 9B-3, the electronic device 200 performs AR communication with the electronic device 300 by using an AR server 900.

In some embodiments, the electronic device 200 may request, in a process of invoking a "Phone" application to perform voice communication or video communication with the electronic device 300, to perform AR communication with the electronic device 300.

In a case of this embodiment, the AR server 900 may include a base station of the electronic device 200, a base station of the electronic device 300, and a core network device. In S903, the electronic device 200 may send the AR communication request information to the base station of the electronic device 200 in response to the first operation. The base station of the electronic device 200 sends the AR communication request information to the base station of the electronic device 300 by using the core network device. After receiving the AR communication request information, the base station of the electronic device 300 sends the AR communication request information to the electronic device 300. Similarly, the first AR communication response information in S906 and the second AR communication response information in S916 may also be sent by the electronic device 300 to the electronic device 200 by using the base station of the electronic device 300, the core network device, and the base station of the electronic device 200.

In addition, in S914, the electronic device 200 and the electronic device 300 may also exchange AR communication data by using the AR server 900 (that is, the base station of the electronic device 200, the base station of the electronic device 300, and the core network device). For example, the electronic device 200 may send the identifier of the AR model 311 or the AR model 311 to the electronic device 300 by using the electronic device 200, the base station of the electronic device 200, the core network device, and the base station of the electronic device 300. For another example, the electronic device 300 may send the real-time feature point cloud of the user 310 to the electronic device 200 by using the base station of the electronic device 300, the core network device, and the base station of the electronic device 200.

In another case of this embodiment, the AR server 900 does not include a base station of the electronic device 200, a base station of the electronic device 300, and a core network device. The AR server 900 is a dedicated server configured to provide an AR communications service for an electronic device (for example, the electronic device 200 or the electronic device 300).

In this case, the electronic device 200 and the electronic device 300 perform S901 and S919 to transmit data by using the base station of the electronic device 200, the base station of the electronic device 300, and the core network device. The electronic device 200 performs S903, S910, and S917, the electronic device 300 performs the operation of "receiving the AR communication request information" in S904, S906, and S916, and the electronic device 200 and the electronic device 300 perform S914 to transmit data by using the AR server 900.

In some other embodiments, the electronic device 200 may request, in a process of invoking a third-party application (for example, a "WeChat" application) to perform voice communication or video communication with the electronic device 300, to perform AR communication with the electronic device 300. In this embodiment, the AR server is a server of the third-party application, for example, a server of the "WeChat" application.

In this embodiment, the electronic device 200 and the electronic device 300 perform S901, S919, and S914, the electronic device 200 performs S903, S910, and S917, and the electronic device 300 performs the operation of "receiving the AR communication request information" in S904, S906, and S916 to transmit data by using the AR server 900.

Figure 10A:
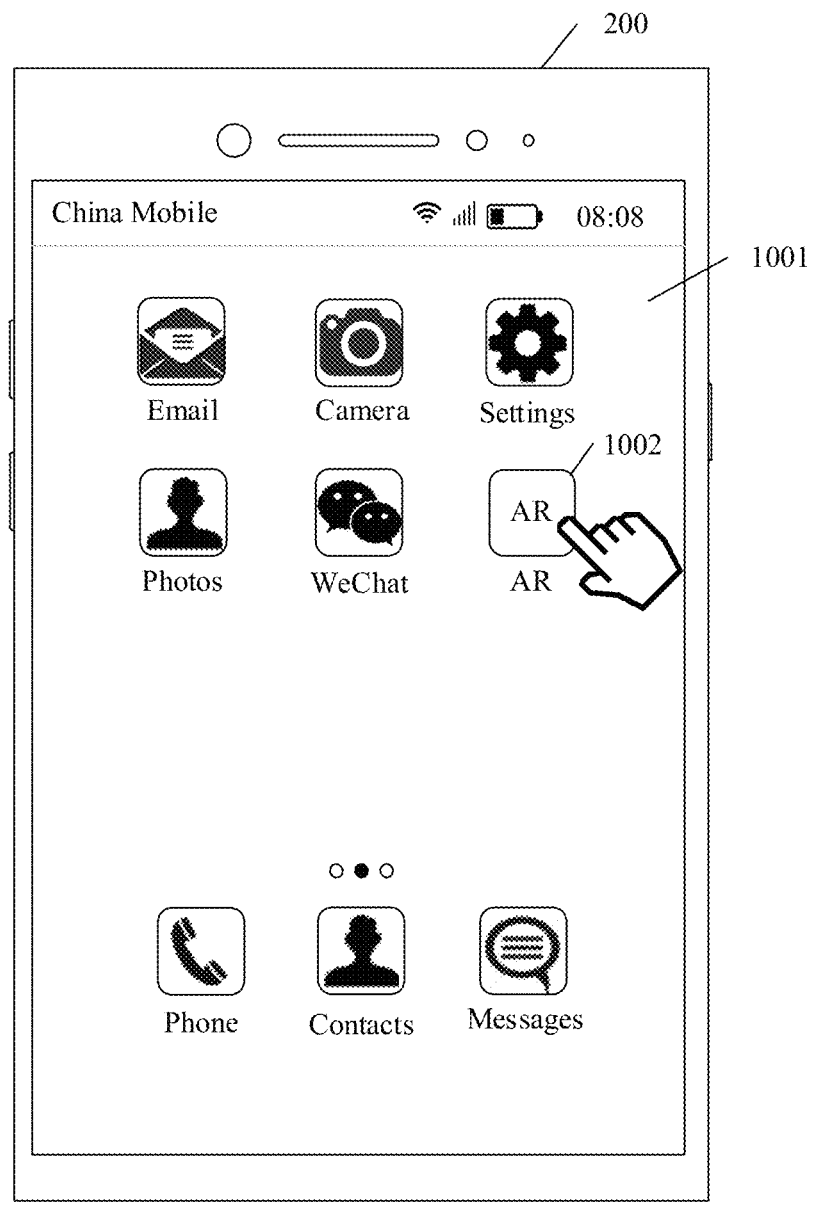
FIG. 10A and FIG. 10B are schematic diagrams of instances of AR communication interfaces according to another embodiment.
Figure 10B:
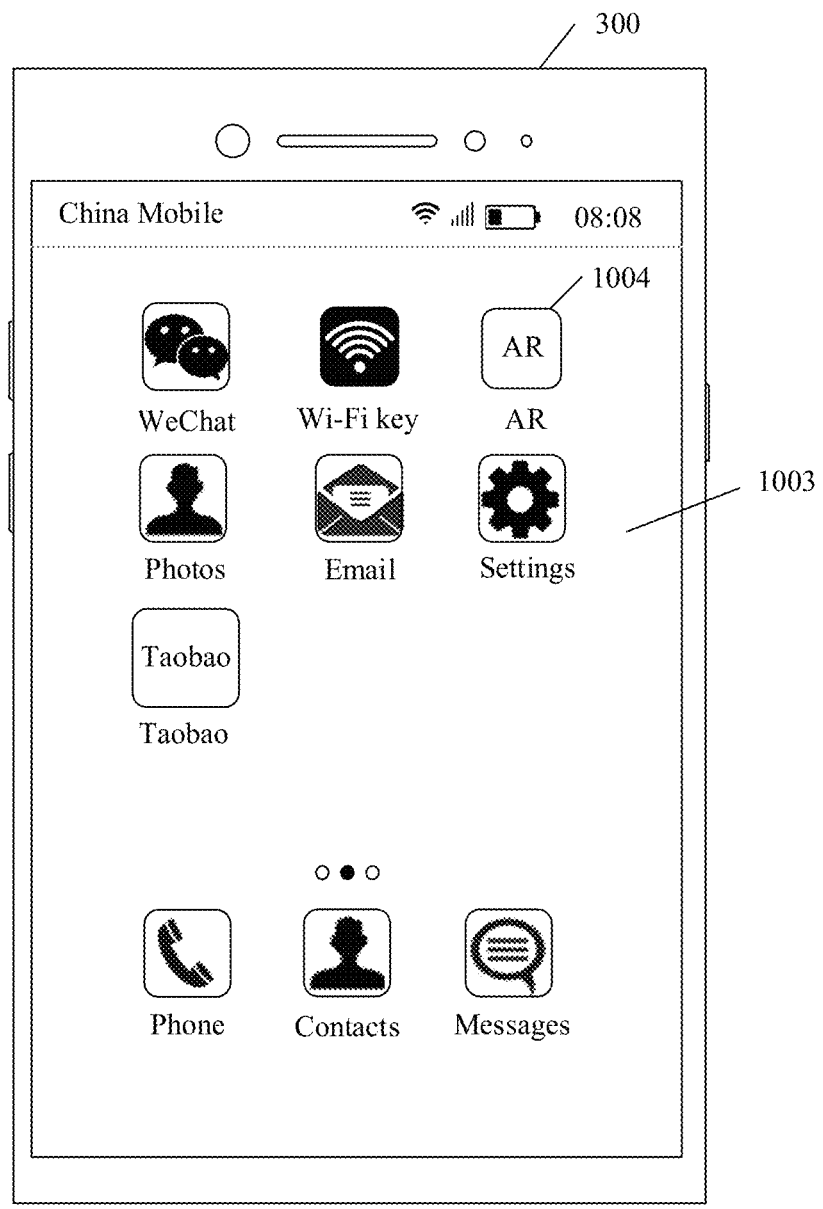

In another embodiment, the AR application is installed in each of the electronic device 200 and the electronic device 300. The AR application is a client that can be used to provide an AR communications service for the user. The AR application installed in the electronic device 200 may perform data exchange with the AR application in the electronic device 300 by using the AR server, to provide AR communications services for the user 210 and the user 310. For example, as shown in FIG. 10A, a home screen (namely, a home screen) 1001 of the electronic device 200 includes an application icon 1002 of the AR application. As shown in FIG. 10B, a home screen 1003 of the electronic device 300 includes an application icon 1004 of the AR application. The electronic device 200 shown in FIG. 2 invokes the AR application to perform the AR communication in this embodiment of this application with the electronic device 300. For example, the electronic device 200 may receive a tap operation (for example, a single tap operation) performed by the user on the application icon 1002 shown in FIG. 10A, and display an AR application interface 1101 shown in FIG. 11A. The AR application interface 1101 includes a "New friend" option 1102 and at least one contact option. For example, the at least one contact option includes a contact option 1103 of Bob (Bob) and a contact option 1104 of a user 311. The "New friend" option 1102 is used to add a new contact. In response to a tap operation (for example, a single tap operation) performed by the user on the contact option 1104 of the user 311, the electronic device 200 may perform the AR communication method provided in the embodiments of this application, and perform AR communication with the electronic device 300.

Figure 11A:
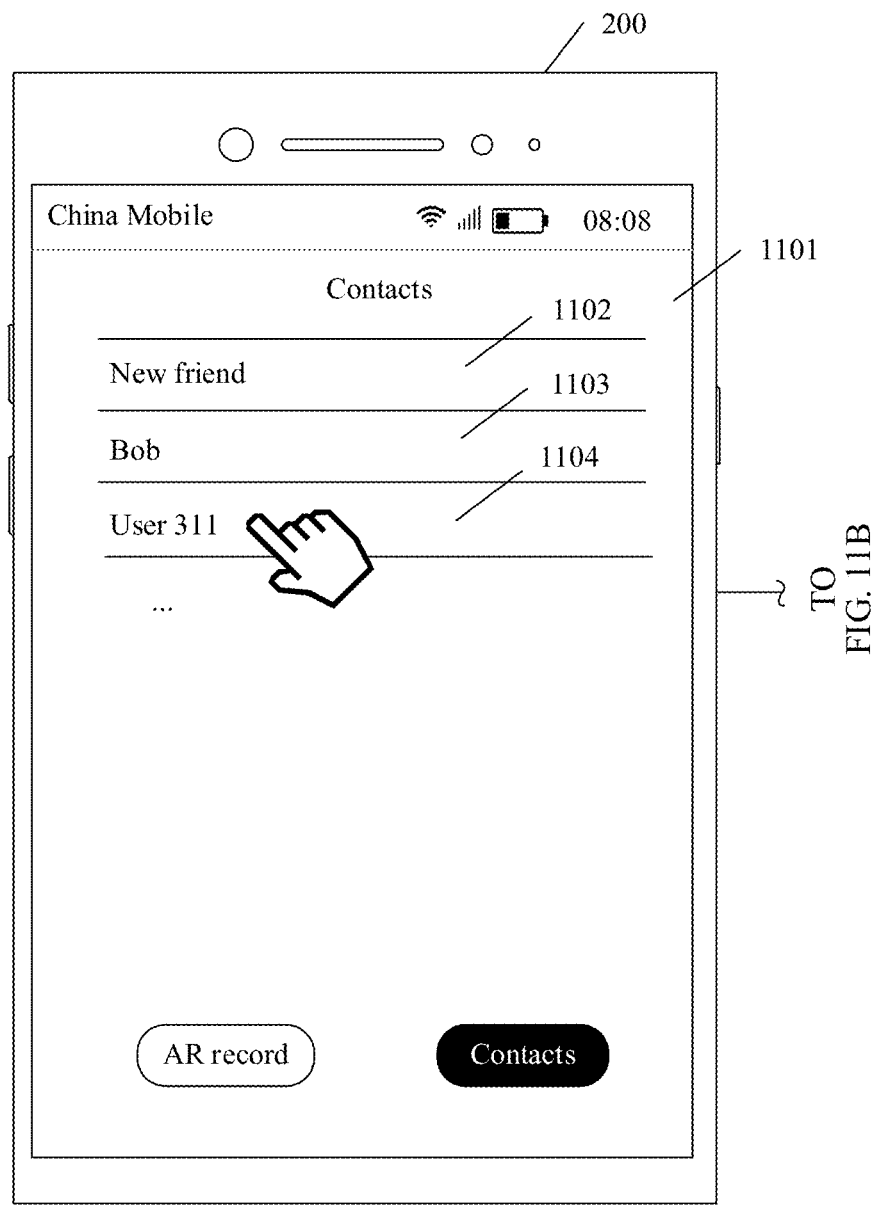
FIG. 11A to FIG. 11D are schematic diagrams of instances of AR communication interfaces according to another embodiment.
Figure 11B:
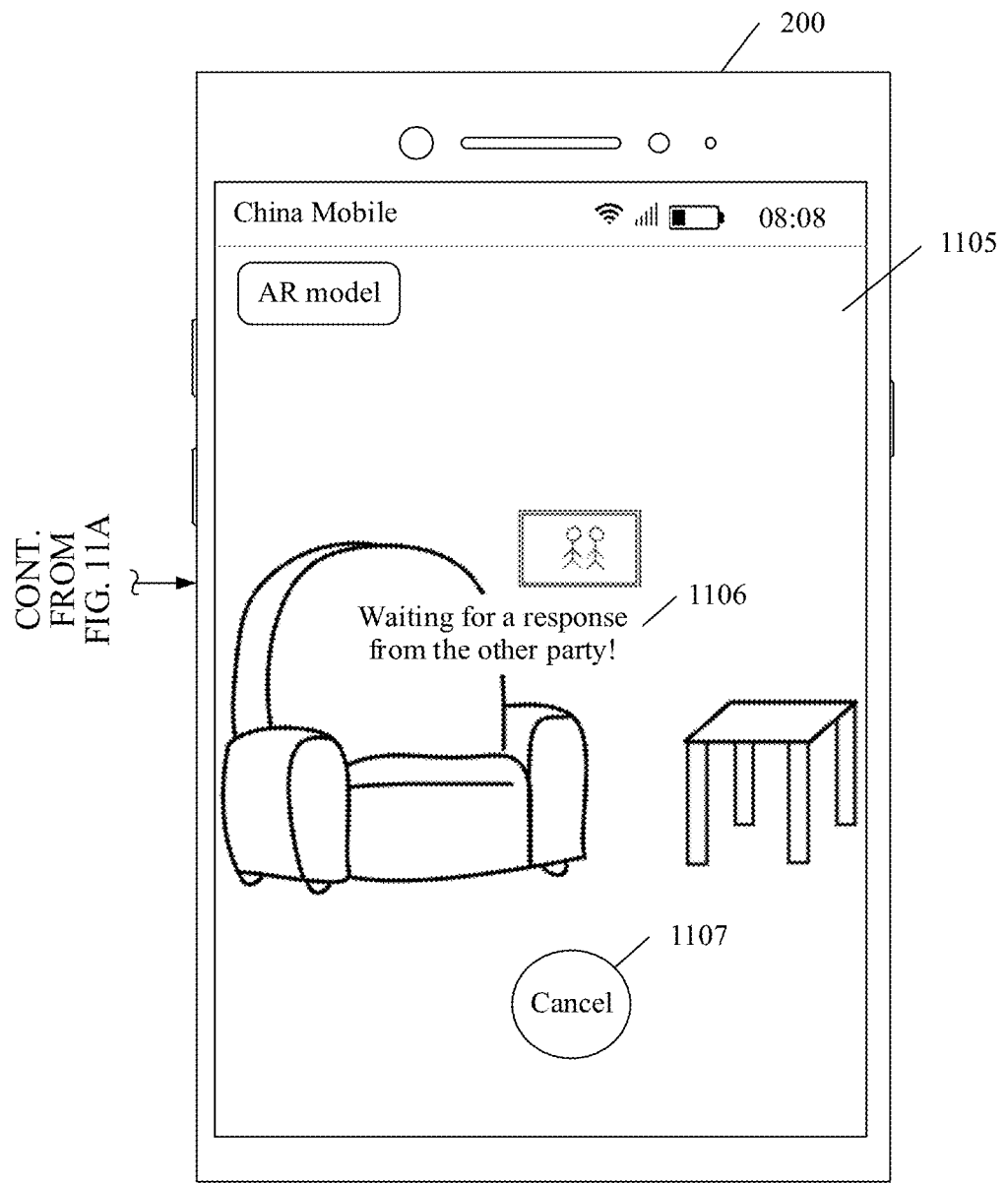
Figure 11C:
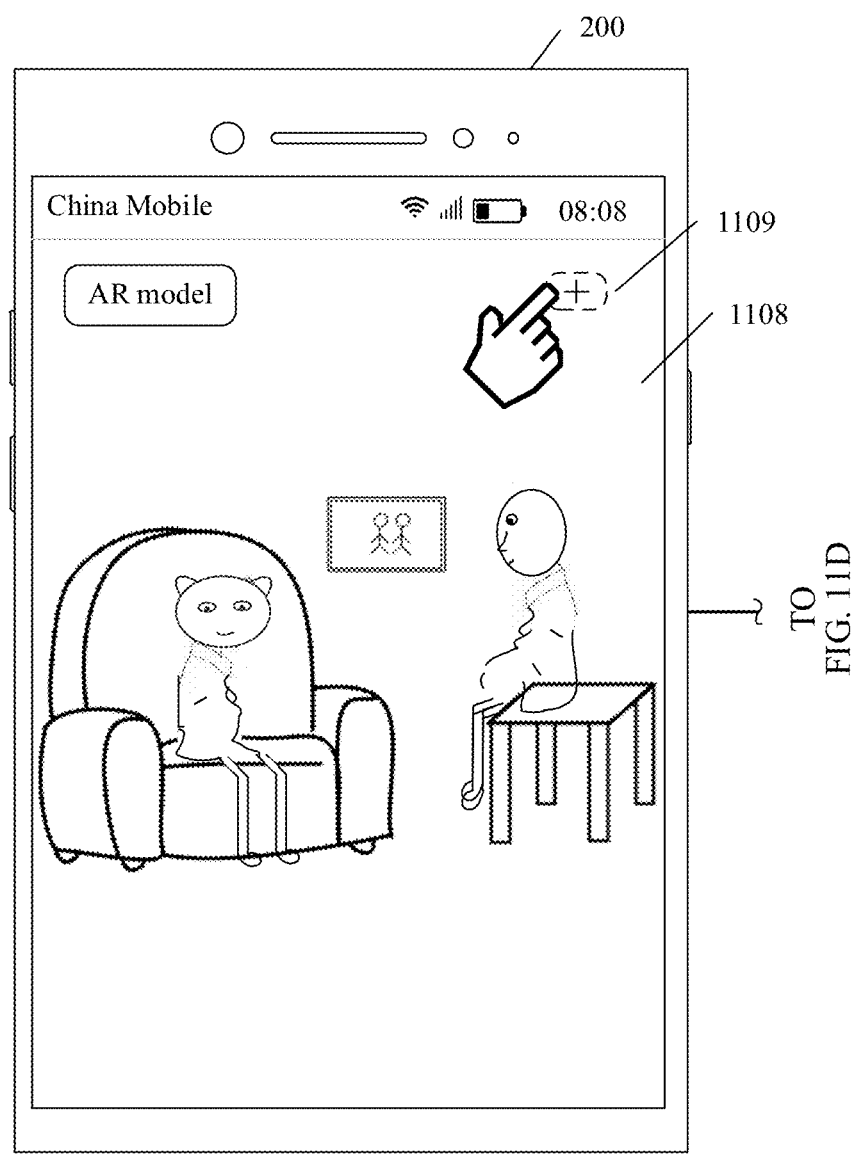
Figure 11D:
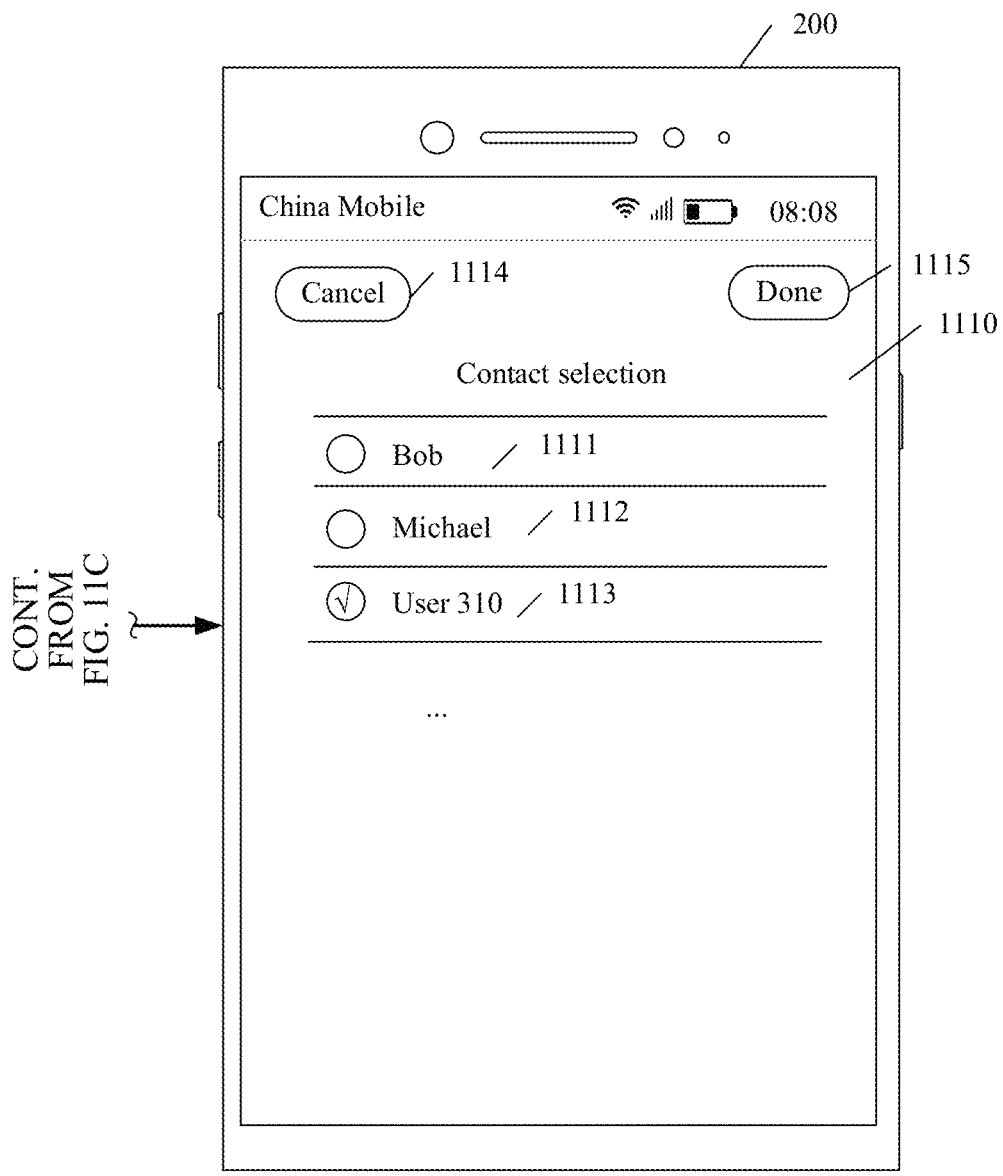

For example, in response to the tap operation performed by the user on the contact option 1104, the electronic device 200 may enable the rear-facing camera a, and as shown in FIG. 11B, display an AR communication interface 1105 including an AR scenario image of the scenario 220 that is collected by the rear-facing camera a. The AR communication interface 1105 includes third prompt information "Waiting for a response from the other party!" 1106 and a "Cancel" button 1107. The "Cancel" button 1107 is used to trigger the electronic device 200 to cancel AR communication with the electronic device 300. The electronic device 200 may further send the AR communication request information to the electronic device 300 in response to the tap operation performed by the user on the contact option 1104. For a specific method for performing AR communication between the electronic device 200 and the electronic device 300 after the electronic device 200 sends the AR communication request information to the electronic device 300, refer to the detailed descriptions in the foregoing embodiment. Details are not described herein again in this embodiment of this application.

In some embodiments, in a process in which the electronic device 200 performs AR communication with the electronic device 300, as the electronic device 200 moves, framing content of the second camera a (for example, the rear-facing camera a) changes, and an image of a real scenario that is collected by the rear-facing camera a and an AR communication interface displayed by the electronic device 200 also change accordingly. In addition, as the image of the real scenario that is collected by the electronic device 200 changes, an AR model in the AR communication interface displayed by the electronic device 200 also moves with the movement of the electronic device 200 in the image of the real scenario that is collected by the electronic device 200 in real time.

For example, as shown in FIG. 7C, the image of the scenario 220 that is collected by the electronic device 200 is an image collected by the electronic device 200 in a living room of the user 210. The image of the scenario 220 includes a sofa and a stool, the AR model 311 is seated on the sofa, and the AR model 212 is seated on the stool. If the electronic device 200 moves from the living room to an outdoor lawn, as the electronic device 200 moves, the image of the real scenario that is collected by the rear-facing camera a in the electronic device 200 changes in real time, and the AR communication interface displayed by the electronic device 200 also changes accordingly. The AR communication interface displayed by the electronic device 200 may include the image that is of the real scenario and that changes in real time in the distance from the living room to the outdoor lawn. In addition, when displaying the image that is of the real scenario and that changes in real time in the distance from the living room to the outdoor lawn, the electronic device 200 may display a dynamic image in which the AR model 311 and the AR model 212 walk from the living room to the outdoor lawn in the image that is of the real scenario and that changes in real time.

In some other embodiments, after the electronic device 200 adds an AR model to a specific location (for example, a sofa of the scenario 220) in an image of a real scenario (for example, the scenario 220), if framing content of the second camera a (for example, the rear-facing camera a) of the electronic device 200 changes, that is, the framing content of the second camera a changes from the scenario 220 to another scenario that does not include the specific location, not only the image of the real scenario that is displayed by the electronic device 200 changes, but also the AR model added to the image of the scenario 220 disappears. When the framing content of the electronic device 200 is switched back to the scenario 220, the AR model appears at the specific location (for example, the sofa of the scenario 220) in the image of the scenario 220.

For example, the electronic device 200 is smart glasses. The smart glasses include a first camera and a second camera. The first camera is configured to collect behavior action information (for example, facial feature information or body action information) of the user 210 wearing the smart glasses. The second camera is configured to collect an image of the real scenario 220. In a process in which the smart glasses perform AR communication with another electronic device, if framing content of the second camera in the smart glasses is the scenario 220 shown in FIG. 2, the smart glasses may display the AR communication interface (including the AR model 311) shown in FIG. 3A, so that the user wearing the smart glasses can see the AR model 311 of the user 310 in the scenario 220, and communicate with the AR model 311 face to face. If the framing content of the second camera in the smart glasses changes (for example, the user 210 backs onto the scenario 220 or the user 210 leaves the scenario 220), the image of the real scenario that is displayed by the smart glasses changes, and the AR model 311 also disappears. When the framing content of the smart glasses is switched back to the scenario 220, the AR model 311 appears at a specific location (for example, a sofa of the scenario 220) in the image of the scenario 220.

It should be noted that in the foregoing embodiment, only an example in which the electronic device 200 performs AR communication with the electronic device 300 is used to describe the augmented reality communication method provided in this embodiment of this application. The enhanced display communication method provided in this embodiment of this application may be further applied to a process in which three or more electronic devices perform AR communication. For example, in a process in which the electronic device 200 performs AR communication with the electronic device 300, the electronic device 200 displays an AR communication interface 1108 shown in FIG. 11C. Different from the AR communication interface 706 shown in FIG. 7C, the AR communication interface 1108 may further include an "Add" button 1109. The electronic device 200 may display, in response to a tap operation (for example, a single tap operation) performed by the user on the "Add" button 1109, a contact selection interface 1110 shown in FIG. 11D. The contact selection interface 1110 includes a "Done" button 1115, a "Cancel" button 1114, and a plurality of contact options, for example, a contact option 1111 of Bob, a contact option 1112 of Michael, and a contact option 1113 of the user 310. Because the electronic device 200 is performing AR communication with the electronic device 300 (an electronic device of the user 310), the contact option 1113 of the user 310 on the contact selection interface 1110 is in a selected state (for example, is ticked). The electronic device 200 may receive a selection operation performed by the user on a contact option (for example, at least one contact option such as the contact option 1111 of Bob or the contact option 1112 of Michael) other than the contact option 1113 of the user 310, and request to perform AR communication with a corresponding electronic device. For a method in which the electronic device 200 requests to perform AR communication with the electronic device, refer to the method in which the electronic device 200 requests to perform AR communication with the electronic device 300 in the foregoing embodiment. Details are not described herein again in this embodiment of this application.

Figure 12:
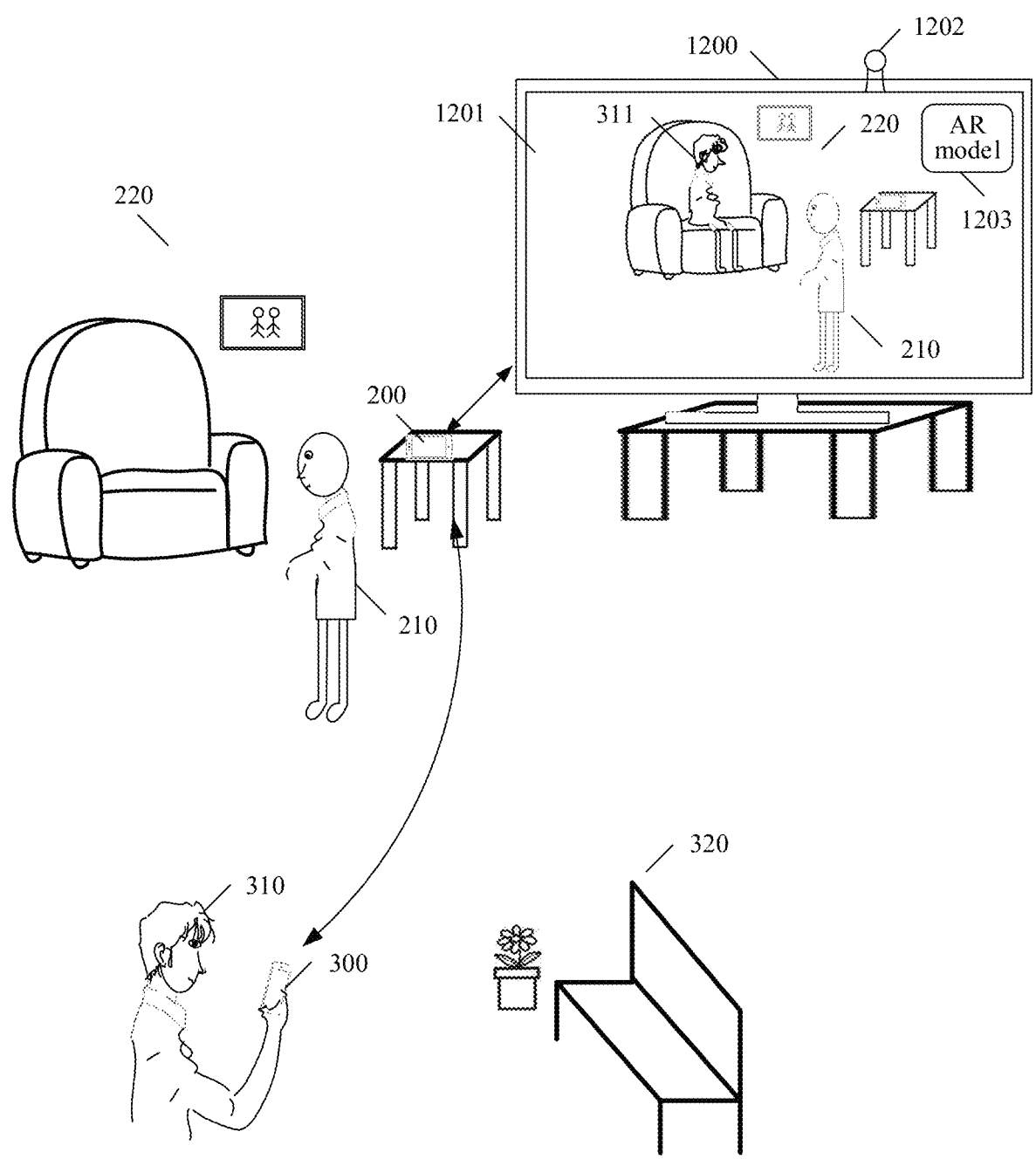
FIG. 12 is a schematic diagram of an instance of a communication scenario to which an augmented reality communication method is applied according to another embodiment.

FIG. 12 is a schematic diagram of an instance of a communication scenario to which an augmented reality communication method is applied according to an embodiment of this application. The electronic device 200 establishes a connection to a large-screen device (for example, a smart television) 1200. The large-screen device 1200 includes a camera 1202. The camera 1202 may be a built-in camera of the large-screen device 1200, or the camera 1202 may be an external camera of the large-screen device 1200. The connection between the electronic device 200 and the large-screen device 1200 may be a wired connection or a wireless connection. The wireless connection may be a Wi-Fi connection or a Bluetooth connection. The electronic device 300 includes a front-facing camera, a rear-facing camera, and a touchscreen. For hardware structures of the electronic device 200 and the electronic device 300, refer to descriptions of the electronic device 100 shown in FIG. 1 in the embodiments of this application. Details are not described herein again in this embodiment of this application.

For example, the large-screen device in this embodiment of this application may be a large-screen electronic device, for example, a smart television, a personal computer (PC), a notebook computer, a tablet computer, or a projector. In this embodiment of this application, an example in which the large-screen device is the smart television is used to describe the method in the embodiments of this application.

It should be noted that in the application scenario shown in FIG. 12, for a manner in which the electronic device 200 initiates enhanced display communication to the electronic device 300, refer to the manner in which the electronic device 200 initiates enhanced display communication to the electronic device 300 in the foregoing embodiments. Details are not described herein again in this embodiment of this application.

As shown in FIG. 12, the user 210 communicates, by using the electronic device 200, with the user 310 that uses the electronic device 300. To improve visual experience of performing AR communication with the electronic device 300 by the user 210 by using the electronic device 200, the electronic device 200 may control the camera 1202 in the large-screen device 1200 to collect an AR scenario image of the scenario 220 and a real-time feature point cloud of the user 210, and control the large-screen device 1200 to display the AR scenario image of the scenario 220 that is collected by the camera 1202. As shown in FIG. 12, the large-screen device 1200 may display an AR communication interface 1201. Because both the scenario 220 and the user 210 are within a framing range of the camera 1202, the AR communication interface 1201 displayed by the large-screen device 1200 includes the AR scenario image of the scenario 220 and an image of the user 210.

In this embodiment of this application, the electronic device 200 may add, in response to an operation performed by the user on the touchscreen of the electronic device 200, the AR model 311 of the user 310 to the AR scenario image in the AR communication interface 1201 displayed by the large-screen device 1200. Specifically, the electronic device 200 may be used as a touchpad, and the user may operate the electronic device 200 to add the AR model 311 of the user 310 to the AR scenario image in the AR communication interface 1201 displayed by the large-screen device 1200. For a method for adding the AR model 311 of the user 310 by the electronic device 200 to the AR scenario image displayed by the large-screen device 1200, refer to the method for adding the AR model 311 of the user 310 by the electronic device 200 to the AR scenario image displayed by the electronic device 200. Details are not described herein again in this embodiment of this application.

Figure 13:
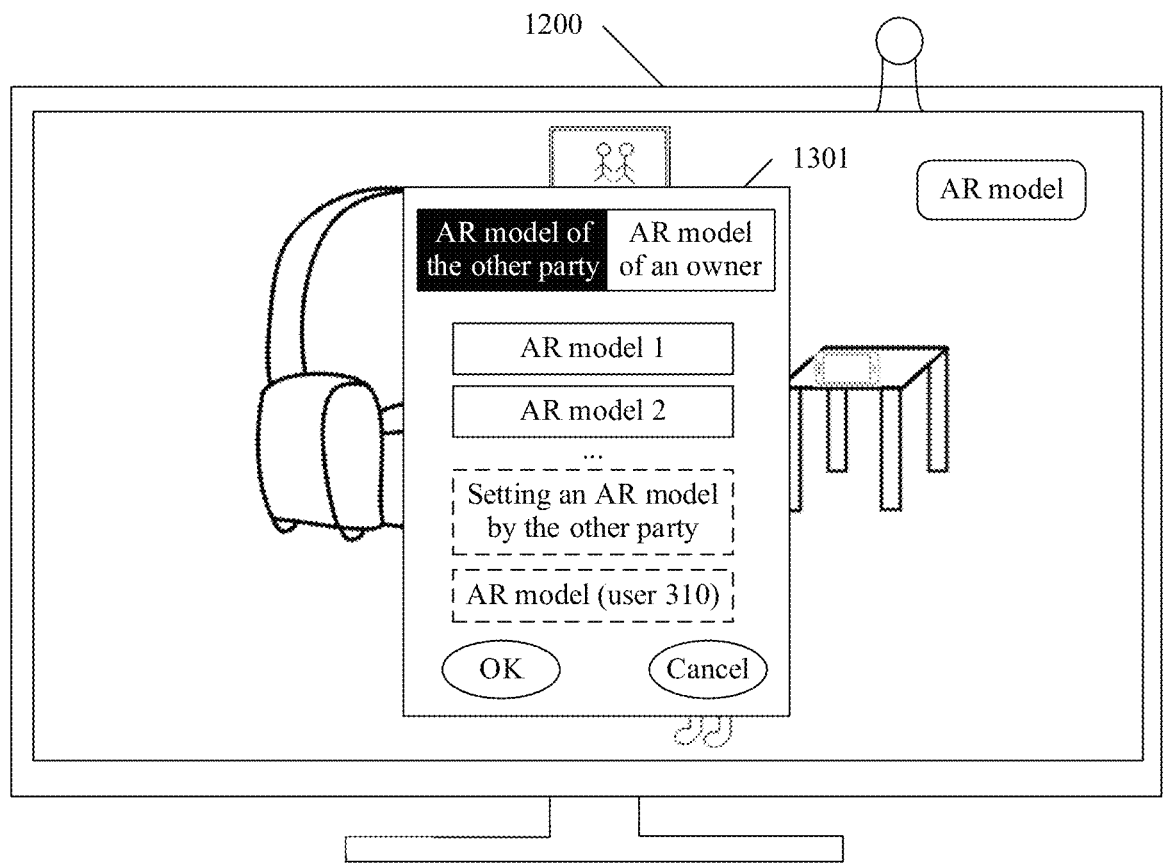
FIG. 13 is a schematic diagram of an instance of an AR communication interface according to another embodiment.

In some embodiments, the large-screen device 1200 may be further connected to an external device (for example, a mouse or a keyboard). As shown in FIG. 12, the AR communication interface 1201 displayed by the large-screen device 1200 may further include an "AR model" option 1203. The user may click the "AR model" option 1203 by using the foregoing external device. The electronic device 200 may control, in response to a click operation performed by the user on the "AR model" option 1203 in the AR communication interface 1201 displayed by the large-screen device 1200, the large-screen device 1200 to display a model selection interface 1301 shown in FIG. 13. The large-screen device 1200 may receive an operation performed by the user on the model selection interface 1301 by using the external device, and send corresponding operation information to the electronic device 200. After receiving the operation information, the electronic device 200 may add, in response to a corresponding operation, the AR model 311 of the user 310 to the AR scenario image displayed by the large-screen device 1200. For a method in which the electronic device 200 adds, in response to the operation performed by the user on the model selection interface 1301, the AR model 311 to the AR scenario image displayed by the large-screen device 1200, refer to the method in which the electronic device 200 adds, in response to the operation performed by the user on the model selection interface 612 shown in FIG. 6C, the AR model 311 to the AR scenario image displayed by the electronic device 200 in the foregoing embodiments. Details are not described herein again in this embodiment of this application.

After adding the AR model 311 to the AR scenario image displayed by the large-screen device 1200, the electronic device 200 may indicate the AR model 311 to the electronic device 300. For a method for indicating the AR model 311 by the electronic device 200 to the electronic device 300, refer to the specific descriptions in the foregoing embodiments. Details are not described herein again in this embodiment of this application. After receiving the AR model 311, the electronic device 300 may establish a mapping relationship between the three-dimensional model b and the AR model 311 of the user 310. In a process in which the electronic device 300 communicates with the electronic device 200, the front-facing camera b in the electronic device 300 may collect a real-time feature point cloud of the user 310. The electronic device 300 may determine a real-time feature point cloud of the AR model 311 based on the real-time feature point cloud of the user 310 and the mapping relationship between the three-dimensional model b and the AR model 311. The electronic device 300 may send the real-time feature point cloud of the AR model 311 to the electronic device 200. After receiving the real-time feature point cloud of the AR model 311, the electronic device 200 may control, based on the real-time feature point cloud of the AR model 311, the large-screen device 1200 to display the AR model 311 whose facial expression and body action change in real time. In this way, the user 310 can directly interact with the AR model 311 displayed by the large-screen device 1200.

The electronic device 300 shown in FIG. 12 may also add an AR model of the user 210 and an AR model of the user 310 to an AR scenario image displayed by the electronic device 300. For a specific method in which the electronic device 300 shown in FIG. 12 adds the AR models of the user 210 and the user 310 to the AR scenario image, a method in which the user 210 directly interacts with the AR model of the user 210 that is displayed by the electronic device 300, and a method in which the user 310 directly interacts with the AR model of the user 310 that is displayed by the electronic device 300, refer to the foregoing related descriptions in the embodiments of this application. Details are not described herein again in this embodiment of this application.

In some embodiments, after the electronic device 200 displays the AR communication interface including the AR model 311 of the user 310, the electronic device 200 may receive an interaction operation performed by the user 210 on the AR model 311 on the touchscreen (for example, the user 310 pats a head of the AR model 311). In response to the pat operation performed by the user 210 on the head of the AR model 311 displayed on the touchscreen, the electronic device 200 may simulate a reflection action performed when a head of a human body is patted, and display a dynamic image in which the AR model 311 performs the reflection action when the head is patted, so that the user 210 interacts with the AR model 311. In addition, in response to the pat operation performed by the user 210 on the head of the AR model 311 displayed on the touchscreen, the electronic device 200 may send information about the pat action to the electronic device 300, so that the touchscreen of the electronic device 300 may display, based on the information about the pat action, a dynamic image in which the AR model 312 performs a reflection action when a head is patted. If the electronic device 300 is a smart helmet, the smart helmet may further provide a vibration prompt after receiving the information about the pat action.

Figure 14A:
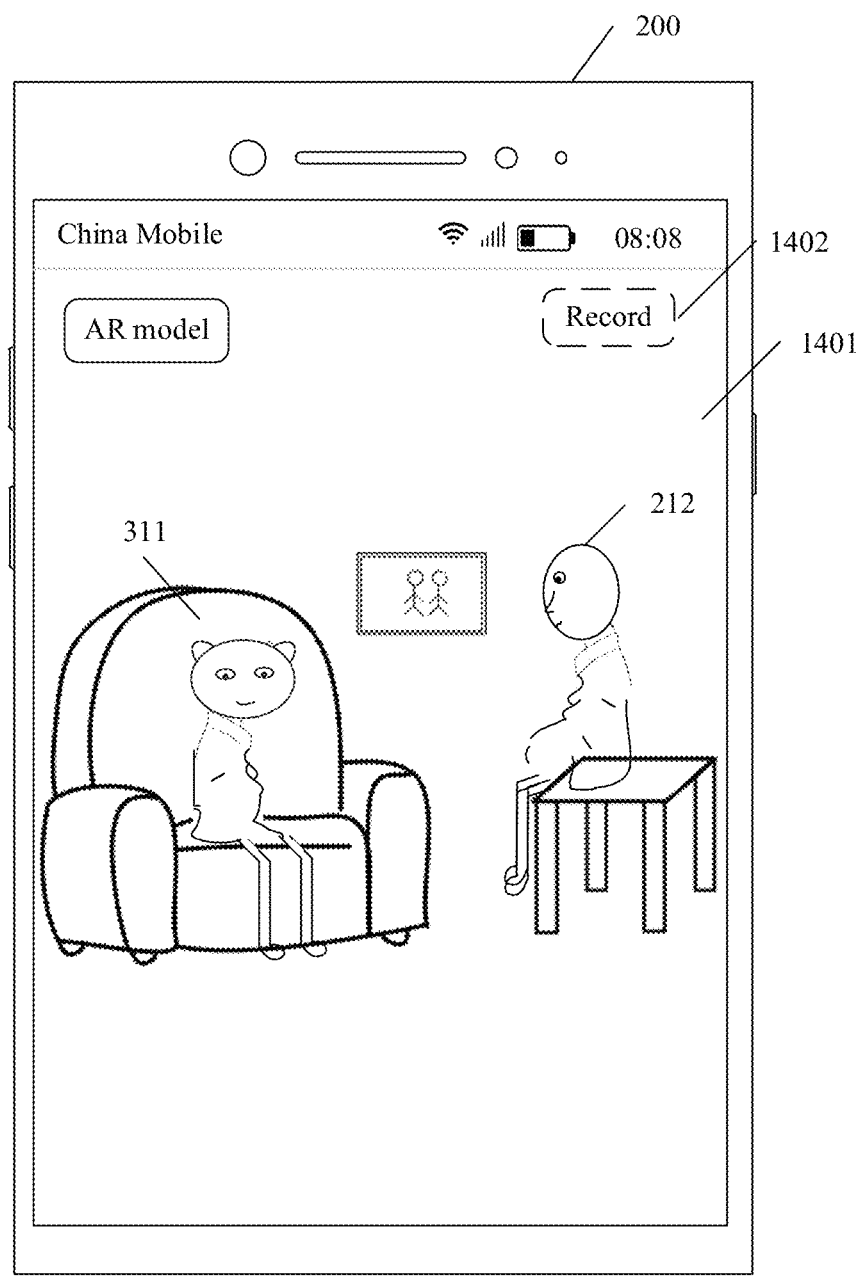
FIG. 14A and FIG. 14B are schematic diagrams of instances of AR communication interfaces according to another embodiment.
Figure 14B:
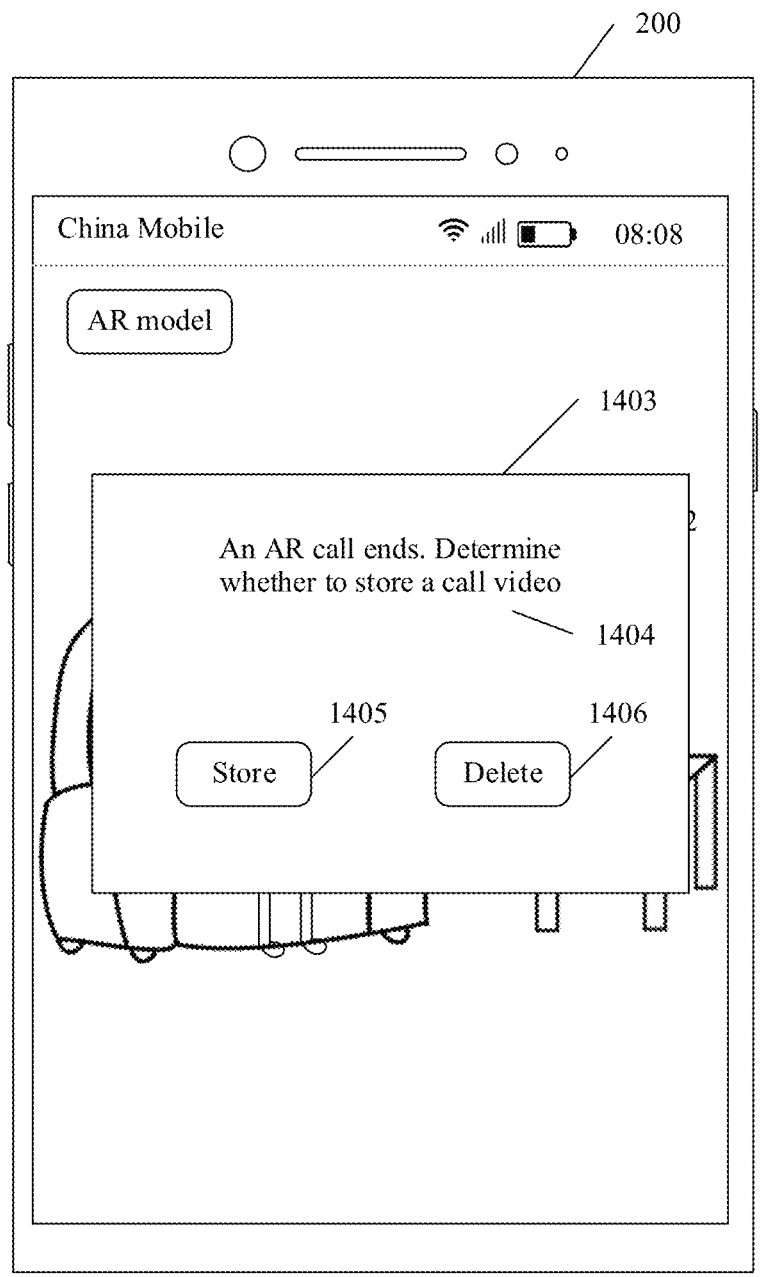

In some embodiments, in a process of performing AR communication with the electronic device 300, the electronic device 200 may record and store, in response to a recording operation (namely, a third operation) of the user, video data obtained when the AR model 311 communicates with the AR model 212 face to face. After AR communication between the electronic device 200 and the electronic device 300 ends, the electronic device 200 stores the video data obtained when the AR model 311 communicates with the AR model 212 face to face. For example, the recording operation may be a fifth preset gesture entered by the user 210 in the AR communication interface displayed by the electronic device 200, for example, an S-shaped gesture or a slide-up gesture. The fifth preset gesture is different from the fourth preset gesture. For another example, as shown in FIG. 14A, an AR communication interface 1401 includes a "Record" button 1402. The recording operation may be a tap operation (for example, a single tap operation, a double tap operation, or a touch and hold operation) performed by the user 210 on the "Record" button 1402.

In some other embodiments, when starting to perform AR communication with the electronic device 300, the electronic device 200 may automatically record video data obtained when the AR model 311 communicates with the AR model 212 face to face. When AR communication between the electronic device 200 and the electronic device 300 ends, the electronic device 200 may display prompt information used to determine whether to store the video data. The electronic device 200 can store the recorded video data if the user 210 determines to store the video data. The electronic device 200 can delete the recorded video data if the user determines not to store the video data. For example, when AR communication between the electronic device 200 and the electronic device 300 ends, the electronic device 200 may display a prompt box 1403 shown in FIG. 14B. The prompt box 1403 includes prompt information "An AR call ends. Determine whether to store a call video" 1404, a "Store" button 1405, and a "Delete" button 1406. The electronic device 200 may store the recorded video in response to a tap operation (for example, a single tap operation) performed by the user on the "Store" button 1405. The electronic device 200 may delete the recorded video data in response to a tap operation (for example, a single tap operation) performed by the user on the "Delete" button 1406.

If the AR communication is initiated in a process in which the electronic device 200 invokes a "Phone" application (namely, a system application) to perform voice communication or video communication with the electronic device 300, the electronic device 200 may store recorded video data in a "Photos" application (namely, a system application) of the electronic device 200. The user 210 may view the video data in the "Photos" application.

If the AR communication is initiated in a process in which the electronic device 200 invokes a third-party application (for example, a "WeChat" application or the AR application) to perform voice communication or video communication with the electronic device 300, the electronic device 200 may store recorded video data in the third-party application. The user 210 may view the video data in the third-party application. Certainly, in this case, the electronic device 200 may also store the recorded video data in a "Photos" application (namely, a system application). This is not limited in this embodiment.

In some other embodiments, after the electronic device 200 displays the AR communication interface including the AR model 311 of the user 310, the electronic device 200 may receive a fourth operation (for example, a double tap operation or a touch and hold operation) performed by the user 210 on the AR model 311 on the touchscreen. The electronic device 200 may display contact information of the user 310 in response to the fourth operation performed by the user 210 on the AR model 311 displayed on the touchscreen. The contact information may include a phone number, an email address, a profile picture, and the like of the user 310. The contact information is stored in the electronic device 200, or the contact information is obtained by the electronic device 200 from a cloud (for example, an AR server) in response to the fourth operation.

In some other embodiments, in a process in which the electronic device 200 performs AR communication with the electronic device 300, a microphone of the electronic device 200 may receive voice data (namely, a first sound signal) provided by the user 210. The electronic device 200 may convert the first sound signal into a first audio electrical signal. Then, the electronic device 200 sends the first audio electrical signal to the electronic device 300. The electronic device 300 may convert the first audio electrical signal from the electronic device 200 into a first sound signal, and play the first sound signal by using a receiver (also referred to as an "earpiece"), or play the first sound signal by using a speaker (also referred to as a "horn") of the electronic device 300. The "voice data captured by the microphone 270C" is specifically the first sound signal captured by the microphone. Similarly, a microphone of the electronic device 300 may receive voice data (namely, a second sound signal) provided by the user 310. The electronic device 200 may convert the second sound signal into a second audio electrical signal. Then, the electronic device 300 sends the second audio electrical signal to the electronic device 200. The electronic device 200 may convert the second audio electrical signal from the electronic device 200 into a second audio signal, and play the second audio signal by using a receiver, or play the second audio signal by using a speaker of the electronic device 200.

Referring to FIG. 7C, in a process in which the electronic device 200 performs AR communication with the electronic device 300, the electronic device 200 may recognize voice data (namely, the first sound signal) collected by the microphone of the electronic device 200 and voice data (namely, the second sound signal) converted from the second audio electrical signal. If the electronic device 200 recognizes voice data corresponding to a text and a preset text, the electronic device 200 may display a dynamic image in which the AR model 311 and the AR model 212 perform actions corresponding to the preset text. The electronic device 200 may store a plurality of preset texts and actions corresponding to the preset texts. For example, a preset text "hello" corresponds to an action "handshake". A preset text "goodbye" corresponds to an action "wave".

The user and another user usually greet each other before communication. For example, when the electronic device 200 starts to perform AR communication with the electronic device 300, the user 210 and the user 310 may say "hello" to each other. If the electronic device 200 recognizes voice data "hello", the electronic device 200 may display a dynamic image in which the AR model 311 shakes a hand with the AR model 212. To be specific, the electronic device may control the AR model to perform a corresponding action based on the voice data of the user, so that a quantity of times of direct interaction between the user and the AR model and a quantity of times of interaction between the AR models are increased, and user experience of AR communication can be improved.

In some other embodiments, in a process in which the electronic device 200 performs AR communication with the electronic device 300, the electronic device 200 may recognize voice data (namely, the first sound signal) collected by the microphone of the electronic device 200 and voice data (namely, the second sound signal) converted from the second audio electrical signal; and convert the recognized voice data into a text. The electronic device 200 may display, in the AR communication interface, the text (namely, a subtitle) obtained through the conversion.

Figure 15:
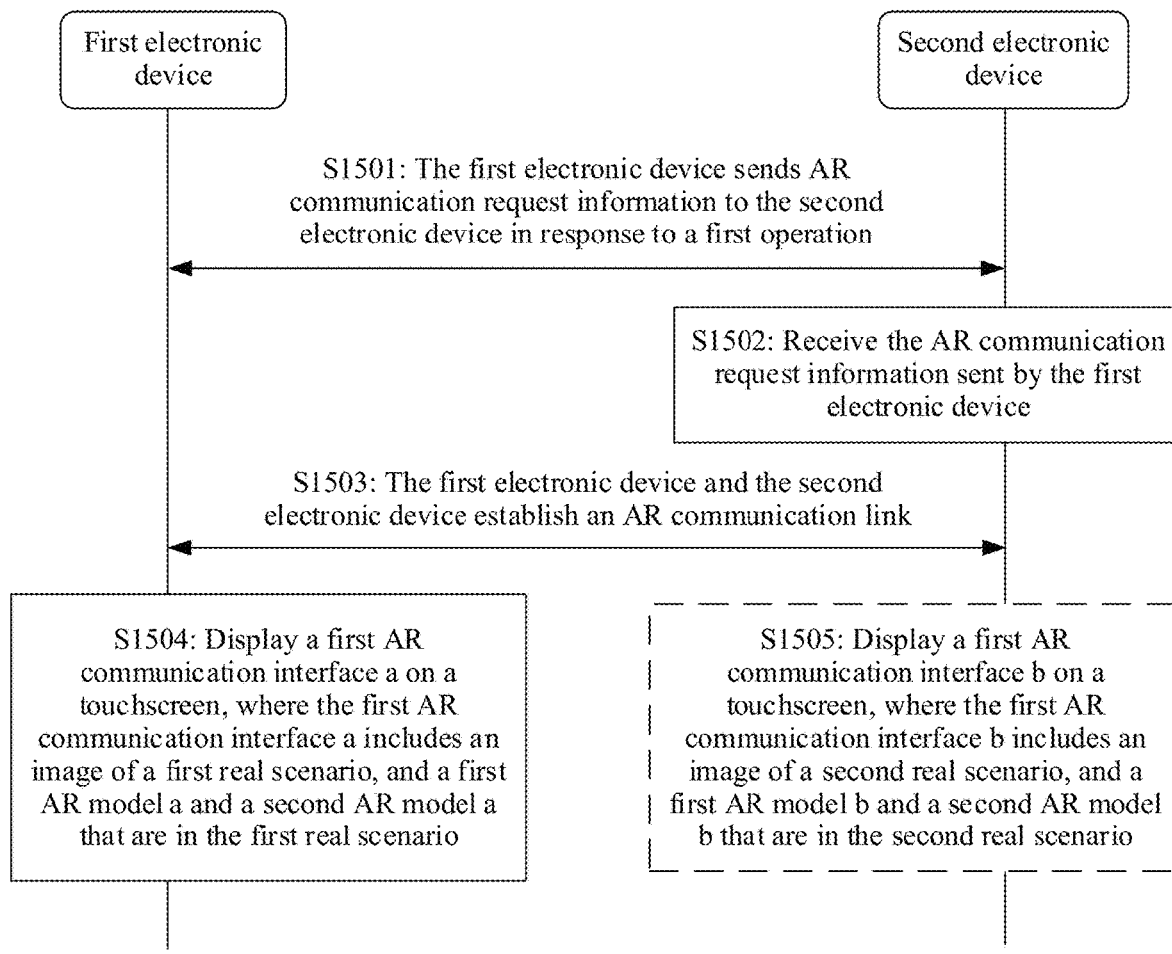
FIG. 15 is a flowchart of an augmented reality communication method according to another embodiment.

With reference to the foregoing embodiments and accompanying drawings, FIG. 15 shows an augmented reality communication method according to an embodiment. The method may include S1501 to S1504.

S1501: A first electronic device sends AR communication request information to a second electronic device in response to a first operation.

For S1501, refer to the detailed description of S902 in the foregoing embodiment. Details are not described herein again in this embodiment of this application.

S1502: The second electronic device receives the AR communication request information sent by the first electronic device.

For S1501, refer to the detailed description of S903 in the foregoing embodiment. Details are not described herein again in this embodiment of this application.

S1503: The first electronic device and the second electronic device establish an AR communication link.

The second electronic device may establish an AR communication link with the first electronic device in response to the AR communication request information. The first electronic device may establish an AR communication link with the second electronic device by using a base station and a core network device. Alternatively, the first electronic device may establish an AR communication link with the second electronic device by using an AR server specially configured to provide an AR communications service. For a specific method for establishing the AR communication link between the first electronic device and the second electronic device, refer to the method for establishing the communication link between the electronic device 200 and the electronic device 300 in the foregoing embodiments.

S1504: The first electronic device displays a first AR communication interface a on a touchscreen, where the first AR communication interface a includes an image of a first real scenario, and a first AR model a and a second AR model a that are in the first real scenario.

The first real scenario may be a real scenario collected by a second camera of the first electronic device. The first AR model is an AR model of a first user corresponding to the first electronic device. An expression and action of the first user may be presented in the first AR model, and are displayed by using the touchscreen of the first electronic device. The second AR model is an AR model of a second user corresponding to the second electronic device. An expression and action of the second user may be presented in the second AR model, and are displayed by using the touchscreen of the first electronic device.

In this embodiment, for example, the first electronic device is the electronic device 200 shown in FIG. 2, and the second electronic device is the electronic device 300 shown in FIG. 2 The first AR communication interface a may be the AR communication interface 303 shown in FIG. 3C.

According to the augmented reality communication method, the AR communication interface displayed by the electronic device includes the image of the real scenario in which the electronic device is located, and the first AR model and the second AR model that are in the real scenario. In addition, the expression and action of the first user (namely, a calling party) may be presented in the first AR model, and the expression and action of the second user (namely, a called party) may be presented in the second AR model. In this way, in a process in which the electronic device performs AR communication, an interactive service in the real scenario can be provided for the user, so that communication experience of the user can be improved.

In some embodiments, an AR communication interface may also be displayed in a process in which the second electronic device performs AR communication with the first electronic device. Specifically, as shown in FIG. 15, after S1503, the method in this embodiment of this application may further include S1505.

S1505: The second electronic device displays a first AR communication interface b on a touchscreen, where the first AR communication interface b includes an image of a second real scenario, and a first AR model b and a second AR model b that are in the second real scenario.

The second real scenario is a real scenario collected by a second camera of the second electronic device. The first AR model is an AR model of a first user corresponding to the first electronic device. The second electronic device presents an expression and action of the first user in the first AR model. The second AR model is an AR model of a second user corresponding to the second electronic device. The second electronic device presents an expression and action of the second user in the second AR model. For example, a second AR communication interface b may be the AR communication interface 304 shown in FIG. 3D.

According to the augmented reality communication method, both the electronic devices that perform AR communication can display the AR communication interface. To be specific, both the electronic devices that perform AR communication can provide an interactive service in the real scenario for the user, so that communication experience of the user can be improved.

Figure 16:
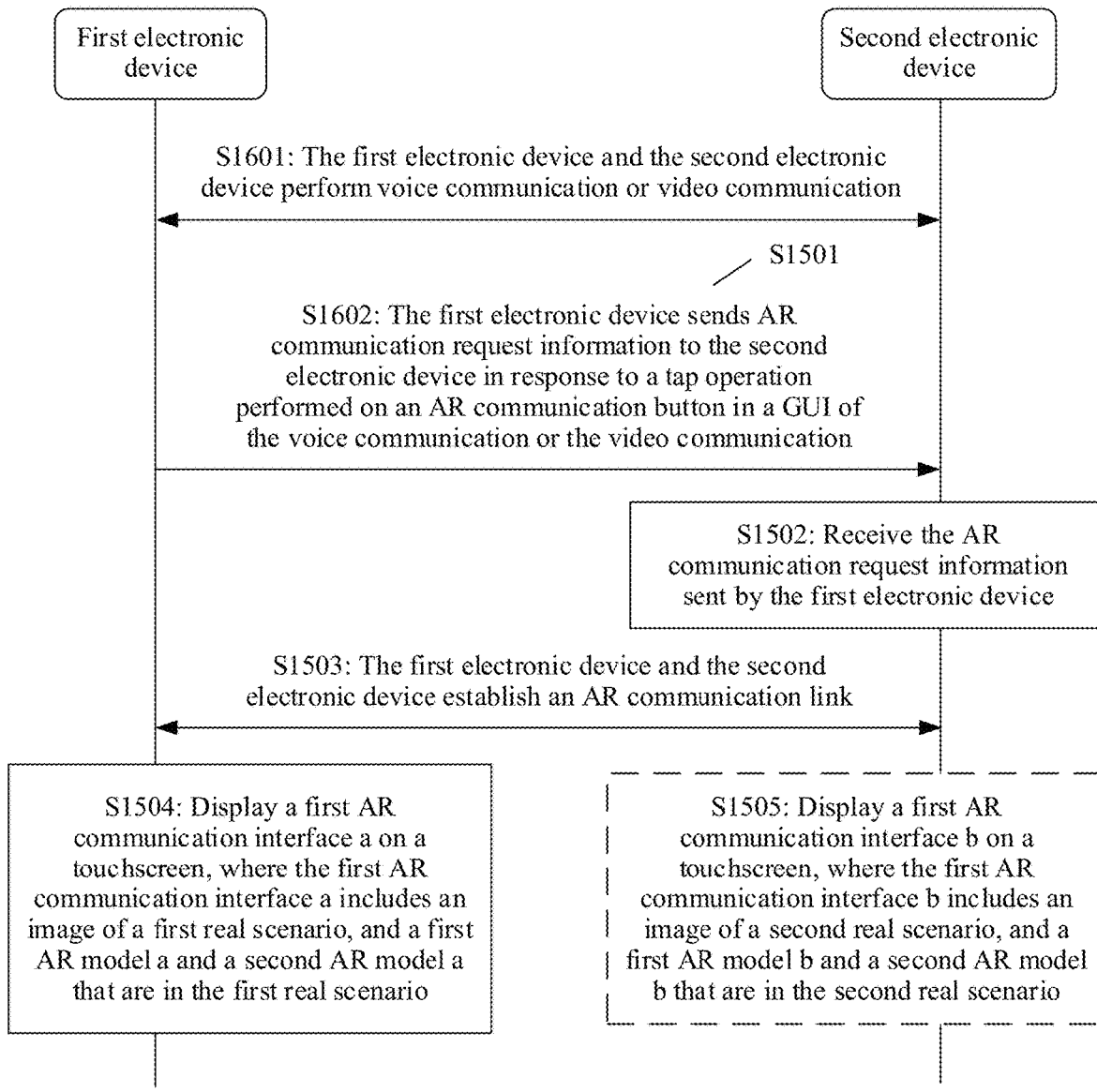
FIG. 16 is a flowchart of an augmented reality communication method according to another embodiment.

In some embodiments, as shown in FIG. 16, before S1501 and S1502, the augmented reality communication method may further include S1601.

S1601: The first electronic device and the second electronic device perform voice communication or video communication.

When the first electronic device and the second electronic device perform the voice communication or the video communication, the first electronic device displays, on the touchscreen, a graphical user interface for performing voice communication or video communication with the second electronic device; and the second electronic device displays, on the touchscreen, a graphical user interface for performing voice communication or video communication with the first electronic device.

The first operation may be a first preset gesture entered on the graphical user interface of the voice communication or the video communication on the touchscreen of the first electronic device, for example, an S-shaped gesture or a slide-up gesture.

Alternatively, the GUI of the voice communication or the video communication includes an AR communication button, and the first operation is a tap operation performed on the AR communication button on the touchscreen of the electronic device. For example, the GUI of the video communication may be the video communication interface 403 shown in FIG. 4B. The video communication interface 403 includes an "AR communication" button 404. The GUI of the voice communication may be the voice communication interface 401 shown in FIG. 4A. The voice communication interface 401 includes an "AR communication" button 402.

Alternatively, the first operation is a tap operation performed on a first preset button in a process of the voice communication or the video communication, and the first preset button is a physical button of the first electronic device. For example, the first preset button may be a combination button including a "volume +" button and a "screen locking" button.

For example, the first operation is the tap operation performed on the AR communication button in the graphical user interface of the voice communication or the video communication. As shown in FIG. 16, S1501 in FIG. 15 may be replaced with S1602.

S1602: The first electronic device sends the AR communication request information to the second electronic device in response to the tap operation performed on the AR communication button in the GUI of the voice communication or the video communication.

In this embodiment, the first electronic device may initiate AR communication in the process of performing the voice communication or the video communication with the second electronic device, so that user experience of the voice communication or the video communication can be improved.

In some other embodiments, an AR application is installed in each of the first electronic device and the second electronic device, and the AR application is a client used to provide an AR communications service. Before S1501, the augmented reality communication method may further include: displaying, by the first electronic device, an AR application interface in response to a tap operation performed on an application icon of the AR application. The AR application interface includes at least one contact option, and the at least one contact option includes a contact option corresponding to the second electronic device. In this embodiment, the first operation is a tap operation performed by the first user on the contact option corresponding to the second electronic device.

Figure 17:
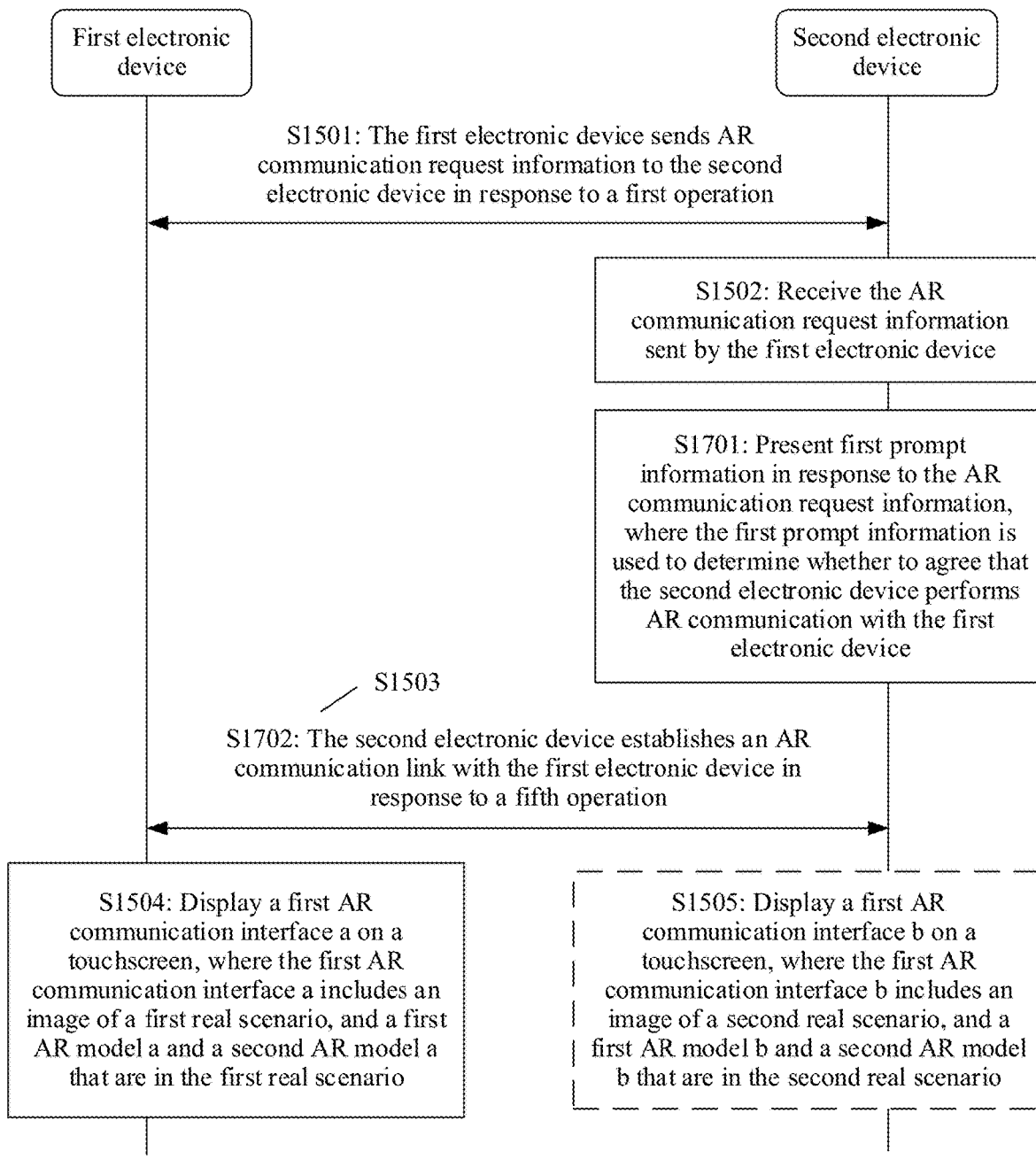
FIG. 17 is a flowchart of an augmented reality communication method according to another embodiment.

In some embodiments, before S1503, the second electronic device may request the user to determine whether to agree that the second electronic device performs AR communication with the first electronic device. For example, as shown in FIG. 17, before S1503 shown in FIG. 15, the method in this embodiment of this application may further include S1701, and S1503 may include S1702.

S1701: The second electronic device presents first prompt information in response to the AR communication request information, where the first prompt information is used to determine whether to agree that the second electronic device performs AR communication with the first electronic device.

S1702: The second electronic device establishes an AR communication link with the first electronic device in response to a fifth operation.

The fifth operation is used to determine that the second electronic device agrees to perform AR communication with the first electronic device. For detailed descriptions of the fifth operation, refer to related content in the foregoing embodiment. Details are not described herein again in this embodiment of this application.

In this embodiment, the second electronic device does not directly establish the AR communication link with the first electronic device in response to the AR communication request information, but determines, based on a willingness of the user, whether to perform AR communication with the first electronic device, so that communication experience of the user can be improved.

Figure 18:
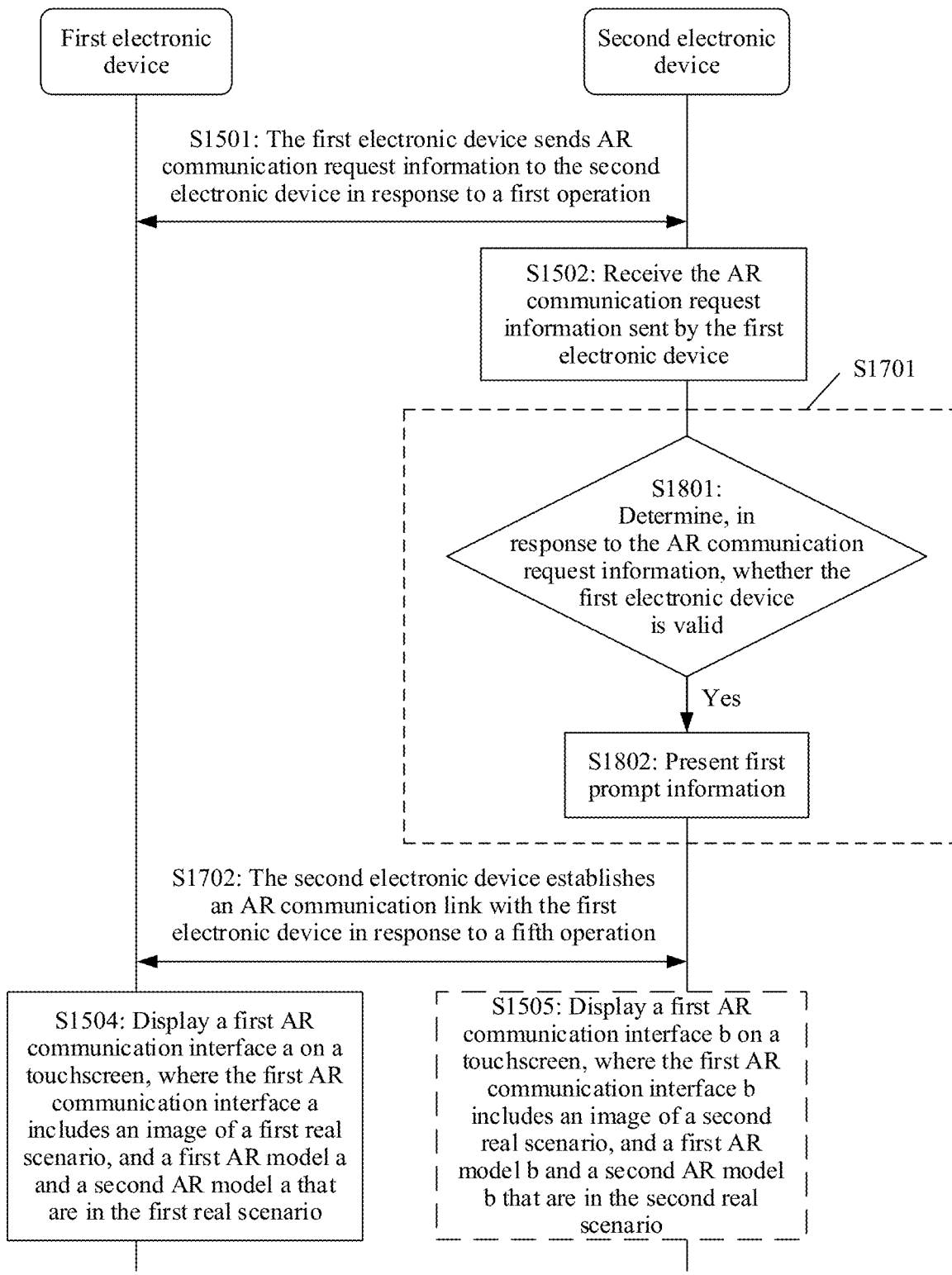
FIG. 18 is a flowchart of an augmented reality communication method according to another embodiment.

In some embodiments, before the second electronic device presents the first prompt information, the second electronic device may perform authentication on validity of the first electronic device. As shown in FIG. 18, S1701 shown in FIG. 17 may include S1801 and S1802.

S1801: The second electronic device determines, in response to the AR communication request information, whether the first electronic device is valid.

If the first electronic device is valid, the second electronic device performs S1802. If the first electronic device is invalid, the second electronic device refuses to perform AR communication with the first electronic device.

That the first electronic device is valid includes: a whitelist of the second electronic device stores device identification information of the first electronic device, or a blacklist of the second electronic device does not store device identification information of the first electronic device; and the device identification information of the first electronic device includes a phone number of the first electronic device.

S1802: The second electronic device presents the first prompt information.

For example, the second electronic device may provide voice prompt information, that is, the first prompt information is the voice prompt information. For example, the second electronic device may provide voice prompt information "Determine whether to perform AR communication with the first electronic device". Alternatively, the second electronic device displays an image user interface including the first prompt information. Alternatively, the second electronic device may display an image user interface including the first prompt information, and provide a vibration prompt or the voice prompt information. For example, the second electronic device may display, on the touchscreen, the GUI 501 shown in FIG. 5A. The graphical user interface 501 includes first prompt information "Determine whether to perform AR communication with the user 210".

According to the augmented reality communication method, the second electronic device presents the first prompt information only when the first electronic device is valid, so that harassment from an invalid electronic device to the second electronic device can be intercepted, and communication experience of the user can be improved.

In some embodiments, the first AR model a and the second AR model a are AR models that are preset in the first electronic device. The first AR model b and the second AR model b are AR models that are preset in the second electronic device. In this embodiment, for a method for presetting the AR model in the electronic device, refer to the descriptions of FIG. 7D and FIG. 7E. Details are not described herein again in this embodiment of this application.

Figure 19A:
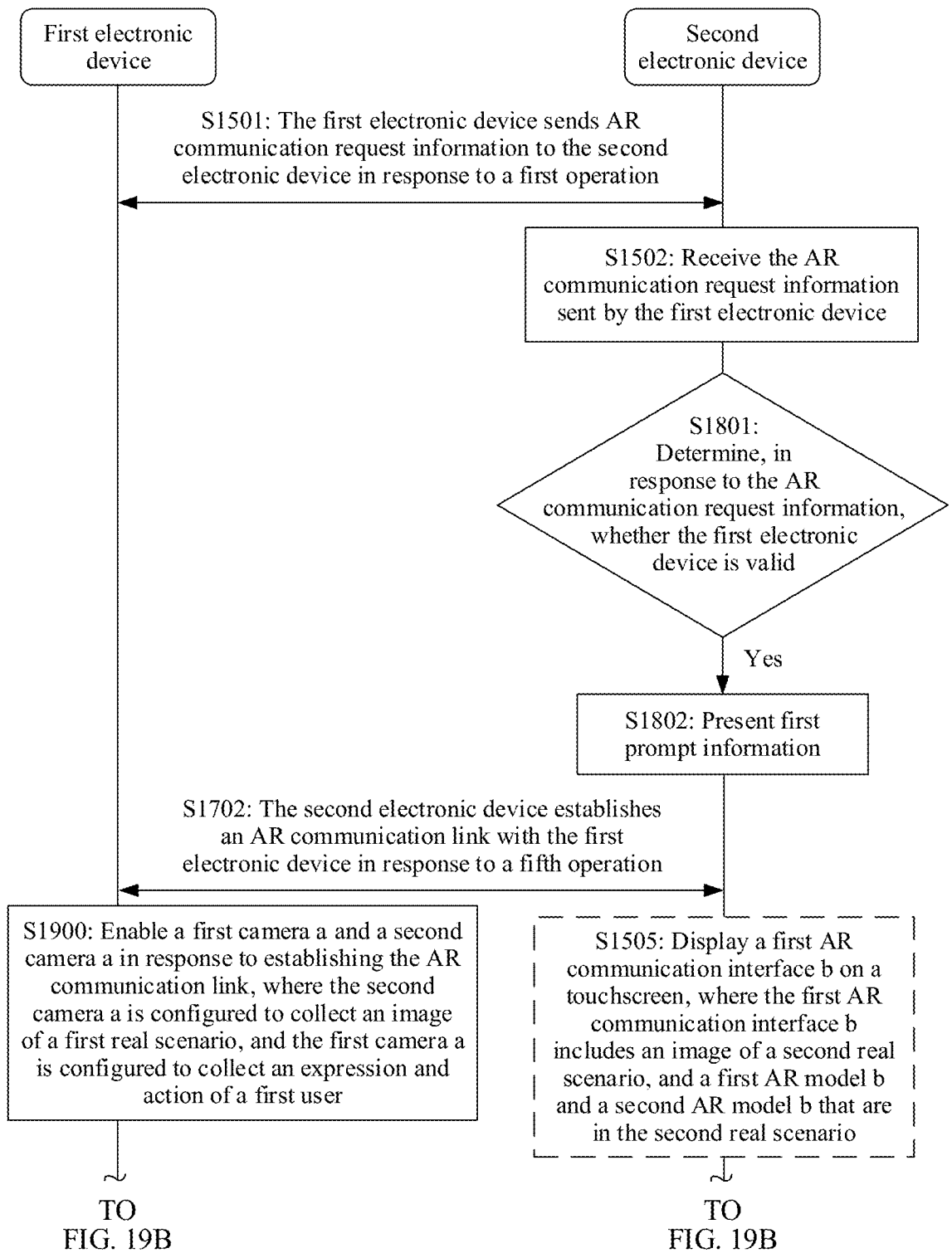
FIG. 19A and FIG. 19B are a flowchart of an augmented reality communication method according to another embodiment.
Figure 19B:
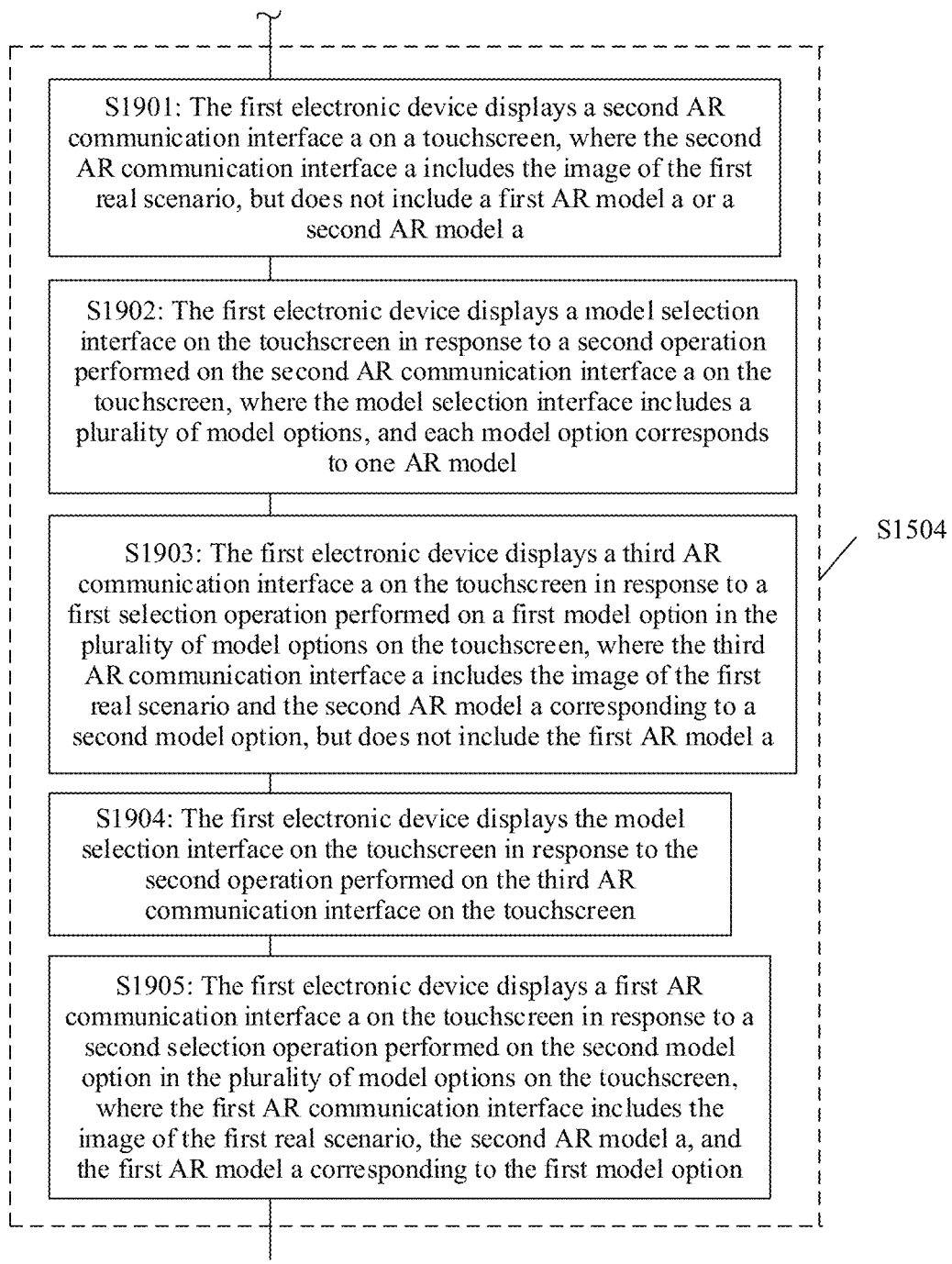

In some other embodiments, S1504 may include S1901 to S1905. For example, as shown in FIG. 19A and FIG. 19B, S1504 shown in FIG. 18 may include S1901 to S1905.

S1901: The first electronic device displays a second AR communication interface a on the touchscreen, where the second AR communication interface a includes the image of the first real scenario, but does not include the first AR model a or the second AR model a.

For example, the second AR communication interface a may be the AR communication interface 601 shown in FIG. 6A.

S1902: The first electronic device displays a model selection interface on the touchscreen in response to a second operation performed on the second AR communication interface a on the touchscreen, where the model selection interface includes a plurality of model options, and each model option corresponds to one AR model.

For example, the model selection interface may be the model selection interface 603 shown in FIG. 6B. The model selection interface 603 includes an "AR model (user 310)" option 609, a "Setting an AR model by the other party" option 608, an "AR model 1" option 606, an "AR model 2" option 607, and the like.

S1903: The first electronic device displays a third AR communication interface a on the touchscreen in response to a first selection operation performed on a first model option in the plurality of model options on the touchscreen, where the third AR communication interface a includes the image of the first real scenario and the second AR model a corresponding to a second model option, but does not include the first AR model a.

Figure 6D:
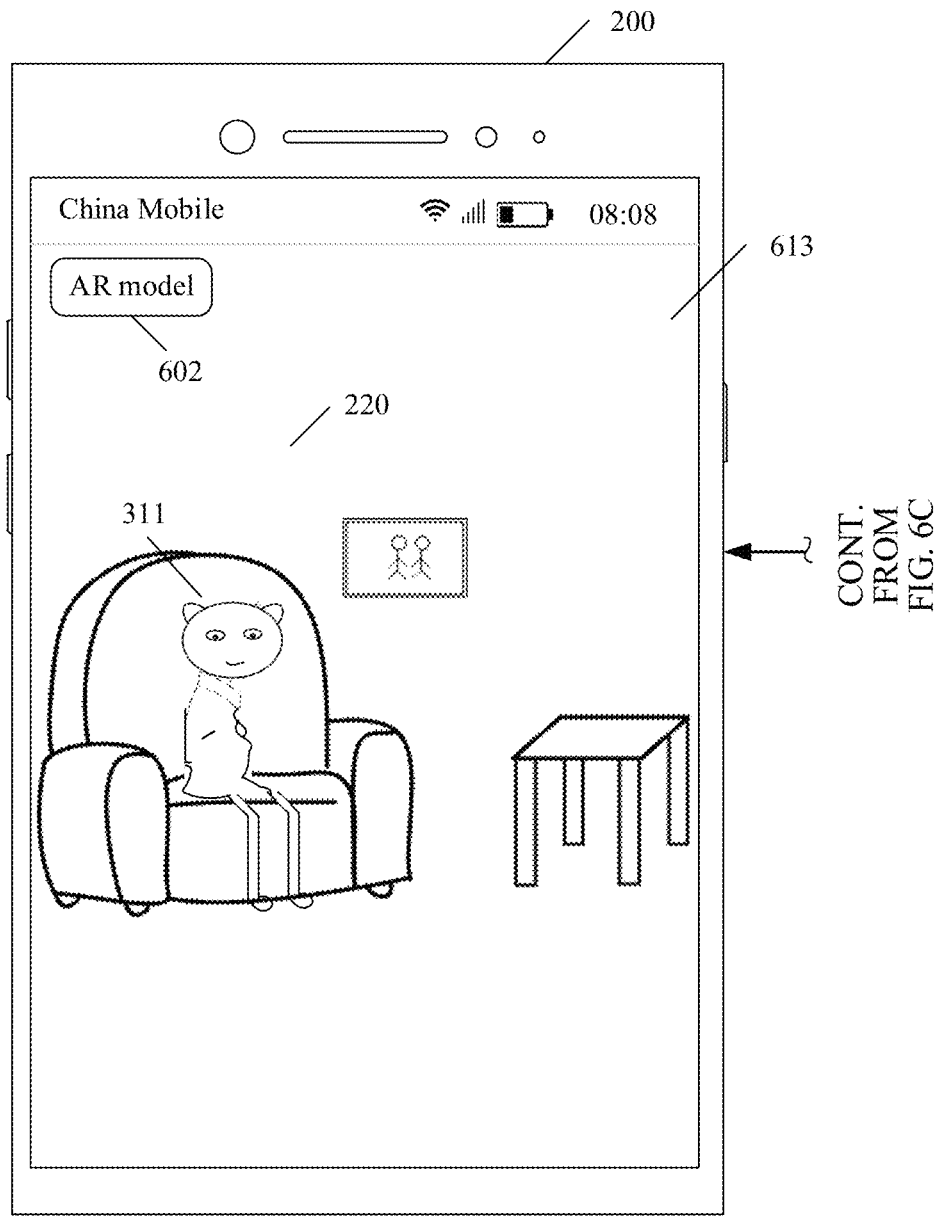

For example, the third AR communication interface a may be the AR communication interface 613 shown in FIG. 6D.

S1904: The first electronic device displays the model selection interface on the touchscreen in response to a second operation performed on the third AR communication interface on the touchscreen.

S1905: The first electronic device displays the first AR communication interface a on the touchscreen in response to a second selection operation performed on the second model option in the plurality of model options on the touchscreen, where the first AR communication interface includes the image of the first real scenario, the second AR model a, and the first AR model a corresponding to the first model option.

For example, the first AR communication interface a may be the AR communication interface 706 (namely, the AR communication interface 303 shown in FIG. 3C) shown in FIG. 7C.

In some embodiments, the first electronic device may enable a first camera and a second camera in response to establishing the AR communication link. For example, as shown in FIG. 19A and FIG. 19B, before S1901, the augmented reality communication method may further include S1900.

S1900: The first electronic device enables a first camera a and a second camera a in response to establishing the AR communication link, where the second camera a is configured to collect the image of the first real scenario, and the first camera a is configured to collect the expression and action of the first user.

Certainly, the second electronic device may also enable a first camera b and a second camera b, where the second camera b is configured to collect the image of the second real scenario, and the first camera b is configured to collect the expression and action of the second user.

For a method for displaying the first AR communication interface b by the second electronic device on the touchscreen in S1505, refer to the description of the method for displaying the first AR communication interface a by the first electronic device on the touchscreen in S1901 to S1905. Details are not described herein again in this embodiment.

According to the augmented reality communication method, an AR communication interface (for example, the second AR communication interface) that is just displayed by the first electronic device includes only the image of the first real scenario that is collected by the second camera of the first electronic device, but does not include the first AR model or the second AR model. The user may add the AR model to the second AR communication interface. According to the foregoing method, the user may select an AR model that meets a preference of the user, so that communication experience of the user can be improved.

Figure 20A:
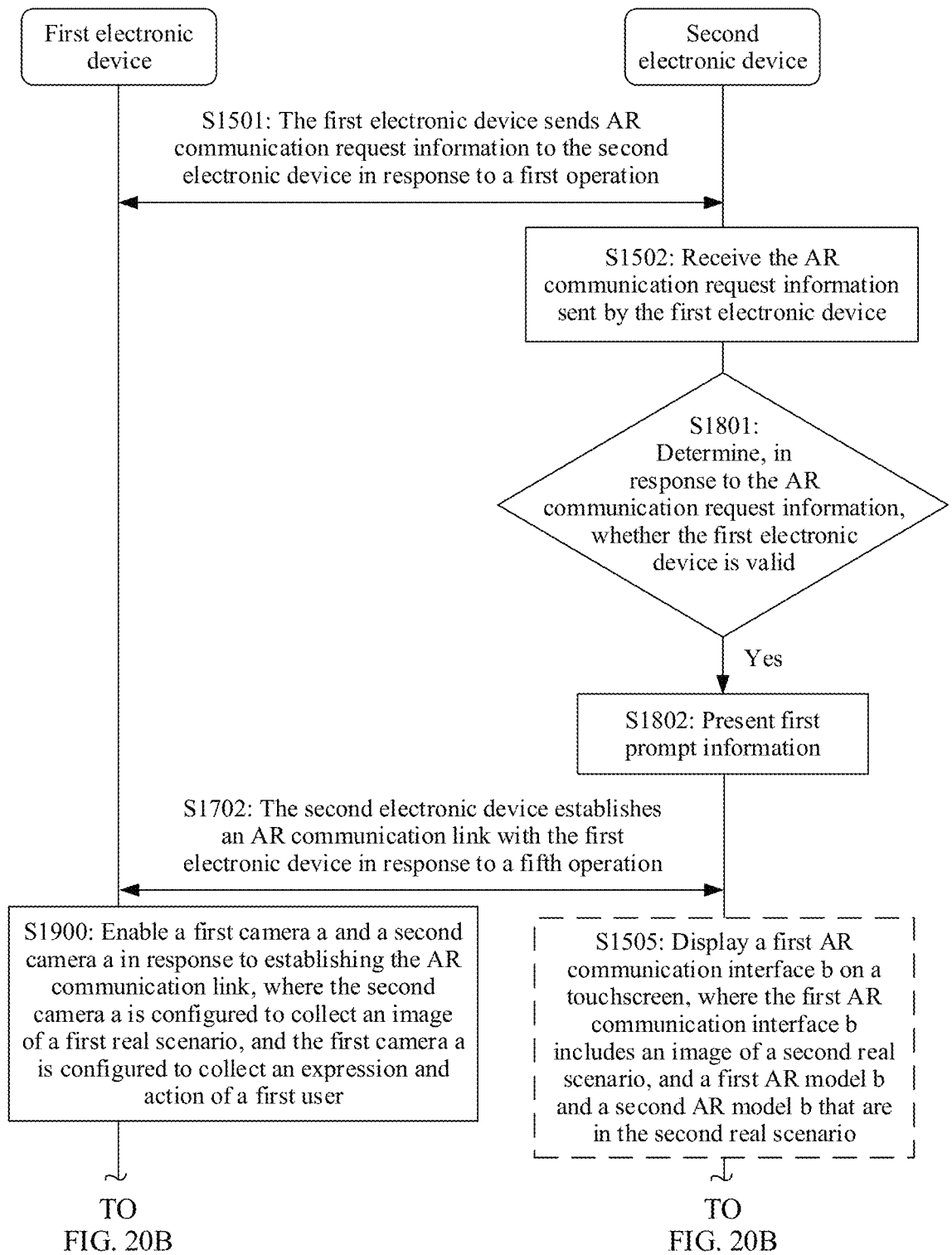

In some embodiments, after S1504 or S1905, the augmented reality communication method may further include S2001 and S2002. For example, as shown in FIG. 20A and FIG. 20B, after S1905 shown in FIG. 19B, the augmented reality communication method may further include S2001 and S2002.

S2001: The first electronic device displays the model selection interface in response to a tap operation performed on the first AR model a on the touchscreen, where the model selection interface includes the plurality of model options, and each model option corresponds to one AR model.

S2002: The first electronic device changes, in response to a tap operation performed on a third model option in the plurality of model options on the touchscreen, the first AR model on the first AR communication interface to a third AR model corresponding to the third model option.

It should be noted that the first electronic device may alternatively change the second AR model a at any time in response to an operation of the user after S1504 or S1905. The second electronic device may alternatively change the first AR model b and the second AR model b at any time in response to an operation of the user after S1505. For a method for changing the second AR model a by the first electronic device and a method for changing the first AR model b and the second AR model b by the second electronic device, refer to S2001 and S2002. Details are not described herein again in this embodiment.

In the process in which the second electronic device performs AR communication with the first electronic device, the first electronic device may change an AR model at any time based on an operation of the user, and display an AR model that meets a preference of the user, so that communication experience of the user can be improved.

In some embodiments, after S1504 or S1905, the augmented reality communication method may further include: displaying, by the first electronic device, contact information of the second user in response to a fourth operation performed on the second AR model on the touchscreen. For example, the contact information includes at least one of a phone number, an email address, or a profile picture of the second user.

In a process in which the first electronic device performs AR communication with the second electronic device, the first electronic device can display the contact information of the corresponding user only by operating the AR model by the user, but does not need to exit the AR communication interface to search Contacts for the contact information of the user.

Figure 21A:
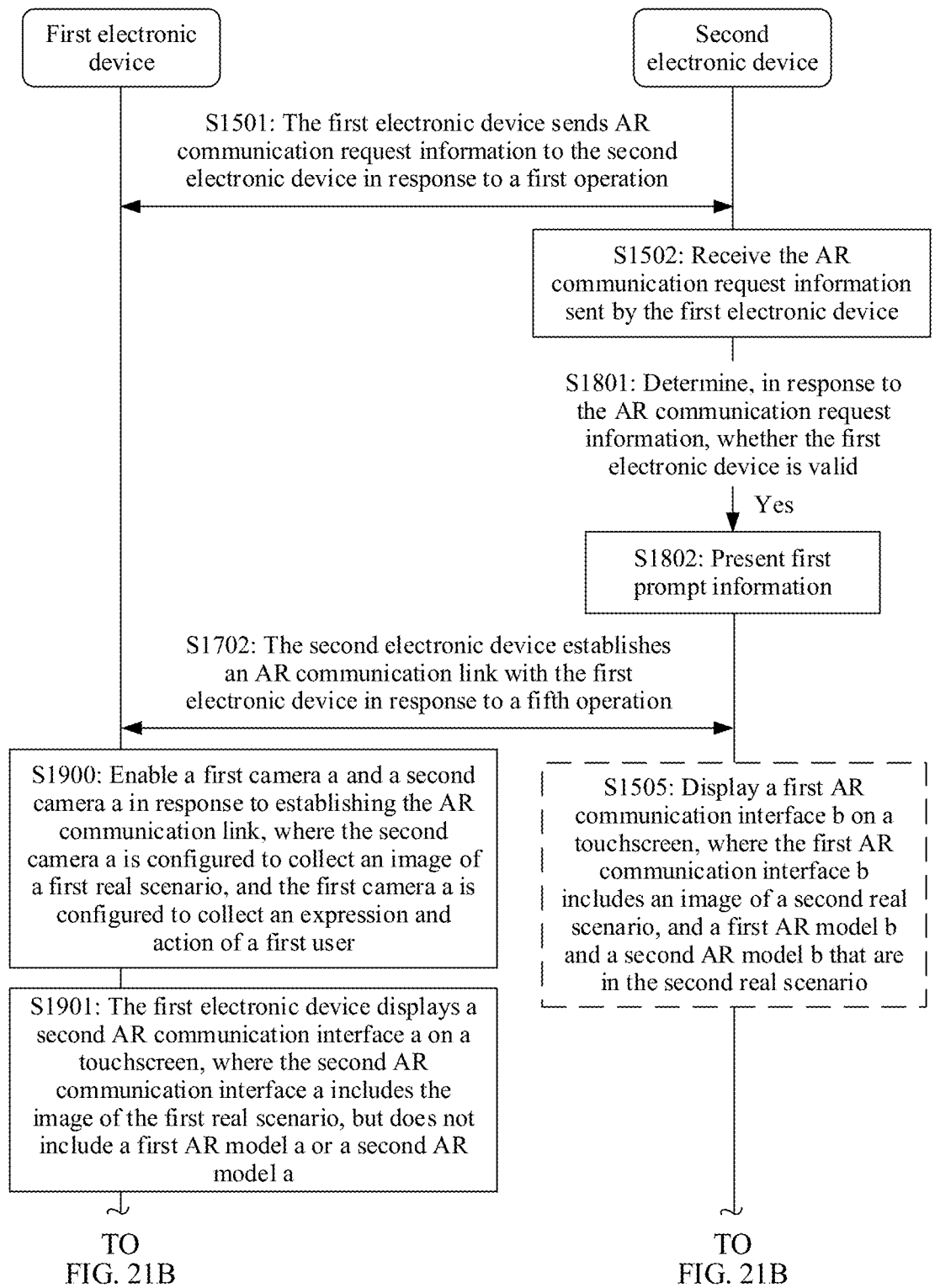

In some embodiments, after S1504 or S1905, the augmented reality communication method may further include S2101 and S2102. For example, as shown in FIG. 21A and FIG. 21B, after S1905 shown in FIG. 19B, the augmented reality communication method may further include S2101 and S2102.

S2101: The first electronic device recognizes voice data collected by a microphone of the first electronic device and voice data obtained by converting an audio electrical signal from the second electronic device.

S2102: The first electronic device displays a text of the recognized voice data on the touchscreen.

It should be noted that after S1505, the second electronic device may alternatively recognize voice data collected by a microphone of the second electronic device and voice data obtained by converting an audio electrical signal from the first electronic device; and display a text of the recognized voice data on the touchscreen.

According to the augmented reality communication method, the first electronic device may display, in the AR communication interface, the text (namely, a subtitle) of the voice data obtained through AR communication. The first electronic device displays the text of the voice data obtained through AR communication, and therefore may visually present, to the user, content exchanged between the two users in a process in which the first electronic device performs AR communication with the second electronic device.

In some embodiments, as shown in FIG. 21A and FIG. 21B, after S2101, the augmented reality communication method may further include S2103.

S2103: When recognizing voice data corresponding to a text and a preset text, the first electronic device displays, on the touchscreen, a dynamic image in which the first AR model and the second AR model perform actions corresponding to the preset text.

For example, a preset text "hello" corresponds to an action "handshake". A preset text "goodbye" corresponds to an action "wave".

According to the augmented reality communication method, the first AR model and the second AR model interact with each other based on the voice data of the two users, so that content displayed in the AR communication interface is closer to a picture of face-to-face communication between the users in the real scenario, to improve a sense of reality of AR communication and improve communication experience of the user.

It may be understood that to implement the foregoing functions, the electronic device (for example, the electronic device 200 or the electronic device 300) includes corresponding hardware structures and/or software modules for performing the functions. A person skilled in the art should be easily aware that units, algorithms, and steps in the examples described with reference to the embodiments disclosed in this specification may be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the electronic device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division in an actual implementation.

Figure 22:
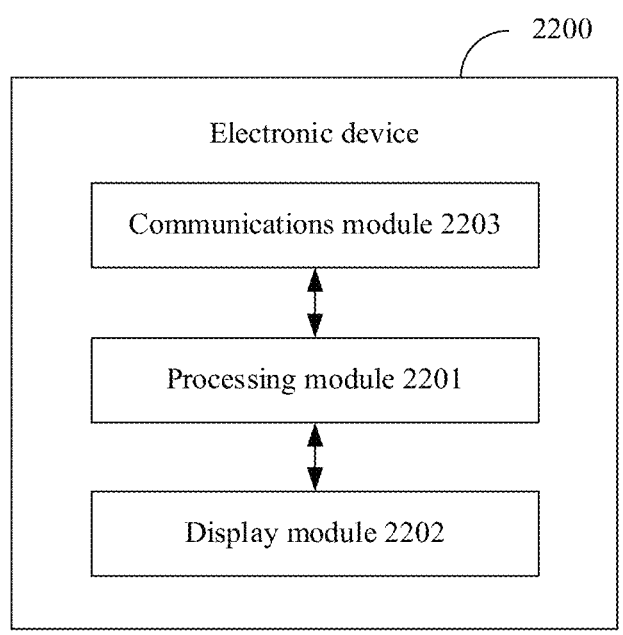
FIG. 22 is a schematic structural composition diagram of an electronic device according to another embodiment.

When an integrated unit is used, FIG. 22 is a possible schematic structural diagram of the electronic device in the foregoing embodiments. The electronic device 2200 includes a processing module 2201, a display module 2202, and a communications module 2203.

The processing module 2201 is configured to: control and manage an action of the electronic device 2200. The display module 2202 is configured to display an image generated by the processing module 2201. The communications module 2203 is configured to support the electronic device 2200 in communicating with another network entity. The electronic device 2200 may be used as an electronic device of a calling party, or may be used as an electronic device of a called party.

When the electronic device 2200 is used as the electronic device (for example, the electronic device 200 or the first electronic device in the foregoing embodiment) of the calling party, the processing module 2201 may be configured to support the electronic device 2200 in performing S901, S902, S911, the operation of "constructing the three-dimensional face model a" in S912, the operation of "receiving the second operation" in S913, S914, S919, S1503, S1601, S1702, S1801, S1900, S2002, and S2101 in the foregoing method embodiments, and/or is configured to perform another process in the technology described in this specification. The display module 2202 may be configured to support the electronic device 2200 in performing the operation of "displaying the voice communication interface or the video communication interface", the operation of "displaying the AR communication interface", the operation of "displaying the image" in S912, the operation of "displaying the AR model" in S913, the operation of "displaying the second prompt information" in S918, S1504, S1901, S1902, S1903, S1904, S1905, S2001, S2102, and S2103 in the foregoing method embodiments, and/or is configured to perform another process in the technology described in this specification. The communications module 2203 may be configured to support the electronic device 2200 in performing the operations of "interacting with the electronic device 300" in S901, S914, and S919, S903, S910, S917, and S1501, the operations of "interacting with the second electronic device" in S1503, S1601, and S1702, and S1602 in the foregoing method embodiments, and/or is configured to perform another process in the technology described in this specification.

When the electronic device 2200 is used as the electronic device (for example, the electronic device 300 or the second electronic device in the foregoing embodiment) of the called party, the processing module 2201 may be configured to support the electronic device 2200 in performing S901, S907, the operation of "constructing the three-dimensional face model b" in S908, the operation of "receiving the second operation" in S909, S915, S914, S919, S1503, S1601, and S1702 in the foregoing method embodiments, and/or is configured to perform another process in the technology described in this specification. The display module 2202 may be configured to support the electronic device 2200 in performing the operation of "displaying the voice communication interface or the video communication interface", the operation of "displaying the AR communication interface", the operations of "displaying the first prompt information" in S904, S1701, and S1802, the operation of "displaying the image collected by the rear-facing camera b" in S908, the operation of "displaying the added AR model" in S909, and S1505 in the foregoing method embodiments, and/or is configured to perform another process in the technology described in this specification. The communications module 2203 may be configured to support the electronic device 2200 in performing the operations of "interacting with the electronic device 200" in S901, S914, and S919, the operation of "receiving the AR communication request information" in S904, S906, S916, S1502, the operations of "interacting with the first electronic device" in S1503, S1601, and S1702, and the operation of "receiving the AR communication request information in S1602" in the foregoing method embodiments, and/or is configured to perform another process in the technology described in this specification.

Certainly, the unit modules in the electronic device 2200 include but are not limited to the processing module 2201, the display module 2202, and the communications module 2203. For example, the electronic device 2200 may further include a storage module, an audio module, and the like. The storage module is configured to store program code and data that are of the electronic device 2200. The audio module is configured to: in a voice communication process, collect voice data provided by a user, and play the voice data.

The processing module 2201 may be a processor or a controller, for example, may be a central processing unit (CPU), a digital signal processor (DSP), an application-specific integrated circuit (ASIC), a field programmable gate array (FPGA) or another programmable logic device, a transistor logic device, a hardware component, or any combination thereof. The processor may include an application processor and a baseband processor. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor. The communications module 2203 may be a transceiver, a transceiver circuit, or the like. The storage module may be a memory.

For example, the processing module 2201 is a processor (the processor 110 shown in FIG. 1), and the communications module 2203 includes a mobile communications module (the mobile communications module 150 shown in FIG. 1) and a wireless communications module (the wireless communications module 160 shown in FIG. 1). The mobile communications module and the wireless communications module may be collectively referred to as a communications interface. The storage module may be a memory (the internal memory 121 shown in FIG. 1). The display module 2202 may be a touchscreen (the display 194 shown in FIG. 1, where the display 194 integrates a display panel and a touch panel). The audio module may include a microphone (the microphone 170 C shown in FIG. 1), a speaker (the speaker 170A shown in FIG. 1), a receiver (the receiver 170B shown in FIG. 1), and a headset jack (the headset jack 170D shown in FIG. 1). The electronic device 2200 provided in this embodiment of this application may be the electronic device 100 shown in FIG. 1. The processor, the memory, the communications interface, the touchscreen, and the like may be connected together, for example, connected by using a bus.

An embodiment of this application further provides a computer storage medium. The computer storage medium stores computer program code, and when the foregoing processor executes the computer program code, the electronic device 2200 performs related method steps in any one of FIG. 9B-1, FIG. 9B-2, and FIG. 9B-3, and FIG. 15 to FIG. 21A and FIG. 21B to implement the method in the foregoing embodiment.

An embodiment of this application further provides a computer program product. When the computer program product is run on a computer, the computer is enabled to perform related method steps in any one of FIG. 9B-1, FIG. 9B-2, and FIG. 9B-3, and FIG. 15 to FIG. 21A and FIG. 21B to implement the method in the foregoing embodiment.

The electronic device 2200, the computer storage medium, and the computer program product provided in the embodiments of this application each are configured to perform the corresponding method provided above. Therefore, for beneficial effects that can be achieved by the electronic device 220, the computer storage medium, and the computer program product, refer to the beneficial effects in the corresponding method provided above. Details are not described herein again.

In the descriptions in the foregoing implementations, a person skilled in the art may clearly understand that for the purpose of convenient and brief description, division into the foregoing function modules is merely used as an example for description. In actual application, the foregoing functions can be allocated to different function modules for implementation based on a requirement. To be specific, an inner structure of an apparatus is divided into different function modules to implement all or some of the functions described above.

In the several embodiments provided in this application, it should be understood that the disclosed apparatus and method may be implemented in another manner. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An augmented reality communication method between a first electronic device and a second electronic device, the method comprising:
  receiving, by the second electronic device, augmented reality AR communication request information sent by the first electronic device, wherein the AR communication request information is used to request to perform AR communication with the second electronic device;
  establishing, by the second electronic device, an AR communication link with the first electronic device in response to the AR communication request information; and
  displaying, by the second electronic device, a first AR communication interface on a touchscreen, wherein the first AR communication interface comprises an image of a first real scenario, and a first AR model and a second AR model that are in the first real scenario, wherein the first real scenario is a real scenario in which the second electronic device is located; the first AR model is an AR model of a first user corresponding to the first electronic device, and the second AR model is an AR model of a second user corresponding to the second electronic device; and in an AR communication process, the first AR model makes a corresponding expression and action based on an expression and action of the first user that are obtained by the second electronic device, and the second AR model makes a corresponding expression and action based on an expression and action of the second user that are obtained by the second electronic device.

2. The method according to claim 1, wherein establishing, by the second electronic device, the AR communication link with the first electronic device in response to the AR communication request information comprises:
   presenting, by the second electronic device, first prompt information in response to the AR communication request information, wherein the first prompt information is used to determine whether the second electronic device performs AR communication with the first electronic device; and
   establishing, by the second electronic device, the AR communication link with the first electronic device in response to an operation of agreeing to perform AR communication.

3. The method according to claim 2, wherein presenting, by the second electronic device, first prompt information in response to the AR communication request information comprises:
   determining, by the second electronic device in response to the AR communication request information, whether the first electronic device is valid; and
   presenting, by the second electronic device, the first prompt information if the first electronic device is valid, wherein
   the first electronic device is valid if a whitelist of the second electronic device stores device identification information of the first electronic device, or a blacklist of the second electronic device does not store device identification information of the first electronic device.

4. The method according to claim 1, wherein before receiving, by the second electronic device, AR communication request information sent by the first electronic device, the method further comprises:
   performing, by the second electronic device, voice communication or video communication with the first electronic device, and displaying a graphical user interface of the voice communication or the video communication on the touchscreen.

5. The method according to claim 1, wherein the first AR model is preset in the second electronic device for the first electronic device, and the second AR model is preset in the second electronic device for the second electronic device.

6. The method according to claim 1, wherein displaying, by the second electronic device, the first AR communication interface on the touchscreen comprises:
   displaying, by the second electronic device, a second AR communication interface on the touchscreen in response to establishing the AR communication link, wherein the second AR communication interface comprises the image of the first real scenario, but does not comprise the first AR model or the second AR model;
   displaying, by the second electronic device, a model selection interface on the touchscreen in response to a first operation performed on the second AR communication interface on the touchscreen, wherein the model selection interface comprises a plurality of model options;
   displaying, by the second electronic device, a third AR communication interface on the touchscreen in response to a first selection operation performed on a first model option in the plurality of model options on the touchscreen, wherein the third AR communication interface comprises the image of the first real scenario and the first AR model corresponding to the first model option, but does not comprise the second AR model;
   displaying, by the second electronic device, the model selection interface on the touchscreen in response to a second operation performed on the third AR communication interface on the touchscreen; and
   displaying, by the second electronic device, the first AR communication interface on the touchscreen in response to a second selection operation performed on a second model option in the plurality of model options on the touchscreen, wherein the first AR communication interface comprises the image of the first real scenario, the first AR model, and the second AR model corresponding to the second model option.

7. The method according to claim 1, wherein the second electronic device comprises a first camera and a second camera, and the first electronic device comprises a first camera; and the method further comprises:
   enabling, by the second electronic device, the first camera and the second camera of the second electronic device in response to establishing the AR communication link, wherein the second camera of the second electronic device is configured to collect the image of the first real scenario, and the first camera of the second electronic device is configured to collect the expression and action of the second user.

8. The method according to claim 1, wherein after displaying, by the second electronic device, the first AR communication interface on the touchscreen, the method further comprises:
   displaying, by the second electronic device, the model selection interface in response to a tap operation performed on the first AR model on the touchscreen, wherein the model selection interface comprises the plurality of model options; and
   changing, by the second electronic device in response to a tap operation performed on a third model option in the plurality of model options on the touchscreen, the first AR model on the first AR communication interface to a third AR model corresponding to the third model option.

9. The method according to claim 1, wherein after displaying, by the second electronic device, the first AR communication interface on the touchscreen, the method further comprises:
   recording, by the second electronic device in response to a third operation on the touchscreen, video data obtained when the second electronic device performs AR communication with the first electronic device.

10. An augmented reality communication system, comprising a first electronic device and a second electronic device, wherein:
    the first electronic device is configured to:
    receive a first operation of a user;
    send augmented reality AR communication request information to the second electronic device in response to a first operation, wherein the AR communication request information is used to request to perform AR communication with the second electronic device; and to establish an AR communication link with the second electronic device;

display a first AR communication interface in an AR communication process, wherein the first AR communication interface comprises an image of a first real scenario, and a first AR model and a second AR model that are in the first real scenario, wherein the first real scenario is a real scenario in which the first electronic device is located; the first AR model is an AR model of a first user corresponding to the first electronic device, and the second AR model is an AR model of a second user corresponding to the second electronic device; and in the AR communication process, the first AR model displayed by the touchscreen makes a corresponding expression and action based on an expression and action of the first user that are obtained by the first electronic device, and the second AR model displayed by the touchscreen makes a corresponding expression and action based on an expression and action of the second user that are obtained by the second electronic device;

the second electronic device is configured to:

receive augmented reality AR communication request information sent by the first electronic device, wherein the AR communication request information is used to request to perform AR communication with the second electronic device;

establish the AR communication link with the first electronic device in response to the AR communication request information;

display a second AR communication interface in the AR communication process, wherein the second AR communication interface comprises an image of a second real scenario, and a first AR model and a second AR model that are in the second real scenario, wherein the second real scenario is a real scenario in which the second electronic device is located; the first AR model is an AR model of a first user corresponding to the first electronic device, and the second AR model is an AR model of a second user corresponding to the second electronic device; and in the AR communication process, the first AR model displayed by the touchscreen makes a corresponding expression and action based on an expression and action of the first user that are obtained by the first electronic device, and the second AR model displayed by the touchscreen makes a corresponding expression and action based on an expression and action of the second user that are obtained by the second electronic device.

11. The communication system according to claim 10, wherein the first electronic device is further configured to display a graphical user interface of a voice communication or a video communication, wherein the first operation is a first preset gesture entered on the graphical user interface of the voice communication or the video communication on the touchscreen; or the graphical user interface of the voice communication or the video communication comprises an AR communication button, and the first operation is a tap operation performed on the AR communication button on the touchscreen; or the first operation is a tap operation performed on a first preset button in a process of the voice communication or the video communication, and the first preset button is a physical button of the first electronic device.

12. The communication system according to claim 10, wherein an AR application is installed in each of the first electronic device and the second electronic device, and the AR application is a client used to provide an AR communications service; a memory stores information about the AR application;

the first electronic device is further configured to: before the communications interface sends the AR communication request information to the second electronic device, display, by the first electronic device, an AR application interface in response to a tap operation performed on an application icon of the AR application, wherein the AR application interface comprises at least one contact option comprising a contact option corresponding to the second electronic device; and the first operation is a tap operation performed by the first user on the contact option corresponding to the second electronic device.

13. The communication system according to claim 10, wherein the first electronic device is further configured to:

display the second AR communication interface in response to establishing the AR communication link, wherein the second AR communication interface comprises the image of the first real scenario, but does not comprise the first AR model or the second AR model;

display a model selection interface in response to a first operation performed on the second AR communication interface on the touchscreen, wherein the model selection interface comprises a plurality of model options;

display a third AR communication interface in response to a first selection operation performed on a first model option in the plurality of model options on the touchscreen, wherein the third AR communication interface comprises the image of the first real scenario and the second AR model corresponding to the second model option, but does not comprise the first AR model;

display the model selection interface in response to the second operation performed on the third AR communication interface on the touchscreen; and display the first AR communication interface in response to a second selection operation performed on the second model option in the plurality of model options on the touchscreen, wherein the first AR communication interface comprises the image of the first real scenario, the second AR model, and the first AR model corresponding to the first model option.

14. The communication system according to claim 10, wherein the second electronic device is further configured to: present first prompt information in response to the AR communication request information, wherein the first prompt information is used to determine whether the second electronic device performs AR communication with the first electronic device; and establish the AR communication link with the first electronic device in response to an operation that a user agrees to perform AR communication on the touchscreen.

15. The communication system according to claim 10, wherein the second electronic device is further configured to: determine, in response to the AR communication request information, whether the first electronic device is valid; and present the first prompt information if the first electronic device is valid, wherein the first electronic device is valid if a whitelist of the second electronic device stores device identification information of the first electronic device, or a blacklist of the second electronic device does not store device identification information of the first electronic device;

and the whitelist and the blacklist of the second electronic device are stored in a memory.

16. The communication system according to claim 10, wherein the second electronic device is further configured to:
 display the model selection interface in response to a tap operation performed on the first AR model on the touchscreen, wherein the model selection interface comprises the plurality of model options and
 display, by the touchscreen in response to a tap operation performed on a third model option in the plurality of model options on the touchscreen, an AR communication interface in which the first AR model on the first AR communication interface is changed to a third AR model corresponding to the third model option.

17. The communication system according to claim 10, wherein the second electronic device is further configured to: after displaying the first AR communication interface, recognize voice data collected by a microphone of the second electronic device and voice data obtained by converting an audio electrical signal from the first electronic device; and
 the touchscreen is further configured to display a text of the voice data.

18. The communication system according to claim 17, wherein the second electronic device is further configured to: recognize voice data corresponding to the text and a preset text, and display a dynamic image in which the first AR model and the second AR model perform actions corresponding to the preset text.

* * * * *